US 11,691,658 B2

(12) United States Patent
Delgatty et al.

(10) Patent No.: US 11,691,658 B2
(45) Date of Patent: Jul. 4, 2023

(54) VEHICLE SYSTEMS AND METHODS

(71) Applicant: John Bradford King, Pasadena, CA (US)

(72) Inventors: Grant Delgatty, La Canada, CA (US); John Bradford King, Pasadena, CA (US); Norman Wada, San Francisco, CA (US)

(73) Assignee: John Bradford King, Pasadena, CA (US)

( * ) Notice: Subject to any disclaimer, the term of this patent is extended or adjusted under 35 U.S.C. 154(b) by 195 days.

(21) Appl. No.: 17/013,392

(22) Filed: Sep. 4, 2020

(65) Prior Publication Data

US 2021/0070339 A1    Mar. 11, 2021

Related U.S. Application Data

(60) Provisional application No. 62/896,506, filed on Sep. 5, 2019.

(51) Int. Cl.
*B62B 3/02* (2006.01)
*B62B 5/00* (2006.01)
(Continued)

(52) U.S. Cl.
CPC .............. *B62B 3/025* (2013.01); *B60N 3/104* (2013.01); *B60R 25/24* (2013.01); *B62B 5/004* (2013.01);
(Continued)

(58) Field of Classification Search
CPC ....... B62B 3/025; B62B 5/004; B62B 5/0053; B62B 2202/70; B62B 2207/00;
(Continued)

(56) References Cited

U.S. PATENT DOCUMENTS 4,287,966 A * 9/1981 Frees .................... B66F 9/06
187/234
4,346,906 A * 8/1982 Thorpe .................. B62B 3/186
280/33.996
(Continued)

FOREIGN PATENT DOCUMENTS

CN    108100059 A * 6/2018  ............... B60D 1/14
CN    108382426 A * 8/2018  ............. B62B 3/005
(Continued)

OTHER PUBLICATIONS

Translated KR-101961797-B1 (Year: 2022).*
(Continued)

*Primary Examiner* — James A Shriver, II
*Assistant Examiner* — Ian Bryce Shelton
(74) *Attorney, Agent, or Firm* — Foley & Lardner LLP

(57) ABSTRACT

A vehicle system includes a chassis, a plurality of wheels coupled to the chassis and supporting the chassis for rolling on a surface, and a riding platform coupled to the chassis. The riding platform is for supporting a user behind the chassis when the riding platform is in a downward pivoted state. A linkage connects the riding platform to the chassis for selective pivotal motion relative to the chassis between an upward pivoted state in which the riding platform is pivoted into a position to allow a user to walk behind the chassis and a downward pivoted state in which the user may ride or step on the platform.

21 Claims, 35 Drawing Sheets

(51) Int. Cl.
  *B62D 63/06* (2006.01)
  *B60R 25/24* (2013.01)
  *B60P 3/00* (2006.01)
  *G05D 1/02* (2020.01)
  *B60N 3/10* (2006.01)

(52) U.S. Cl.
  CPC ............ *B62B 5/0053* (2013.01); *B62D 63/06* (2013.01); *B60P 3/007* (2013.01); *G05D 1/021* (2013.01)

(58) Field of Classification Search
  CPC ..... B62B 3/008; B62B 2205/26; B62B 3/186; B62B 5/0013; B62B 5/085; B62B 5/087; B62B 3/027; B60N 3/104; B60R 25/24; B62D 63/06; B62D 51/02; B62D 51/04; B60P 3/007; G05D 1/021; A63C 17/01
  See application file for complete search history.

(56) References Cited

U.S. PATENT DOCUMENTS

| | | | | |
|---|---|---|---|---|
| 5,967,733 A * | 10/1999 | Cash | ................. | B60P 1/28 414/494 |
| 7,735,587 B1 * | 6/2010 | Stahlnecker | ............. | B62B 1/12 280/47.131 |
| 7,878,524 B1 * | 2/2011 | Hemmingsen | ....... | B62D 53/062 280/415.1 |
| 10,913,479 B1 * | 2/2021 | Cardentey | ................. | B62B 9/00 |
| 11,285,861 B1 * | 3/2022 | Fruechtenicht | ........... | B60P 9/00 |
| 2004/0129464 A1 * | 7/2004 | Arling | .................. | B62K 11/007 180/7.1 |
| 2004/0262871 A1 * | 12/2004 | Schreuder | ............... | B60P 3/007 280/87.1 |
| 2005/0168004 A1 * | 8/2005 | Vandewinckel | ....... | B62D 51/04 296/26.12 |
| 2011/0000731 A1 * | 1/2011 | Boeckler | ............... | E04H 4/1636 180/220 |
| 2011/0193304 A1 * | 8/2011 | Turner | ................... | B62B 3/009 280/37 |
| 2012/0013089 A1 * | 1/2012 | Reeves | ................. | B62B 5/0026 280/47.26 |
| 2012/0013093 A1 * | 1/2012 | Frank | ...................... | B60D 1/66 280/79.11 |
| 2013/0033012 A1 * | 2/2013 | Arjomand | ............. | B62K 13/08 280/7.17 |
| 2015/0225007 A1 * | 8/2015 | Knepp | ...................... | B62B 3/08 280/47.18 |
| 2017/0143571 A1 * | 5/2017 | Wilson | .................. | B62B 3/003 |
| 2018/0009459 A1 * | 1/2018 | Johnson | ............... | B62B 5/0046 |
| 2019/0161190 A1 * | 5/2019 | Gil | .......................... | H04W 4/70 |
| 2019/0256119 A1 * | 8/2019 | Brilhante | ................ | B62B 3/004 |
| 2019/0344699 A1 * | 11/2019 | Radetzki | ............ | B62D 33/046 |
| 2020/0175471 A1 * | 6/2020 | Tsuruta | ............. | G06Q 10/0838 |
| 2020/0262496 A1 * | 8/2020 | Wilson | ...................... | B62B 5/04 |
| 2020/0346679 A1 * | 11/2020 | Kim | ...................... | B62B 5/0043 |
| 2021/0061336 A1 * | 3/2021 | Rowland | ............... | B62B 5/0053 |

FOREIGN PATENT DOCUMENTS

| | | | | |
|---|---|---|---|---|
| DE | 202010016119 U1 * | 3/2011 | ............ | B62B 3/008 |
| DE | 202011000280 U1 * | 5/2011 | ........... | B62B 3/0606 |
| DE | 202015107017 U1 * | 3/2016 | ............... | B62D 3/06 |
| EP | 1063122 A1 * | 12/2000 | ............ | B60P 1/6463 |
| JP | 6376580 B1 * | 8/2018 | | |
| JP | 2018156576 A * | 10/2018 | ......... | B60L 15/2036 |
| KR | 101525737 B1 * | 6/2015 | | |
| KR | 20160057668 A * | 5/2016 | | |
| KR | 20170122991 A * | 11/2017 | | |
| KR | 10-1961797 B1 | 3/2019 | | |
| KR | 101961797 B1 * | 3/2019 | | |
| WO | WO-9847736 A1 * | 10/1998 | ............... | B60G 5/00 |
| WO | WO-0115932 A1 * | 3/2001 | ............ | B60P 1/6463 |

OTHER PUBLICATIONS

Translated EP 1063122-A1 (Year: 2022).*
International Preliminary Report on Patentability dated Mar. 17, 2022, from application No. PCT/US2020/049559, 7 pages.
International Search Report and Written Opinion dated Dec. 15, 2020, from application No. PCT/US2020/049559.

* cited by examiner

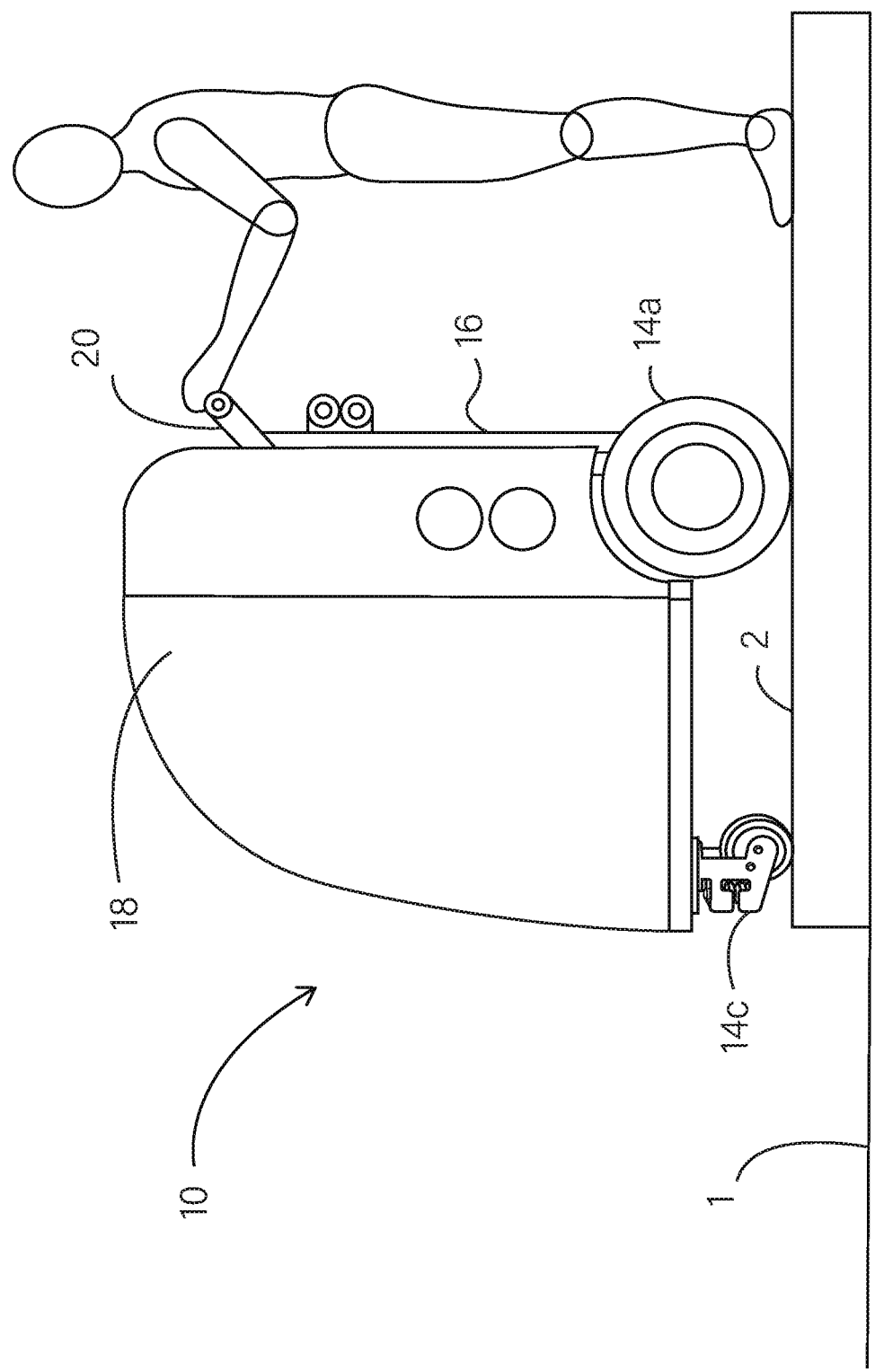

VEHICLE SYSTEMS AND METHODS

CROSS REFERENCE TO RELATED APPLICATIONS AND CLAIM OF PRIORITY

This application claims the benefit of U.S. Provisional Application No. 62/896,506, filed Sep. 5, 2019, the content of which is fully incorporated herein by reference in its entirety.

BACKGROUND

Vehicles and devices used for transportation, movement or delivery of packages, items and goods have taken many forms, often dictated by the environment and context of use. Trucks, vans and other large, motorized vehicles can have large cargo areas for carrying large loads, and motors or engines for relatively large distances, but must stay on roads and can be difficult to maneuver through narrow city streets and alleys. Typical carts, dollies and hand trucks can assist with short distance movement and deliveries of smaller loads and, depending upon their size, can be taken on sidewalks, on narrow paths, through gates or doors, into buildings, up elevators, etc. However, typical carts, dollies and hand trucks are manually pushed or pulled, and have a limited practical travel distance and a limited travel speed.

Certain delivery equipment and vehicles may be practical for some contexts of transportation or delivery of packages, items and goods, but impractical for other contexts. Accordingly, it is a common practice for delivery personnel to transport or carry multiple types of delivery equipment, to accommodate various transportation and delivery contexts. It is also common practice to employ large trucks or other vehicles on delivery and transportation routes involving multiple delivery stops, which can adversely affect traffic conditions and traffic flow.

For example, in a typical inner-city delivery process, a truck carrying a load of packages, items or goods to be delivered to one or more locations may be driven by a designated person (driver) over a distance, to a designated delivery address. The driver may temporarily park the truck near the location of the designated delivery address (or at a close or closest available location to park the truck). In some city streets, it is common for delivery drivers to temporarily park a delivery truck in a driving lane of a street or alley (e.g., double parked or in a no-parking zone), blocking traffic flow.

With the truck temporarily parked, the driver may take one or more packages, items or goods from the cargo area of the truck and carry those packages, items or goods a further distance, for example, to a door of a building, into a building, up an elevator, or in other areas that cannot be reached by the truck. In some contexts, the driver may carry a cart or dolly in the cargo area of the truck, and use that cart or dolly to carry one or more of the packages, items or goods that further distance. Meanwhile, the delivery truck remains parked, possibly blocking traffic, and possibly holding other packages, items or goods to be delivered to other addresses. After delivering one or more of the packages, items or goods to the designated delivery address, the driver may then return to the parked truck and drive the truck to another designated delivery address, to carry out a similar delivery operation.

The above-discussed delivery process can be inefficient in many ways, particularly in the context of last mile deliveries. The process requires maneuvering a relatively large vehicle (truck or van) to each designated delivery location. The process may require or result in the driver temporarily parking the vehicle in a location that blocks traffic at one or more (or each) delivery location. The process requires the driver to leave the vehicle with other packages, items and goods in its cargo area (possibly unattended), while the driver carries one or more packages, items or goods to a designated delivery address. The process can require a driver (or more than one person) to unload heavy cargo from a cargo area of a truck or transfer heavy cargo from the cargo area of the truck to a cart or dolly at each delivery location, which has contributed to incidents of personnel injury, fatigue or accidents. The process can result in generation and spreading of pollution (e.g., from combustion of diesel or other fuels used by the truck while moving and while idle). The process can involve inefficient usage of energy or fuel, as the truck is driven around the city, from one delivery location to another. The process does not necessarily accommodate differing delivery protocols needed or beneficial for delivering different or specific types of packages, items or goods (e.g., food items, drug or medical items). The process does not necessarily accommodate certain delivery conditions (road or other environmental conditions) that can adversely affect the quality of the delivered packages, items or goods.

The above comments relate to some of the limitations of current systems and devices commonly used for transporting and delivering packages, items and goods. Example embodiments of the present invention are described herein and may include examples configured to address some or all of the limitations discussed above. Other examples are configured for providing other functions and improvements. The above information disclosed in this Background section is for enhancement of understanding of the background of the invention, and therefore, it may contain information that does not constitute prior art.

SUMMARY

One or more examples and aspects described herein relate to vehicles and devices that may be used for transportation, movement or delivery of packages, items and goods, and processes of making and using such vehicles and devices.

An example of a vehicle system includes a chassis, a plurality of wheels coupled to the chassis and supporting the chassis for rolling on a surface, a riding platform coupled to the chassis, the riding platform for supporting a user behind the chassis when the riding platform is in a downward pivoted state, and a linkage connecting the riding platform to the chassis, for selective pivotal motion relative to the chassis between an upward pivoted state in which the riding platform is pivoted into a position to allow a user to walk behind the chassis.

Further examples of a vehicle system further includes a container supported on the chassis, the container having an interior volume for holding one or more objects.

In further examples of a vehicle system, the container includes at least one lock that may be selectively locked in a closed state to inhibit access to the interior volume, or unlocked to allow access to the interior volume.

In further examples of a vehicle system, the at least one lock is configured to be selectively locked or unlocked in response to a wireless signal.

In further examples of a vehicle system, the plurality of wheels comprises a pair of rear wheels and one or more front wheels, wherein the rear wheels have a larger diameter than the front wheels.

Further examples of a vehicle system includes a handle connected to the chassis, for allowing a user to tilt the chassis back to balance on the pair of rear wheels.

In further examples of a vehicle system, the plurality of wheels comprises one or more front wheels mounted on a rotatable castor.

Further examples of a vehicle system include at least one motor coupled to one or more of the wheels, for providing a drive force for moving the vehicle.

In further examples of a vehicle system, the one or more motors comprises at least one hub motor in or on the hub of one or more of the wheels.

Further examples of a vehicle system include a container supported on the chassis, the container having one or more ports for receiving a battery or other power source to provide electric power to the one or more motors when received within the one or more ports.

Further examples of a vehicle system include a container supported on the chassis, the container having a plurality of ports for receiving a battery to provide electric power to the one or more motors when the battery is received within the one or more ports, at least one of the batteries being accessible and removable from the ports, while one or more other batteries remain in the one or more ports and are sufficient to drive the motor of the vehicle.

Further examples of a vehicle system include electronics for operating the one or more motors for automated driving of the chassis.

Further examples of a vehicle system include one or more sensors and one or more communication devices supported by the chassis, for sensing one or more conditions of the vehicle system, a user of the vehicle system or an environment in which the vehicle system is located.

Further examples of a vehicle system include a trailer having a frame or platform and a plurality of wheels connected to the frame or platform for supporting the frame or platform for rolling on the surface; and a linkage structure for selectively coupling the trailer to the riding platform.

Further examples of a vehicle system include at least one container supported on the frame or platform of the trailer, the at least one container having an interior volume for containing one or more objects.

Further examples of a vehicle system include at least one container lifting system supported on the frame or platform of the trailer, for selectively lifting the container off of the frame or platform of the trailer.

In further examples of a vehicle system, the at least one container comprises a collapsible container that is selectively collapsible from an expanded state to a collapsed state.

Further examples of a vehicle system include a container supported on the chassis, the container having a cooling system for cooling an interior volume of the container, or a heating system for heating the interior volume of the container.

Further examples of a vehicle system include a container supported on the chassis, the container selectively collapsible or foldable from an expanded state to a collapsed or folded state while being supported on the chassis, wherein the container exposes a portion of the chassis when the container is in the collapsed or folded state, and the container covers that portion of the chassis when the container is in the expanded state.

In further examples of a vehicle system, the portion of the chassis that is exposed when the container is in a collapsed or folded state provides a support surface for supporting one or more other objects.

In further examples of a vehicle system, the one or more other objects comprises at least one of a chair, a bench, or a second container.

In further examples of a vehicle system, the chassis is configured to nest with one or more other chassis having a similar construction, when the container is in the collapsed or folded state.

In further examples of the vehicle system, the container, the trailer, the cargo, or other portions of the vehicle includes at least one drone vehicle hub or drone platform on which one or more drone vehicles may be received or deployed.

Further examples of the vehicle system include the one or more drone vehicles held by the hub or drone platform.

BRIEF DESCRIPTION OF THE DRAWINGS

The above and other aspects and features of the present invention will become more apparent to those skilled in the art from the following detailed description of the example embodiments with reference to the accompanying drawings, in which:

FIGS. 14-35 are each side schematic views of various vehicle systems and components thereof, that include or employ a vehicle of the examples in FIGS. 1-13.

DETAILED DESCRIPTION

Figure 1:
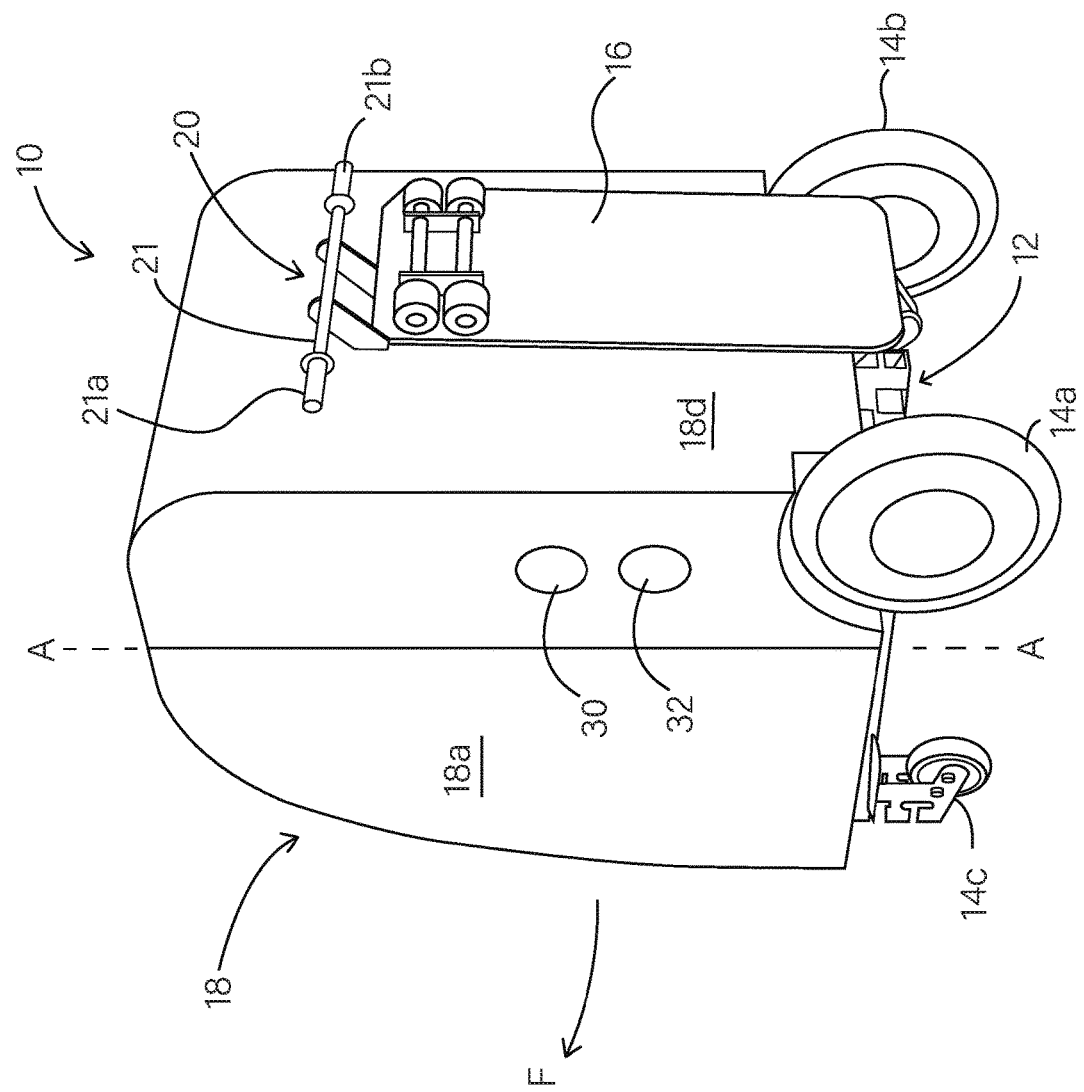
FIG. 1 is a rear-right-side perspective view of an example of a vehicle in a first mode or state according to various examples.

Hereinafter, example embodiments will be described in more detail with reference to the accompanying drawings. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

In the drawings, the relative sizes of elements, layers, and regions may be exaggerated and/or simplified for clarity. Spatially relative terms, such as "beneath," "below," "lower," "under," "above," "upper," "front" and "rear" and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Example embodiments described herein relate to various vehicle systems and components thereof. In particular examples, a vehicle and other components are configured to operate individually or together, to provide a single purpose vehicle system, or a multi-purpose or multi-mode vehicle system. In certain examples, the vehicle system may be configured in any one of multiple possible modes or states, for providing transportation or delivery of packages, goods, equipment, other containers or vehicles, or other items. In certain examples, the vehicle system is configured to be transformed between multiple modes or states (from one mode or state to another mode or state), where each mode or state may provide different advantages relative to other modes or states, for certain contexts of transportation or delivery. In certain examples, various components of the vehicle may be configured modularly, such that component modules may be easily added, removed or replaced, as needed, for example, to accommodate various different or desired delivery needs (e.g., to accommodate various types of deliverable cargo, delivery locations, road or other environmental conditions, drivers/operators, or combinations thereof). Alternatively or in addition, the vehicle (or components thereof) may include one or more electronic sensors, communication devices for wireless communication (e.g., with a remote station, central station, users or other vehicles), electronic processors, electrical power supplies, electrical power outlets or combinations thereof, for providing one or more (or a combination of) vehicle monitoring or control operations, road or environment monitoring operations, power supply operations or other functions as described herein.

In particular examples, the vehicle system may be configured into a particular mode or state that is practical or best for accommodating a particular transportation, delivery or service context. In certain examples, the vehicle system may be configured for transportation or delivery of a variety of different types or sizes of packages, goods, equipment, other containers or vehicles, or other items. In certain examples, the vehicle system may be configured for transportation or delivery over relatively large distances, on public streets, and in traffic with other vehicles. In certain examples, the vehicle system may be configured for transportation or delivery in relatively small or tight areas, such as, but not limited to, office building interiors and hallways, sidewalks, paths, alleys or the like. In certain examples, the vehicle system may be included in and operate to provide a detachable remote access container system (DRACS). In certain examples, the vehicle system is readily adaptable (for example, by adding, removing or replacing selectable modules on the vehicle) to accommodate various different types of delivery or service needs. These and other advantages will become apparent from the descriptions and drawings provided herein.

A vehicle 10 (also characterized herein as a vehicle system 10) according to an example embodiment is described with reference to FIGS. 1-6. The vehicle 10 includes a chassis 12, a set of wheels 14a-d, a riding platform 16 and, in some examples, a container 18.

Figure 2:
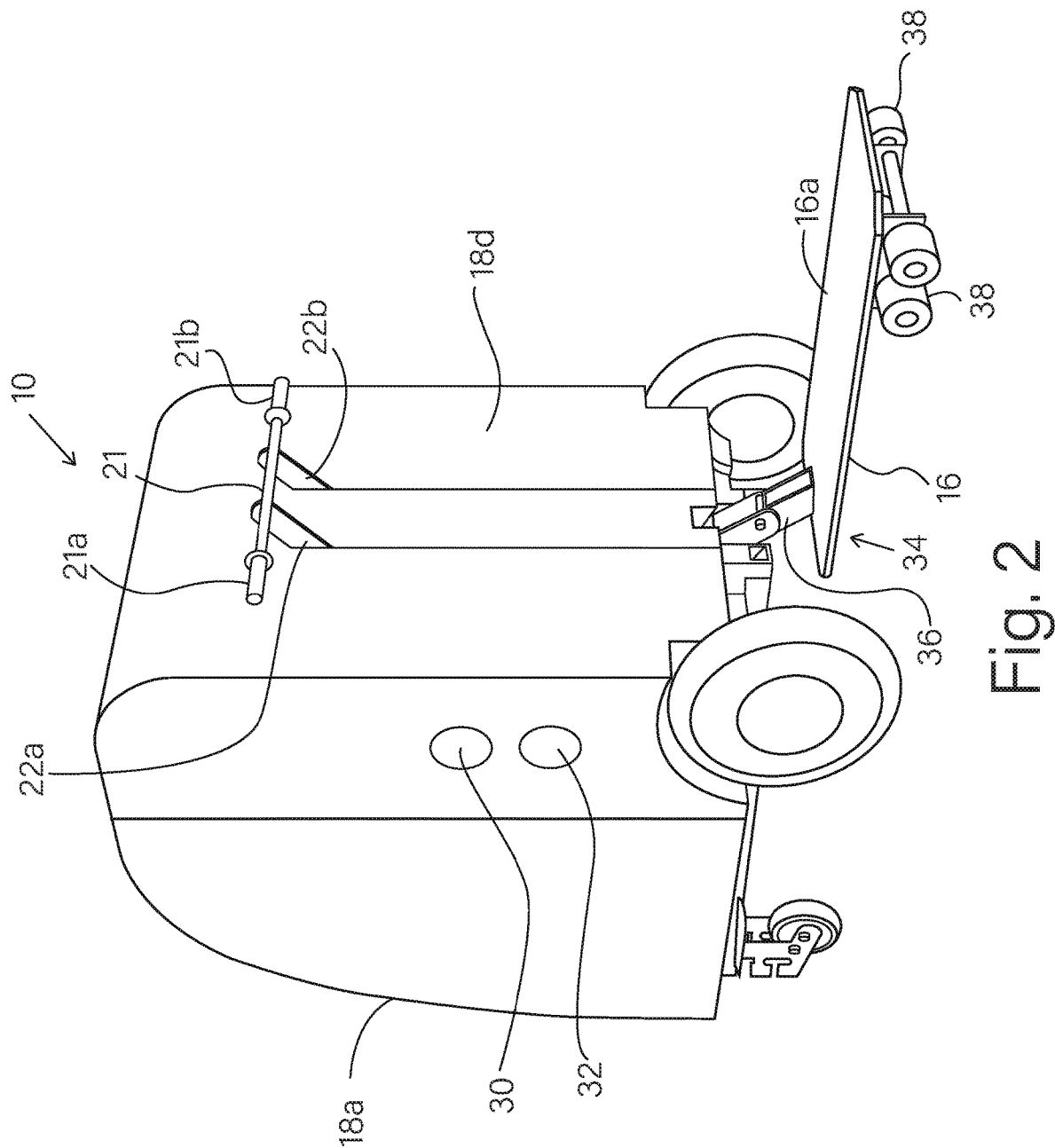
FIG. 2 is a rear-right-side perspective view of the vehicle of FIG. 1, in a second mode or state.

The chassis 12 holds and supports the container 18. In some examples, the container 18 may be a module that can be added to, removed from, or replaced on the chassis 12. In other examples, the container 18 is secured to the chassis 12 in a manner that is not intended to be removed during normal use and operation of the vehicle. The wheels 14a-d are connected to the chassis 12, to allow the chassis 12 (while supporting the container 18) to be moved by rolling the chassis along a surface such as, but not limited to, a road, sidewalk, pathway, floor or other generally flat surface. The riding platform 16, when pivoted downward as shown in FIG. 2, provides a step surface on which a user may place one or both feet. In some examples, one or more cushions or bumpers may be provided on or around the chassis, the riding platform 16 or the container 18 (or combinations thereof) to reduce or minimize damage to walls, elevators, other vehicles, or the like, that may come into contact with the vehicle 10.

Figure 3:
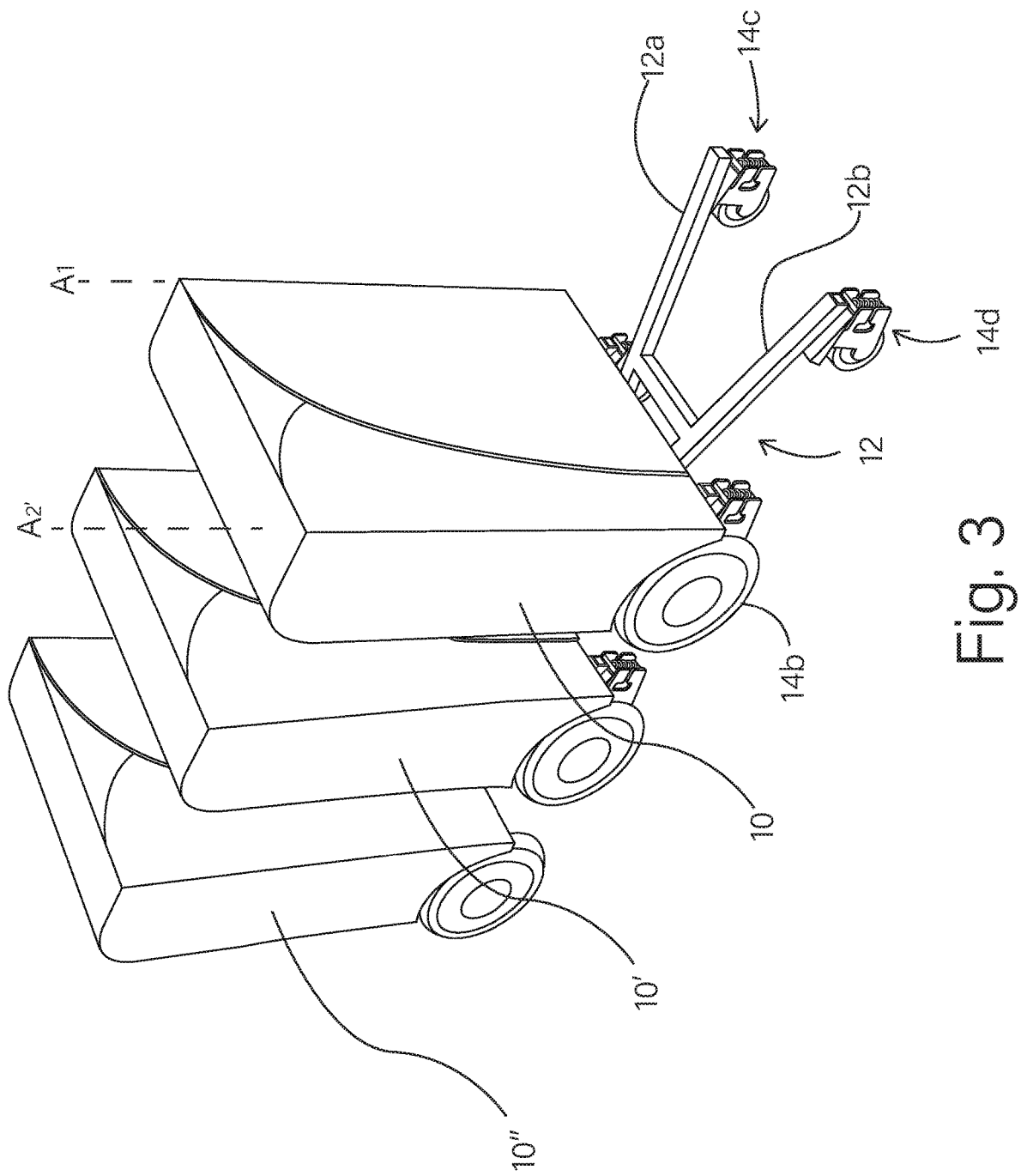
FIG. 3 is a front-left-side perspective view of multiple vehicles of the type shown in FIG. 1, in a third mode or state and nested together.

Vehicle Modes or States:

In some examples, the vehicle 10 may be adjustably configured into any one of several different configuration modes or states. The vehicle 10 may be configured in various different configuration modes or states, depending upon the intended context of use of the vehicle. For example, the vehicle 10 may be configured in a first mode or state (as shown in FIG. 1), for use as a push-cart style vehicle. The vehicle 10 may be configured in a second mode or state (as shown in FIG. 2), for use as a ride-on style vehicle. The vehicle 10 may be configured in a third mode or state (as shown in FIG. 3), for storage or transportation, or for nesting with one or more other vehicles (or any combination of those use contexts). In further examples described herein, the vehicle system may include additional components or modules, such as, but not limited to one or more of the example containers 18 or containers 78 described herein, one or more trailers, one or more further containers, one or more vibration isolation components, one or more flat-bed or pallet support panels or platforms, one or more electrical power supply systems, one or more electrical monitoring and communication systems, one or more air treatment systems (or any combination thereof), to provide additional modes or states of operation.

In FIG. 1, the vehicle 10 is configured in a first mode or state, in which the container 18 is in an unfolded or expanded state, to define an enlarged interior volume for carrying one or more items. In the first mode, the container 18 may be configured to contain and hold one or more packages, goods, equipment, other containers or vehicles, or any other items that can fit within interior volume of the container 18. Also, in the first mode or state of the vehicle 10, the riding platform 16 is pivoted upward in a stowed state. In the first mode or state, a handle 20 is exposed and accessible to a user, to enhance the ability of a user to grip, push and steer the vehicle 10.

In the first mode or state, the vehicle 10 may be operated as a push-cart style vehicle, where a user (not shown) stands or walks behind the vehicle 10 (on the handle 20 side of the vehicle), while gripping the handle 20 and while pushing the vehicle in a forward direction F. Also in the first mode or state, the user may tilt the cart back on its rear wheels 14a and 14b, to raise the front wheels 14c and 14d off of the ground (or other surface), and push or maneuver the vehicle 10 on two wheels (much like a hand truck or two-wheel dolly).

In the first mode or state (as shown in FIG. 1), the user may steer the vehicle 10 to make a left turn or a right turn, while pushing the vehicle 10 in the forward direction F, by imparting different forces on the left or right side of the handle 20 (for example, similar to the operation of a push cart or shopping cart). In some examples (as described below), additional mechanisms may be employed to provide a steering assist operation, to make it easier for the user to steer the vehicle 10. In some examples, the vehicle 10 may include one or more motors (as described below) coupled to provide driving power to drive one or more of the wheels 14a-d, to drive the vehicle 10 or to assist the user in pushing the vehicle 10 in the forward direction F. In other examples, the vehicle 10 has no motor and is driven solely by power from the user pushing the vehicle.

In FIG. 2, the vehicle 10 is configured in a second mode or state. The second mode or state (shown in FIG. 2) is similar to the first mode or state (shown in FIG. 1), but has the riding platform 16 in a downward pivoted, or operational state. The riding platform 16 has a flat surface 16a that faces upward when the riding platform 16 is pivoted downward into an operational state, as shown in FIG. 2. In some examples, the upper surface 16a of the riding platform 16 provides a step surface on which a user may place one or both feet, while moving the vehicle (for example, similar to the operation of a skate board or stand-on scooter). In some examples, a user (not shown) may grip the handle 20 and place one or both feet on the upper surface 16a of the riding platform 16, while maneuvering or operating the vehicle 10. In particular examples, the container 18 has a height dimension that is sufficiently low to allow the user (or a typical user) to view (in the forward direction F) over the top of the container 18, while the user stands on (or partially on) the riding platform 16. For example, the maximum height of the container 18 may be approximately 3 to 4 feet above the height of the upper surface 16a of the riding platform 16. In other examples, the container may be any other suitable size, height or shape.

Figure 4:
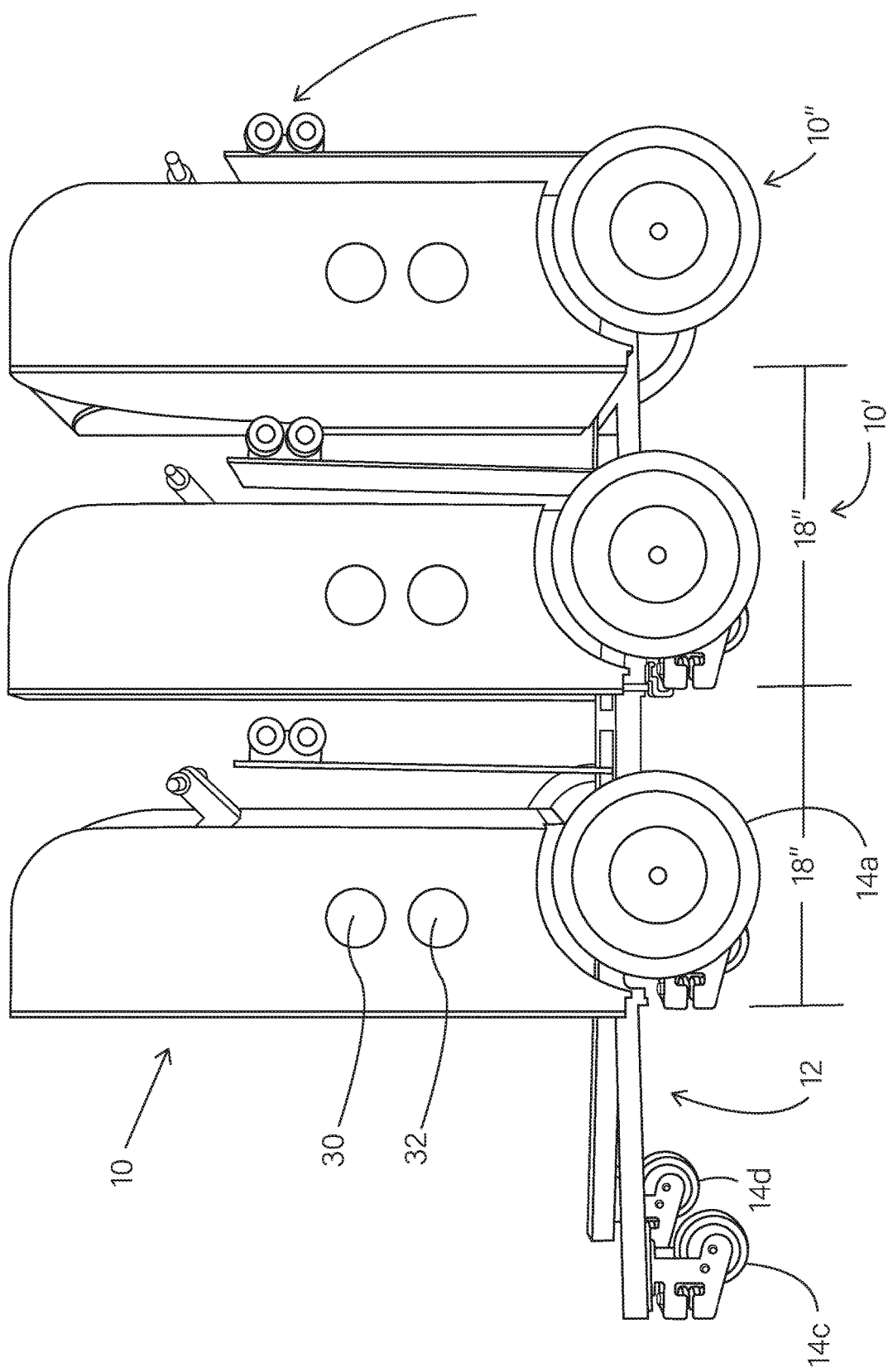
FIG. 4 is another perspective view of the multiple vehicles in FIG. 3, in a third mode or state and nested together.
Figure 5:
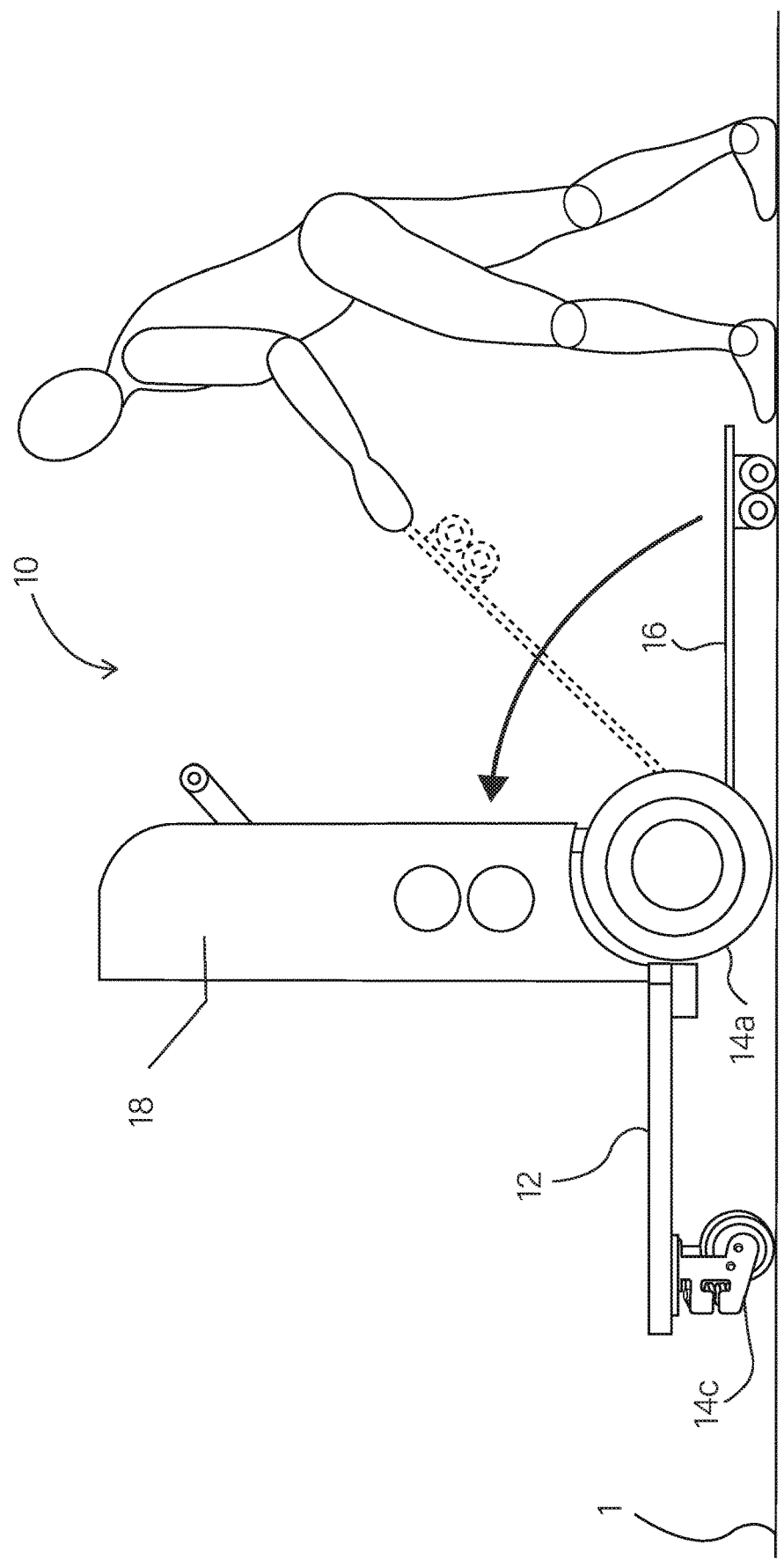
FIG. 5 is a side view of a vehicle of FIGS. 1-4, being transformed into the third mode or state.

In FIGS. 3 and 4, the vehicle 10 is shown, with two other, similar vehicles 10' and 10", where each of the vehicles 10, 10' and 10" is configured in a third mode or state. The third mode or state (shown in FIGS. 3 and 4) is similar to the first mode or state (shown in FIG. 1), but has the container 18 in a folded or collapsed state. In FIGS. 3 and 4, the vehicles 10, 10' and 10" are each in the third mode or state, and are nested together, for storage or transportation. In some examples, the vehicle 10 may be transformed into the third mode or state, by folding the container 18 into a folded or collapsed state and by pivoting the platform 16 upward, as shown in FIG. 5.

Figure 6:
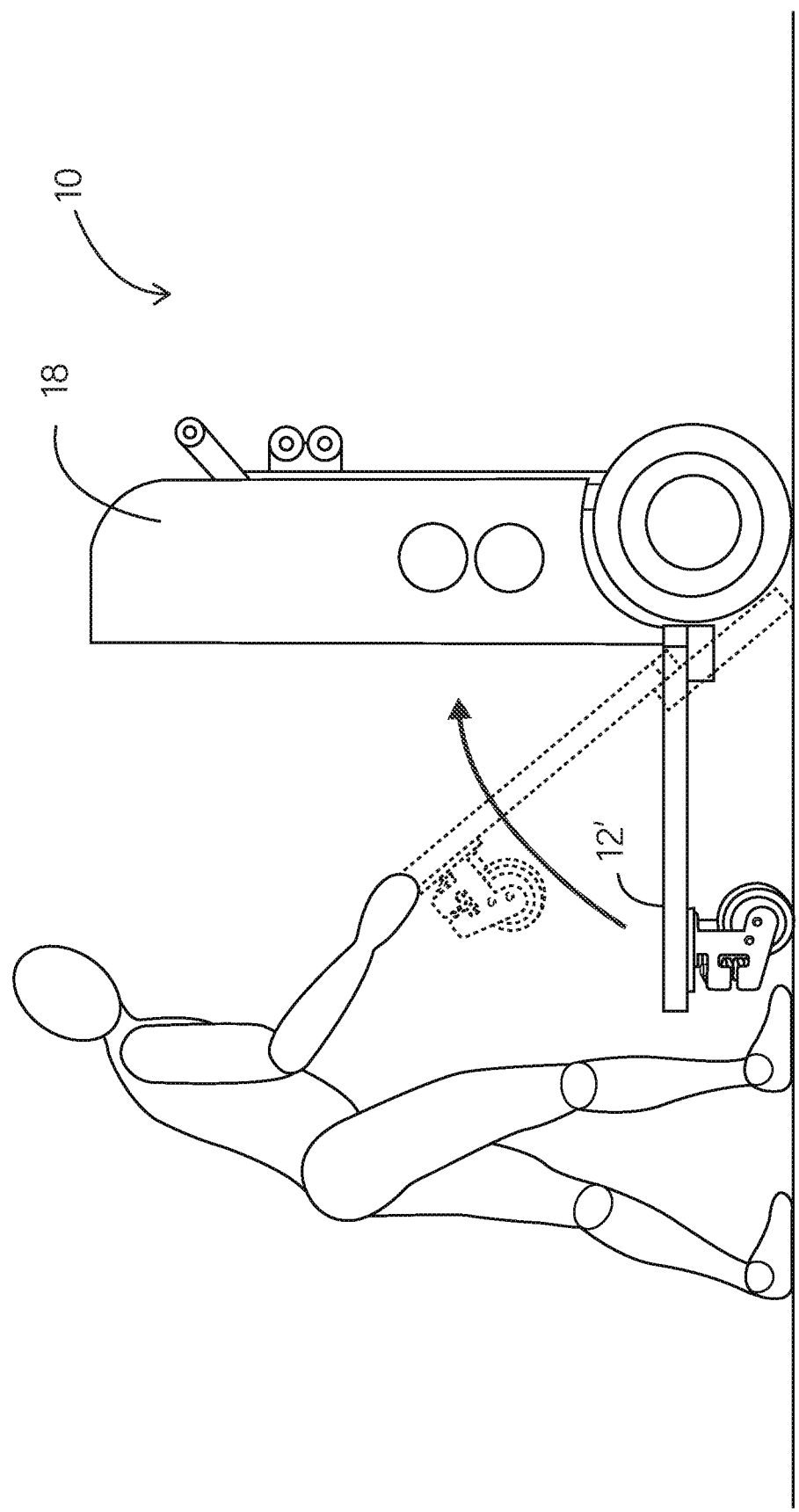
FIG. 6 is a side view of a vehicle of FIGS. 1-4, being transformed into a fourth mode or state.
Figure 7:
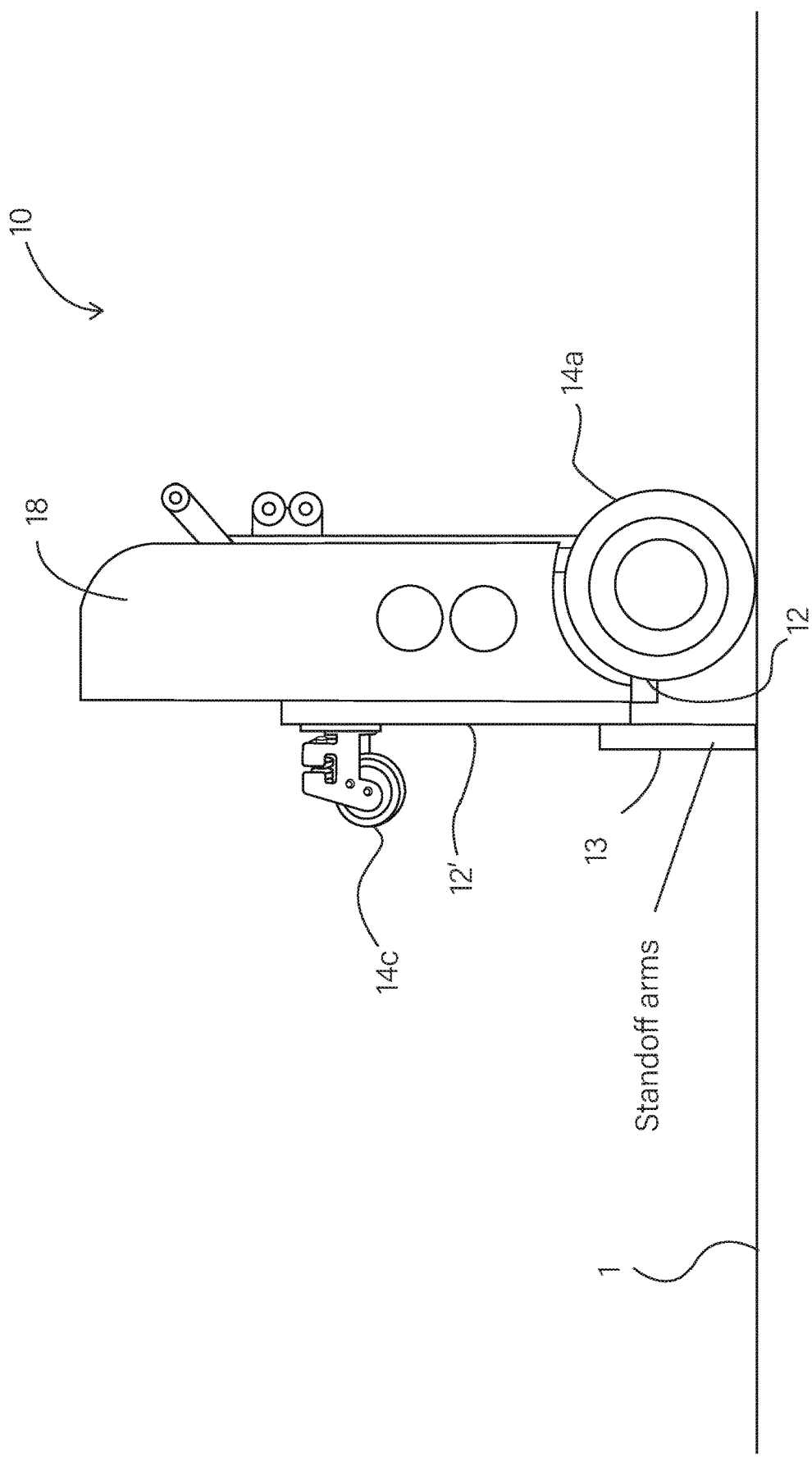
FIG. 7 is a side view of a vehicle of FIGS. 1-4, in the fourth mode or state.

In further examples, the vehicle 10 may be transformed into a fourth mode or state (shown in FIG. 7) which is similar to the third mode or state, but where a front portion 12' of the chassis 12 is pivoted upward. In the fourth mode or state (shown in FIG. 7), the vehicle 10 is further compacted (relative to the third mode or state), for storage, transportation, or other purposes. For example, from the third mode or state of the vehicle 10, the front portion 12' of the chassis 12 may be pivoted upward (as shown in FIG. 6), to orient the front portion 12' of the chassis 12 in a generally vertical orientation, or generally compacted against the front of the folded container 18 (as shown in FIG. 7). In those examples, the front portion 12' of the chassis 12 may be connected with the rest of the chassis 12 by any suitable hinge or folding connection structure.

In some examples, one or more legs (or standoff arms) 13 are provided on the front portion 12' of the chassis 12, to extend generally vertically downward and contact the ground 1 (or other surface), when the front portion 12' of the chassis 12 is folded upward, as shown in FIG. 7. In that fourth mode or state, the leg(s) 13 cooperate with the rear wheels 14*a* and 14*b*, to support the vehicle in the compacted, standing orientation as shown in FIG. 7.

Figure 8:
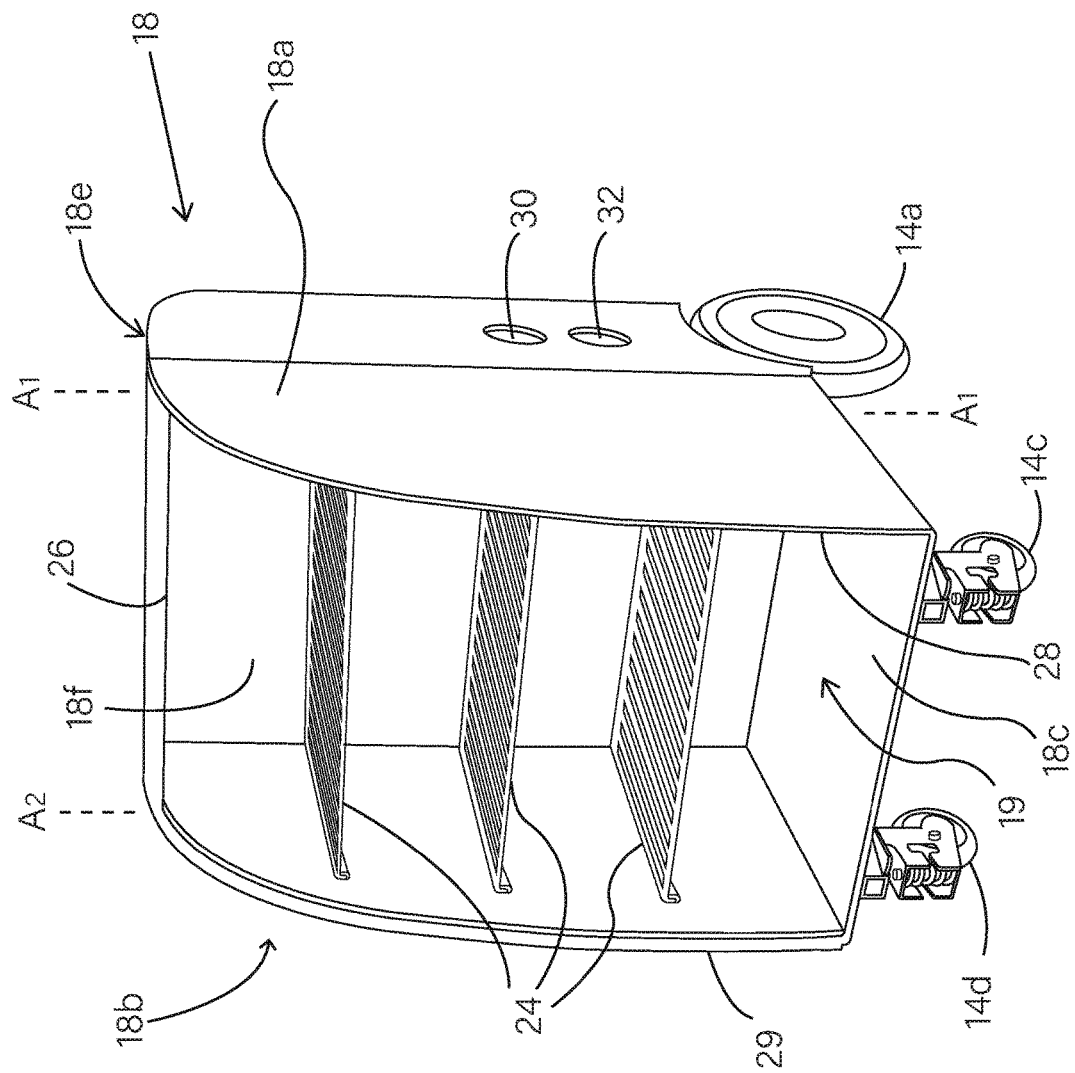
FIG. 8 is a front-right-side perspective view of the vehicle of FIG. 1, with the container door open.
Figure 9:
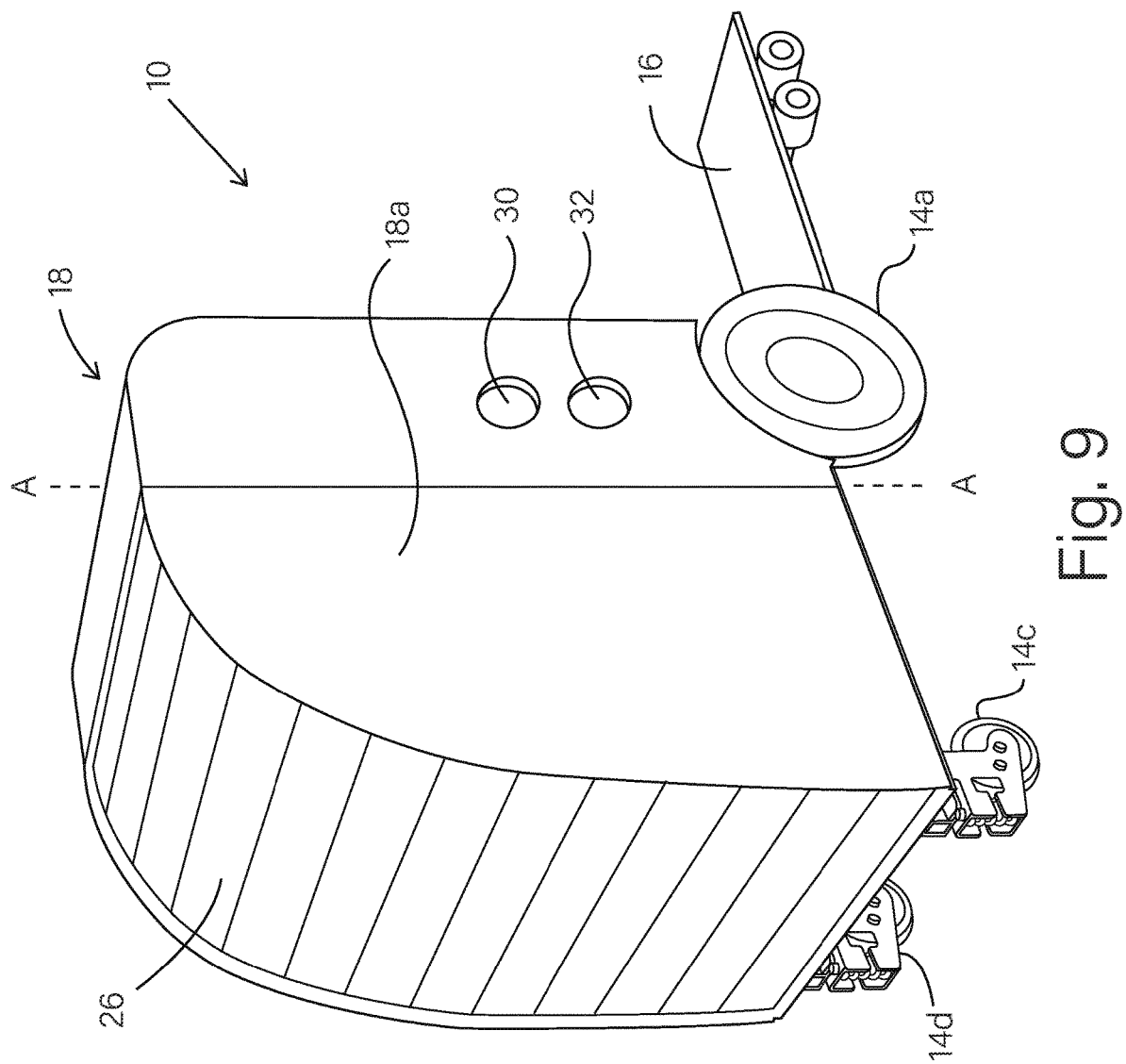
FIG. 9 is a front-right-side perspective view of the vehicle of FIG. 1, with the container door closed.

In FIG. 8, the vehicle 10 is shown in the first or second mode or state, but with the door of the container 18 in an opened position, to show an interior volume 19 of the container 18. In FIG. 9, the door is shown in a closed position. The container 18 is configured to carry one or more cargo objects (packages, goods, equipment, other containers or vehicles, or other items). In certain embodiments, the container 18 has a shape suitable for holding one or more objects of various types, sizes or shapes. In other embodiments, the container 18 (or the interior of the container 18) has a shape and size that is specifically configured or custom configured for holding one or more of a particular object or type of objects.

In some examples as shown in FIG. 8, one or more racks or shelves 24 may be located within the interior volume 19 of the container 18. In some examples, the shelves 24 may be adjustable in height or removable (or both) to adjust the carrying capacity of the interior volume 19 of the container 18. In other examples, the interior volume 19 of the container 18 may be devoid or substantially devoid of racks, shelves or other structures, to provide an unobstructed interior space for holding objects of various sizes or shapes. In yet other examples, the interior volume 19 of the container 18 may be provided with other configurations of one or more racks, shelves, brackets, straps, clips, or other mechanisms, or combinations, for supporting or holding one or more objects within the interior volume of the container 18 (or partially within the interior volume of the container 18).

In particular examples, the vehicle 10 may take on any one of any of the modes or states (including the first, second, third or fourth mode or state) and may be selectively transformed from one mode or state into another mode or state by selectively folding or unfolding the container 18, selectively pivoting the platform 16 and selectively pivoting the front portion 12' of the chassis 12, as described herein. In other examples, the vehicle 10 may be configured according to one of the modes or states (such as the first, second, third or fourth mode or state) and is not transformable into other modes or states. In yet other examples, the vehicle 10 may be configured to take on any two, or any three of the modes or states (including any two or three of the first, second, third or fourth modes or states) or other modes. In certain examples, one or more components or modules, such as, but not limited to those described herein may be provided on the vehicle 10 or the vehicle system for one or more additional or alternative modes or states.

The Container:

In certain embodiments, the container 18 may have a general purpose outer configuration, or may have a stylized or customized outer configuration of shape, coloring, marking, or combination for any suitable purpose including, but not limited to marketing, communication of information, or artistic expression. For example, the container 18 may have a configuration corresponding to the marking, shape or coloring of certain products, product packaging, mascots, trademarks or logos.

In certain examples, the container 18 is configured (as to one or more of its size, shape, arrangement of interior racks, shelves or other interior structures, electrical power supplying capability, thermal insulation, heating, refrigeration, air flow or other environmental controls, or the like) for accommodating many different types of cargo objects, in general. In other examples, the container 18 is configured (as to one or more of its size, shape, arrangement of interior racks, shelves or other interior structures, electrical power supplying capability, thermal insulation, heating, refrigeration, air flow or other environmental controls, or the like) for accommodating one or more specific or particular cargo object, or type of cargo object for delivery or services.

In certain examples, a vehicle system may include a chassis 12 and multiple available containers 18 (e.g., as separate, selectable modules), where each container 18 is configured to be selectively attached to (or detached from) the chassis 12 and where each container 18 is configured to hold or accommodate a different cargo or a different type of cargo relative to each of the other containers 18. In such system examples, a user (or other personnel) may select one of the containers 18 (modules) suitable for a particular delivery or service activity and attach that selected container 18 to the chassis 12 to configure the vehicle 10 for the delivery or service activity. Accordingly, a vehicle system including a chassis 12 and multiple, different selectable containers 18 (selectable modules), may allow the vehicle 10 to be configured for any one of multiple different delivery or service needs, and subsequently re-configured for one or more different delivery or service needs, in a highly flexible manner.

In particular system examples, each container 18 or the chassis 12 (or both) may include a suitable connecting system for selectively connecting and disconnecting a selected container 18 to or from the chassis 12. In certain examples, the connecting system may include one or more of a latch, bracket, bolt, screw or other threaded connector, or the like, or combinations thereof, for selectively connecting or disconnecting each container 18 (individually) to the chassis 12. In certain examples, the connecting system includes one or more quick connection and quick release connector (such as, but not limited to a quick release latch), that allows a user (or other personnel) to quickly and easily connect a container 18 to the chassis 12 or release a container 18 from a connected state on the chassis 12.

In certain examples in which the container 18 includes electrical power consuming devices, the container 18 may include one or more (or plural) electrically conductive contacts or connectors that automatically align and electrically connect with one or more (or plural) corresponding electrically conductive contacts or connectors on the chassis 12 (or other component of the vehicle 10), when the container 18 is connected to the chassis 12 by the connecting system, to connect the power consuming devices in the container 18 with one or more electrical power sources on the chassis 12 (or on other component or module of the vehicle 10). Alternatively or in addition, an electrical connection of the container 18 to the chassis 12 (or other components or modules of the vehicle 10) as described herein may provide a connection for electrical signals between one or more sensors in or on the container 18 and one or more processing, communication or other electrical components on the chassis 12 (or on other components or modules of the vehicle 10). Example sensors, communication devices and other electric devices that may be included on the chassis 12 (or on other components or modules of the vehicle 10) are described below with reference to FIG. 10.

In certain examples, the container 18 may include wheels (not shown) that allow the container 18 to be rolled on the ground or a flat surface. In those examples, the container 18 may be loaded (e.g., pre-loaded) with cargo at a warehouse, restaurant, or other logistics facility. Then, after the container 18 is loaded with cargo, the container 18 may be rolled to a nearby chassis 12 and loaded and mounted onto the chassis 12, for transportation.

With reference to the drawings of FIGS. 1-9, an example container 18 is described. However, as noted herein, the container 18 may be configured (as to one or more of its size, shape, arrangement of interior structures, electrical power supplying capability, thermal insulation, heating, refrigeration, air flow or other environmental controls, or the like) in any suitable manner based on the general or specific delivery or service activity for which the vehicle 10 is to be used. The example container 18 in FIGS. 1-9 has right and left side walls 18a and 18b, a bottom 18c, a rear wall 18d and a top wall 18e that define exterior surfaces of the container 18, when the container 18 is in the first or second modes or states (shown in FIGS. 1, 3, 8 and 9). The container 18 has an opening on its front end (facing outward and toward the left of the page in FIG. 8) and a door 26 for selectively opening and closing the front opening when the container 18 is in the first or second modes or states (shown in FIGS. 1, 3, 8 and 9). The door 26 is shown in an open position, in FIG. 8. In particular examples, when in a closed position (as shown in FIG. 9), the door 26 fully covers and closes the front opening of the container 18. In other examples, the door 26 may be configured to partially cover the front opening of the container 18, or may be configured with one or more windows or openings through which one or more objects within the container 18 may be reached or viewed from outside of the container 18, when the door 26 is in a closed position. In such examples, the one or more windows or openings may include a further door or closure structure for selectively opening and closing the window.

In certain examples as shown in FIGS. 8 and 9, the door 26 may be a sliding door that selectively slides along rails on or in the top and rear walls 18e and 18d. In such examples, the door 26 may have side edges or protrusions that extend laterally outward toward the right and left side walls 18a and 18b, and that fit into and ride along rails 28 and 29 on the side walls 18a and 18b, respectively, as the door 26 is slid between open and closed positions. In such examples, the door 26 may be made of a sufficiently flexible material (plastic, vinyl, sheet metal, composite material, or other suitable material) to allow the door 26 to bend and follow the shape of the top and rear walls 18e and 18d of the container 18, as the door 26 slides between a closed position and an open positon. In a sliding door configuration, the door 26 may include a handle (not shown) that allows a user to manually grip the door to manually slide it between open and closed positions. In other examples, the door 26 may have other suitable configurations, including, but not limited to other sliding configurations, hinged configurations in which one or more door panels are connected by hinges to one or more of the walls of the container 18, or removable panel configurations in which one or more door panels may be manually inserted or removed from the container 18.

In some examples, the door 26 includes a lock for selectively locking the door 26 in the closed state and selectively unlocking the door 26 to allow the door to be opened. In some examples, the lock for the door 26 may include an electronic lock that is activated electronically. In some examples, the lock for the door 26 may be activated remotely (for example, from a remote station or other location), to control access to the interior volume of the container 18. In some examples, the lock for the door 26 may be controlled by electronics (described herein) to be activated (to change states between unlocked and locked states) by a wireless signal from a remote communication or a local communication device, such as, but not limited to a mobile smart phone or other mobile communication device that may be carried by the user or another person designated or authorized to unlock the door 26. The wireless communication signal connection between the lock of the door 26 (or electronics on the vehicle 10) and the remote communication or a local communication device may include any suitable wireless communication technology including, but not limited to Bluetooth, WiFi, radio frequency (RF), satellite, optical or the like.

In some examples, the lock or the door 26 (or both) is connected with electronics and at least one sensor (described herein) for detecting the locked or unlocked state of the lock, the open or closed state of the door 26 (or both), and for communicating the lock or door state (or both) to a remote station or other location. In such examples, electronics (described herein) may be configured to provide and transmit a signal to a remote station or other location, indicating a lock state or a door opened or closed state, for example, upon a change of state or at a defined or random time or times.

The container walls 18a-18e may be made of any suitable material, including but not limited to suitably rigid plastic, metal, wood, composite material, or any suitable combination of such materials. In certain examples, one or more (or each) of the container walls 18a-18e is configured to provide an enhanced thermal insulation, to help thermally insulate the interior of the container 18 and minimize heat transfer into or out of the container 18. For example, one or more (or each) of the container walls 18a-18e may have a double wall (or other multi-wall) structure that includes an inner wall and an outer wall separated by a gap. In certain examples, the gap between the inner and outer walls contains air. In other examples, the gap is evacuated and contains a vacuum. In other examples, the gap contains one or more layers or panels of thermal insulating material such as, but not limited to a polymeric or elastomeric foam, vacuum insulated panels, thermal insulating coatings or materials in the container or on one or more of the container walls, or the like. In other examples, one more (or each) of the container walls 18a-18e has a solid wall configuration, with a single wall that provides an inner surface and an outer surface. In any of the above examples, the inner surface or the outer surface (or both surfaces) of one more (or each) of the container walls 18a-18e may be coated or otherwise provided with one or more layers of material for enhancing the thermal insulation properties of the wall(s).

In certain examples, one or both of the side walls 18a and 18b may include one or more windows or openings through which one or more objects within the container 18 may be reached or viewed from outside of the container 18. In such examples, the one or more windows or openings may include a further door or closure structure for selectively opening and closing the window.

In the above example in which the door 26 is mounted to selectively slide along rails on or in the top and rear walls 18e and 18d, the top and rear walls may include a double wall configuration, in which the gap between the inner and outer walls is configured to receive the sliding door 26, when the door 26 slides to the open position (shown in FIG. 8). In such examples, the rails 28 and 29 may extend into the gap in the top and rear walls 18e and 18d, as well as along or near the edges of the side walls 18a and 18b at the front opening of the container 18, to guide the door 26 along its sliding motion.

In certain examples, the container 18 may include a first or front section and a second or rear section, separated by at least one interior wall 18f. In certain examples, the front section and the rear section of the container 18 are connected together or are provided as a unitary structure (or a single, unitary module). In other examples, the front section of the container 18 may be separable from the rear section of the container 18 (such as two separate modules). In yet other examples, the rear section may be formed as or coupled to the chassis 12, separately from the front section of the container 18. In any of those examples, the front section of the container 18 may contain and define the interior volume 19 for holding objects, as discussed above. The rear section of the container 18 is between the interior wall 18f and the rear wall 18d, and may contain one or more batteries or other power sources, for providing electric power to one or more motors discussed below. In certain examples, each power source comprises one or more lithium ion battery, or other battery or power source configured to provide sufficient power to operate motors and other electronics described herein. In some examples, the battery may include one or more 48 volt, lithium ion batteries that provide a suitable travel range (such as, but not limited to a range of up to 50 miles). In other examples, other suitable batteries and travel ranges may be employed.

In certain examples, one or both of the side walls 18a and 18b in the rear section of the container 18 includes one or more ports or receptacles (such as, but not limited to the two ports 30 and 32 shown in FIGS. 1, 2, and 4-9) for receiving one or more batteries. Each port 30 and 32 has an open end through which a battery (or other power source) may be selectively received or withdrawn, from outside of the container. In certain examples, each port 30 and 32 may include a cylindrical receptacle into or out of which a cylindrical battery (or other power source) may be manually slid, to be received in or withdrawn from the receptacle. While the example in FIGS. 1-9 includes two ports 30 and 32 and cylindrical shaped batteries and ports, other examples may include a single port or more than two ports, or other suitable shaped ports for receiving a corresponding number of batteries (or other power sources) and battery shapes. In other examples, the battery ports (and battery shapes) may be rectangular cuboid shaped, panel shaped, or have other suitable shapes. In certain examples, the vehicle includes multiple ports or a rack of ports that allow for selecting and installing any suitable number of batteries (to expand or reduce the power supply), based on an expected scale of operation of the vehicle. In certain examples, one or more (or each) port 30 and 32 may include a door or closure structure, a locking mechanism, or a combination thereof, for securing, holding or inhibiting theft of a battery (or other power source) within the port. In other examples, the one or more ports or a rack of ports, platforms, support surfaces or further containers may be provided on the chassis 12 for holding one or more batteries, instead of or in addition to ports 30 and 32 on the container 18.

One or more (or each) of the ports 30 and 32 may include electrical connections or contacts that electrically connect a battery (or other power source) to provide power to one or more motors and other electronics on the vehicle 10, when the battery (or other power source) is received within the port. In some examples, the vehicle 10 is configured with multiple ports (such as ports 30 and 32, or further ports), that carry a corresponding number of batteries (or other power sources), where each (or a plurality) of the batteries (or other power sources) is (are) connected to provide power to the vehicle 10, such that the vehicle 10 may draw power from multiple batteries (or other power sources) as needed. In certain examples, the power requirements of the vehicle 10 may be such that the vehicle 10 may be fully operational with one battery (or other power source), or with less than all of the batteries in the ports. In such examples, one or more of the ports on the vehicle 10 may contain a battery (or other power source) that can be removed from the vehicle 10, for example, to provide or exchange (swap) a sufficiently charged battery (or other power source) to or with another vehicle in the field, while the vehicle 10 continues to be powered by one or more other batteries (or other power sources) in one or more other ports on the vehicle 10.

In certain examples, electrical connections or contacts electrically connect to a battery (or other power source, such as, but not limited to the solar power sources described herein) on the vehicle 10, and are electrically connected to one or more power outlet sockets (or other suitable electrical connector), for allowing the vehicle to provide a power source to an external power-consuming device or to a container 18 on the vehicle 10 (or both). In such examples, the one or more power outlet sockets or connectors allow an operator or user to electrically connect a power cable or electrically powered device to the power outlet, and receive electrical power from the one or more batteries on the vehicle 10. In further examples, the container 18 (or other component of the vehicle 10) may include a power converter (AC/DC) to convert the DC battery power from the batteries to an output AC electrical power for powering standard AC devices. In other examples, electronics on the vehicle allow for a power cord to be connected from an external power source to the power outlet socket or connector, to supply power to the vehicle 10, for example, to power electronics on the vehicle 10 or to charge the one or more batteries (or both).

While certain examples described herein include one or more (or multiple) battery ports located in the container 18 (or in a rear section of the container 18), in other examples, the one or more batteries may be carried in one or more ports or a rack connected to the chassis, separate from the container 18.

In certain examples, the walls of the container 18 are relatively rigid and not foldable or collapsible, such that the container 18 maintains a shape and interior volume, as shown in FIGS. 1, 2, 8 and 9. In those examples, the vehicle 10 may be configured in one of the first or the second modes or states, and may be transformable between the first and second modes or states. However, in other examples, each of the side walls 18a and 18b of the container 18 is foldable along a respective folding axis or hinge axis $A_1$ and $A_2$, to also allow the vehicle to be selectively set or transformed to one or either of the third or fourth modes or states. In certain examples, each folding axis or hinge axis $A_1$ and $A_2$ is vertically oriented, such that a portion of each side wall 18a and 18b may be folded inward, toward the other side wall, to transform the vehicle 10 into the third mode or state, shown in FIGS. 3 and 4. The bottom wall 18c is foldable along a generally horizontal folding or hinge axis extending, for example, between the bottom wall 18c and the interior wall 18f. Accordingly, the bottom wall 18c may be folded upward, against the interior wall 18f before (or after) the side walls 18a and 18b are folded along the axes $A_1$ and $A_2$ to transform the container 18 into the third mode or state of the vehicle.

The folding or hinge axis $A_1$ or $A_2$ on each of the side walls 18a and 18b, and the folding or hinge axis of the bottom wall 18c may be provided by any suitable hinge or folding mechanism including, but not limited to a live hinge between front and rear panel sections of each side wall 18a and 18b, a standard or custom hinge device attached to the front and rear panel sections of each side wall 18a and 18b, or the like. In some examples in which the hinge or folding mechanism on the side walls 18a and 18b is a live hinge, the live hinge may be formed of or by the outer wall (or the inner wall) of a double-wall (or multi-wall) structure of the side wall 18a or 18b. For example, one of the walls (e.g., the outer wall or the inner wall) of the double-walled (or multi-walled structure) may be made of a flexible material and may extend continuously from the front panel section to the rear panel section and across the folding or hinge axis $A_1$ or $A_2$ of the side wall 18a or 18b, while the other wall(s) of the double-walled (or multi-walled) structure (e.g., the inner wall or the outer wall) is cut or otherwise terminated, perforated, machined, bent, or processed in other manners to provide a folding or hinge axis $A_1$ or $A_2$.

In some examples, the folding or hinge axis of the bottom wall 18c (between the bottom wall 18c and the interior wall 18f) is formed by a live hinge, similar to the live hinge configuration described above, but where the flexible wall (inner wall or outer wall) of the double-wall (or multi-wall) structure extends continuously from the bottom wall 18c to the intermediate wall 18f and across the folding or hinge axis between the bottom and intermediate walls 18c and 18f to form a live hinge. In other examples, other suitable live hinge configurations or other folding or hinge mechanisms may be employed to pivotally connect the bottom wall 18c to the intermediate wall 18f.

In particular examples, the folding or hinge axes $A_1$ and $A_2$ and the folding or hinge axis connecting the bottom and intermediate walls 18c and 18f, allow the container to be manually folded or unfolded, to selectively transform the container 18 into and out of the third mode or state shown in FIGS. 3 and 4. When in the third mode or state shown in FIGS. 3 and 4, or the fourth mode or state shown in FIG. 7, the container 18 is folded into a compact or reduced size as compared to the first and second modes or states (shown in FIGS. 1, 2, 8 and 9). In the third or fourth modes or states, the vehicle 10 may be readily stored, transported, or nested with other vehicles (as shown in FIGS. 3 and 4).

In certain examples, the container 18 may include cooling or refrigeration equipment, for cooling the temperature of the interior volume 19 of the container 18. In such examples, the container 18 may be configured for holding and transporting perishable goods or other products or objects that require or benefit from a cooler temperature environment. The cooling or refrigeration equipment may be configured for providing any desired temperature or temperature range within the interior volume 19, such as, but not limited to refrigeration cooling in the temperature range of about 33° F. to about 60° F. In other examples, the cooling or refrigeration equipment may be configured for freezing temperature cooling in the temperature range below 32° F. cooling. Cooling equipment may include, but is not limited to one or more of an electronic refrigeration device, a Peltier device, an ice box, an ice pack or other phase change material pack, or the like.

In certain examples, the container 18 may include heating equipment, for heating the temperature of the interior volume 19 of the container 18. In such examples, the heating equipment may be configured for providing any desired temperature or temperature range within the interior volume 19, including but not limited to temperatures above 32° F., or between 80° F. and 150° F. In yet other examples, the heating equipment may be configured to provide sufficient heat to cook food or other material within the interior volume 19 of the container, such as but not limited to temperatures above 150° F., or above 200° F., 300° F., 400° F., or the like. Heating equipment may include electronic or resistive heaters, conduction heaters, or the like. In other examples, the container 18 (or other portion of the vehicle) may include a source of gas for heating or cooling, such as, but not limited to a tank of propane. In such examples, cooling or refrigeration equipment, or the heating or cooking equipment (or any combination thereof) may be accommodated in any suitable location on the chassis 12 or, on or in the container 18, such as, but not limited to, within the rear section of the container 18, between the interior wall 18f and the rear wall 18d. In such examples, suitable ducts or thermal conductors may be provided between the cooling or refrigeration equipment and the interior volume 19 or between the heating equipment and the interior volume 19, for conveying thermal energy to or from the interior volume of the container 18.

In certain examples, the container 18 or the chassis 12 may include or operate with one or more vibration isolating or shock absorbing devices to reduce physical vibration and shock to the container 18 and its contents during transportation. Such vibration isolation or shock absorbing devices may include, but are not limited to resilient pads, springs, dampers or other resilient support structure, for example, on the bottom of (or otherwise supporting) the container 18, pneumatic or fluid-filled shock absorbers (such as employed on conventional road vehicles), electronically or electromechanically controlled shock absorbers, combinations thereof, or the like. Certain examples of vibration isolation platforms are available from Newport Corporation. However, in other examples, other suitable vibration isolation platforms, vibration isolation mounts, pads, or the like may be employed.

In certain examples, one or more vibration isolation or shock absorbing devices may be mounted on or are part of the container 18. In certain examples, one or more vibration isolation or shock absorbing devices may be separate from the container 18, and mounted on or are part of the chassis 12. In yet other examples, one or more vibration isolation or shock absorbing devices may be configured and provided as a separate device or module and may be located between the chassis 12 and the container 18, such that the container 18 mounts to the vibration isolation or shock absorbing device, to isolate the container 18 from at least some of the vibration or physical shocks encountered by the chassis during transportation. In particular examples, one or more vibration isolation or shock absorbing devices may be configured with a connecting system including one or more quick connection and quick release connector (such as, but not limited to a quick release latch as described above), that allows a user (or other personnel) to quickly and easily connect the vibration isolation or shock absorbing device to the chassis 12 or release the vibration isolation or shock absorbing device from a connected state on the chassis 12.

Figure 10:
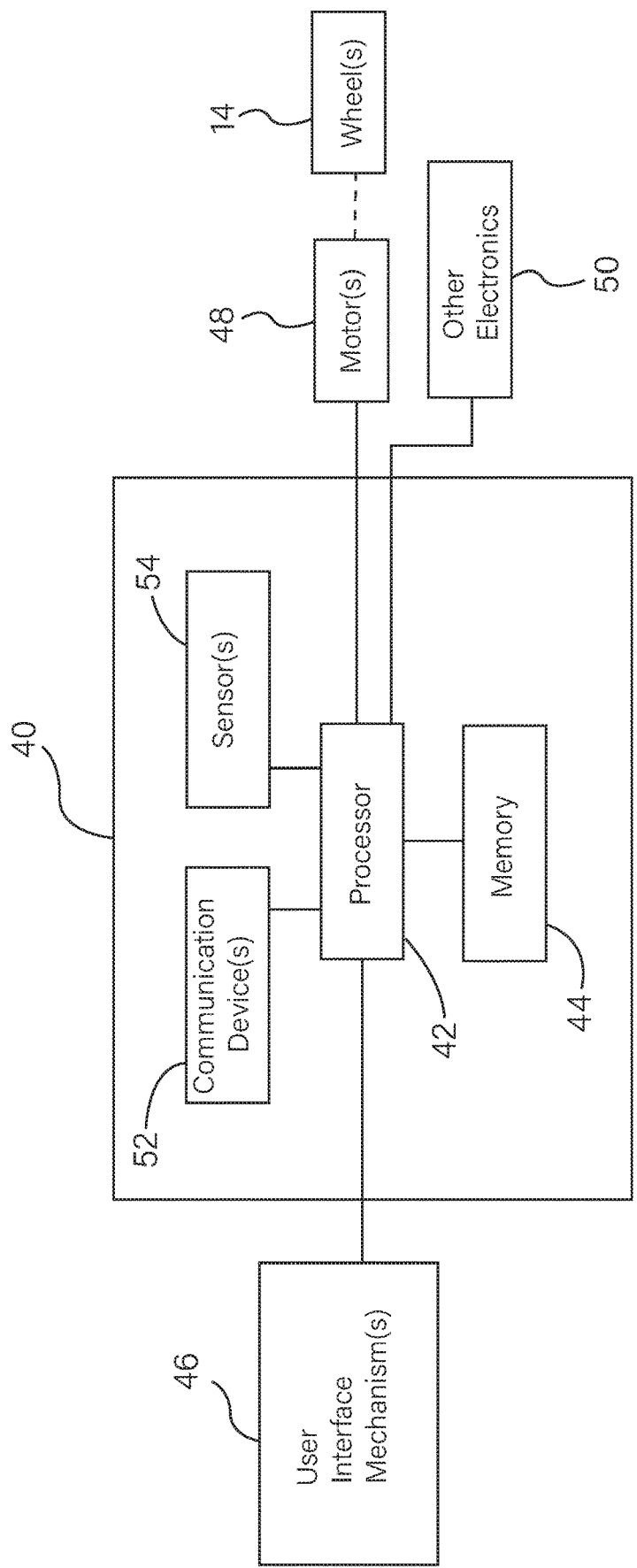
FIG. 10 is a schematic diagram of electronics for a vehicle.

In any of the examples described herein, one or more vibration isolation or shock absorbing devices may include or be associated with one or more sensors (for example, one or more of the sensors 54 described herein with reference to FIG. 10) for detecting vibration or physical shock, and providing signals or information corresponding to the detected vibration or shock.

In certain examples, the container 18 may be configured to provide a transportation and delivery service for transportation and delivery of cargo objects (packages, goods, equipment, other containers or vehicles, or other items. In such examples, the container 18 may be configured (as to one or more of its size, shape, arrangement of interior racks, shelves or other interior structures, electrical power supplying capability, thermal insulation, heating, refrigeration, air flow or other environmental controls, or the like) to hold and carry such cargo and to protect the cargo during transportation and delivery.

In certain examples, the container 18 may be configured to provide a mobile food or beverage preparation facility, mobile kitchen or other mobile point of sale facility. In such examples, the vehicle 10, with the container 18, may be transported, driven or pushed to a desired location at which customers (or potential customers) may arrive or be present. The vehicle 10, with the container 18, therefore, can operate as a facility by which the user (or other personnel at the desired location) may assist customers in purchasing (or otherwise obtaining) food items or other products from the container 18. In some examples, the vehicle may operate as a facility that allows customers to serve themselves (self-service) of food or beverage items, or other products carried by the container 18. In examples, in which the container 18 includes a food preparation facility or kitchen, the container 18 may include one or more thermally controlled ovens, microwave ovens, stoves, heated compartments, refrigerated compartments, sinks or other water sources, beverage holding and dispensing containers, or the like.

In certain examples, the container 18 may be configured to provide a mobile food or beverage preparation facility for one or more particular types of food or beverage, or for a particular food service business. For example, the container 18 may be particularly configured to hold pizzas for delivery, where the interior of the container 18 has multiple racks, shelves or other structures shaped for holding multiple pizza boxes (for example, traditional flat, rectangular boxes), that are shaped to avoid or reduce sliding movement of the boxes within the container 18 during transportation. In other examples, the racks, shelves or other structures may be configured to hold (and reduce sliding movement) of flat, round pizza boxes. The racks, shelves or other structures may be configured for maintaining multiple pizza boxes in spaced relation to allow air flow (and avoid soggy pizzas), for maintaining a temperature environment suitable for pizza delivery. In certain examples, the container 18 may include wheels, such that the container 18 (when not mounted to the chassis 12) may be wheeled into a restaurant or kitchen and filled (or partially filled) with pizzas. Once the pizzas are loaded into the container 18, the container 18 may be wheeled to a chassis 12 and mounted onto the chassis 12 for transportation and delivery.

In certain examples, the container 18 may include thermal insulating structure or heaters, fans or other air circulating devices (or combinations thereof), for maintaining a temperature environment suitable for pizza delivery. Alternatively or in addition, the container 18 (or other components of the vehicle 10) may include one or more (or multiple) vibration or shock absorbing devices, or tilt isolation devices (or combinations thereof) that reduce vibration or physical shock to, and/or tilting of the contents of the container during transportation (for example, to minimize damage to the pizzas or other contents of the container).

In this or other examples, the container 18 (or other components of the vehicle 10) may include one or more (or multiple) sensors (e.g., corresponding to sensors 54 in FIG. 10) that are particularly useful in the context of a pizza (or other cargo) delivery service. Such sensors may include one or more sensors for detecting the temperature in the container, the humidity level in the container, the vibration or shock encountered by the container and other conditions that may affect the quality of a pizza (or other cargo) in the container. In certain examples, the container 18 (or other component of the vehicle 10) may include one or more GPS or other location sensors for determining or tracking the location of the vehicle 10, for example, for reporting the location or delivery time to a delivery customer or control station.

In a further example, the container 18 may be particularly configured to hold coffee products, tea products or other beverages for delivery or for service directly from the vehicle 10. In such examples, the interior of the container 18 may have multiple racks, shelves or other structures shaped for holding coffee or tea products, cups, sugar, cream and other condiments relating to coffee, tea or other beverages. In such examples, the container 18 may include one or more coffee grinding, brewing, heating or dispensing machines (or combinations thereof), electrical outlets for powering such machines, refrigerated containers for cream, cold drinks or other refrigerated products, cup holding or dispensing devices, counter tops for serving beverage cups to customers, and the like. In this or other examples, the container 18 (or other modules on the vehicle 10 or the chassis 12) may carry one or more folding chairs, folding bistro tables or the like, to allow the user to set up a small coffee shop around the vehicle 10.

In other examples, the container 18 may be configured (as to one or more of its size, shape, arrangement of interior structures, thermal insulation, heating, refrigeration, air flow or other environmental controls, or the like) for holding and accommodating other types of food or beverage items such as, but not limited to, fruits, vegetables, meats, fish, grocery items, cakes or other baked goods, ice cream or other frozen food items, general or specialized packaging for other food items or of particular food service establishments, wine, beer or spirits). In such examples, the container 18 may include one or more heated or refrigerated containers for holding such items. In certain examples, the container 18 may be configured for serving various types or particular food items to customers, directly from the vehicle. Thus, in various examples, the container 18 may be configured to hold and serve pizza, coffee, baked goods, ice cream, fruits, vegetables, or other hot or cold food items, or the like, and/or provide a bar of wine, liquor or other beverages.

In other examples, the container 18 may be configured (as to one or more of its size, shape, arrangement of interior structures, thermal insulation, heating, refrigeration, air flow or other environmental controls, or the like) for holding and accommodating drugs, medical materials, blood, plasma, organs or other biological materials for transportation and delivery. In such examples, the interior of the container 18 may have multiple racks, shelves or other structures shaped for holding such medical or biological materials, vibration isolation features, thermal insulation or refrigeration features for protecting such medical or biological materials during transportation, or the like.

In this or other examples, the container 18 may have a suitable locking and security system that inhibits unauthorized entry into the container 18 (or sections of the container that are configured to hold medical or biological materials), for example, to avoid or certify avoidance of theft of or unauthorized tampering with contents of the container 18. In this or other examples, the container 18 (or other components of the vehicle 10) may include one or more (or multiple) sensors (e.g., corresponding to sensors 54 in FIG. 10) that are particularly useful in the context of a medical or biological materials delivery service. Such sensors may include one or more sensors for detecting the temperature in the container, the humidity level in the container, the vibration or shock encountered by the container and other conditions that may affect the quality of medical or biological materials in the container. In certain examples, the container 18 (or other components of the vehicle 10 or a control station in communication with the vehicle 10) may be configured to receive and store the sensor information, to allow subsequent (or real time) reading and reporting of the sensor information for evaluation of the delivery quality (and of the quality of the medical or biological materials in the delivery). In certain examples, the container 18 (or other component of the vehicle 10) may include one or more GPS or other location sensors for determining or tracking the location of the vehicle 10, for example, for reporting the location or delivery time to a delivery customer or a control station.

In other examples, the container 18 may be configured (as to one or more of its size, shape, arrangement of interior structures, thermal insulation, heating, refrigeration, air flow or other environmental controls, or the like) for holding and accommodating a mobile pharmacy or medical testing or treatment facility. For example, a mobile pharmacy, or a mobile medical testing or treatment facility can be configured to provide vaccinations, medical screenings or tests (such as, but not limited to tests or vaccines for flu, Covid19 or other medical conditions), deliver and administer other medicines or treatment compositions, provide treatment or therapy with medical treatment or therapy equipment (such as, but not limited to infusion therapy, heat pad treatment with one or more heating pads, massage treatment with one or more electrical or mechanical massage administering devices, or other suitable therapies or treatments). In some examples, a vehicle 10 having such a container 18 may be operated or assigned to medical personnel who are qualified and trained for administering therapy or medical treatment from the vehicle. In some examples, the container 18 (or a vehicle 10 with the container 18) may be configured to provide emergency medical services, or ambulatory services.

In such examples, the interior of the container 18 may have multiple racks, shelves or other structures shaped for holding medicines, syringes, sterilization supplies, medical testing equipment, medical treatment equipment, vibration isolation features, thermal insulation or refrigeration features for protecting such medicines and equipment during transportation, or the like. In such examples, the container 18 may include one or more heating or refrigeration systems (or combinations thereof) for maintaining medicines at a desired temperature, electrical outlets for powering electronic therapy or treatment devices. In this or other examples, the container 18 (or other modules on the vehicle 10 or the chassis 12) may carry one or more folding chairs, folding examination or treatment tables or the like.

In this or other examples, the container 18 (or other components of the vehicle 10) may include one or more (or multiple) sensors (e.g., corresponding to sensors 54 in FIG. 10) that are particularly useful in the context of a mobile pharmacy or medical testing or treatment facility. Such sensors may include one or more sensors for detecting the temperature in the container, the humidity level in the container, the vibration or shock encountered by the container and other conditions that may affect the quality of medicines and equipment in the container. In certain examples, the container 18 (or other components of the vehicle 10 or a control station in communication with the vehicle 10) may be configured to receive and store the sensor information, to allow subsequent (or real time) reading and reporting of the sensor information for evaluation of the delivery quality (and of the quality of the medicines and equipment in the container 18). In certain examples, the container 18 (or other component of the vehicle 10) may include one or more GPS or other location sensors for determining or tracking the location of the vehicle 10, for example, for reporting the location or delivery time to a customer or a control station.

In other examples, the container 18 may be configured (as to one or more of its size, shape, arrangement of interior structures, thermal insulation, heating, refrigeration, air flow or other environmental controls, or the like) for holding and accommodating a package, mail or postal delivery service. In this or other examples, the interior of the container 18 may have multiple racks, shelves or other structures shaped for holding standard sized packages, mail or postal delivery items, and arranged or marked in an order corresponding to a delivery route. In certain examples, the container 18 may include wheels, such that the container 18 (when not mounted to the chassis 12) may be wheeled into a package or mail sorting and processing center, and filled (or partially filled) with packages and/or mail. Once the packages and mail are loaded into the container 18, the container 18 may be wheeled to a chassis 12 and mounted onto the chassis 12 for transportation and delivery.

In this or other examples, the container 18 (or other components of the vehicle 10) may include one or more (or multiple) sensors (e.g., corresponding to sensors 54 in FIG. 10) and other equipment that are particularly useful in the context of a package or postal delivery service. Such sensors and other equipment may include one or more electronic code reader for machine reading of codes on mail or other postal items (such as, but not limited to an RFID reader, a bar code reader, a QR code reader, a postal code reader, or the like). In particular examples, one or more of such sensors may be configured to detect the contents of the container 18, for example, by reading machine readable tags or information provided on packages, mail or postage items in the container. Sensor information from those sensors may be processed (e.g., by the processor 42 in FIG. 10 or by a processor associated with a control station), to evaluate and identify contents of the container in real time as the vehicle 10 travels on a delivery route, or subsequent to a delivery operation. In such examples, the container 18 (or other component of the vehicle 10) may include one or more GPS or other location sensors for determining or tracking the location of the vehicle 10, for example, for reporting the location or delivery time to a delivery customer or a control station.

In certain examples, a package, mail or postal delivery service may employ a system having a plurality of chassis 12 and containers 18 as described herein. Each container may have a unique identifier (identification number or code) that can be a visible marking or other visible indicia, or may be machine readable (or both visible and machine readable), to allow delivery personnel to easily identify the containers. Each container (or a plurality of containers) and its (or their) associated unique identifier(s) may be designated for a particular delivery route or a particular delivery person or team (or both a route and a person or team). In some examples, the unique identifier may include one or more machine readable codes on the container (such as, but not limited to an RFID code, a bar code, a QR code, or the like).

The containers 18 (for example, while detached from the chassis 12) may be wheeled into a package or mail sorting facility, where each container 18 may be filled (or partially filled) with packages, mail or other delivery items corresponding to one or more particular delivery routes. The one or more delivery routes corresponding to the packages, mail or other delivery items in each container are associated with the unique identifier for that container. In that manner, delivery personnel may identify one or more containers corresponding each delivery route designated for each delivery person. In particular examples, the unique identifiers on the containers 18 are easily readable, such that a delivery person may readily identify and retrieve a container corresponding to one or more delivery routes assigned to that delivery person.

In certain examples, the delivery person (or other personnel) may identify and retrieve a container 18 from the sorting facility and wheel the container to a chassis 12 (for example, among a fleet of chassis located in a lot or other designated location at or near the sorting facility) and may load the container onto the chassis 12. In other examples, a plurality of containers 18 may be identified and retrieved from the sorting facility and transported by truck, train, plane or other mode of transportation to one or more second designated locations, where the containers 18 are associated with and connected to chassis 12. In some examples, a second designated location may be a lot, area, facility or other location at which one or more (or a plurality of) containers 18 and chassis 12 (or assembled vehicles 10) may be located. In some examples, a second designated location may be a postal box, street pole, meter or other fixture, adjacent to which the container 18 (or vehicle 10) may be placed. In some examples, the container 18 (or vehicle 10) may be locked to the fixture at the second designated location by a cable lock or other suitable locking system, that can be unlocked by a code or other key provided to an authorized delivery personnel.

Before or after a container is dropped off at a second designated location, the container may be assigned (based on unique identifiers on the containers) to delivery personnel for delivery operations. One or more delivery personnel may arrive at a second designated location, identify and retrieve one or more containers 18 (or vehicles 10 having containers 18) associated with a delivery route assigned to the delivery personnel, and then proceed on a delivery route with a vehicle 10 carrying one or more of the containers 18. In some examples, the delivery personnel may return to the designated location (or the second designated location) after completion of a delivery route, to exchange a container 18 (or a vehicle 10) with another container (or vehicle having another container) associated with another or extended delivery route assigned to the delivery personnel.

In further package or mail delivery examples (or other examples described herein), one or more containers 18 may be dropped off at a designated location (or a second designated location) as described herein, before it is filled or fully filled with packages, mail or other cargo. Thereafter, a car, truck or other transportation device may transport packages, mail or other cargo to the designated location (or the second designated location). Then, personnel may load the one or more containers 18 with packages, mail or other cargo from the car, truck or other transportation device. Thereafter, one or more delivery personnel may arrive at the designated location (or the second designated location), identify and retrieve one or more containers 18 (or vehicles 10 having containers 18) and proceed on a delivery route as discussed above.

In any of the package or mail delivery examples (or other examples) described herein, each container 18 may have a suitable locking and security system that inhibits unauthorized entry into the container 18 or theft of contents of the container 18. In any of the package or mail delivery examples (or other examples) described herein, each container 18 may include one or more communication and processing devices (for example, corresponding to communication device 52 and processing device 42 in FIG. 10) configured for communicating information to delivery personnel or personnel at a control station (or both). Such information may include, but is not limited to the location of the container 18 (or vehicle 10), the arrival of a container 18 (or vehicle 10) at a designated location or a second designated location, the loading of cargo into a container 18 at designated location or a second designated location, the quality of the delivery and delivered cargo (for example, based on sensor information from temperature sensors, vibration sensors, shock sensors, tilt sensors, or other sensors as described herein), or any combination thereof.

In other examples, the container 18 may be configured (as to one or more of its size, shape, arrangement of interior structures, thermal insulation, heating, refrigeration, air flow or other environmental controls, or the like) for holding and accommodating tools, repair parts or other materials used for an equipment or facility maintenance, cleaning, repair or installation service. In such examples, the interior of the container 18 may have multiple racks, shelves or other structures shaped for holding such tools, parts or other materials used in the maintenance, cleaning repair or installation service. In such examples, the container 18 may include one or more electrical outlets for powering tools or equipment used in the maintenance, cleaning, repair or installation service. Thus, the container 18 may be configured for any specific cargo delivery, food service, maintenance service, cleaning service, repair service, equipment installation service, or combinations thereof. For example, a container 18 may be configured to provide a mobile vehicle repair shop, to bring repair services to cars or other vehicles that are stranded on the road. In such examples, the container 18 may include jumper cables or other electrical cables that can connect electrical power from the on-board power source, for example, to jump-start or charge a depleted battery in a car or other vehicle being serviced. In particular examples, the container 18 may be configured to provide mobile service to other vehicles 10, and may include spare batteries or other repair or replacement parts for delivery to other vehicles 10.

In other examples, the container 18 may be configured to provide a mobile power source for other applications. In such examples, the container 18 may include or hold one or more batteries (such as the batteries held in one or more of the ports 30 or 32 or additional batteries), electrical power generators, solar panels or other solar power collectors and generators, sun tracking systems to direct solar panels or collectors toward the sun, or any combination thereof, to provide a mobile power facility. In such examples, the container 18 may include one or more electrical cables or electrical outlet sockets or connectors that can connect and supply electrical power from the on-board power source to external equipment. Alternatively or in addition, the vehicle 10 may include a trailer (such as, but not limited to trailer 72 as described in connection with FIGS. 20-24 below) carrying one or more batteries, electrical power generators (gas or other fuel-powered generators), solar power collectors and generators, or any combination thereof. In such examples, the container 18 (or the trailer 72, or both the container 18 and the trailer 72) may include a suitable power inverter to convert DC electrical power from the on-board power supply to AC electrical power to supply to external equipment. In examples having solar power collectors, the container 18 may contain a deployable solar panel structure (such as, but not limited to one or more solar panels mounted on a folding, telescoping, or other support mechanism) that can selectively extend or retract one or more solar panels for solar collection and stowage, respectively. In any of these examples, the container 18 may be transported to (or transported to and dropped off) at a designated or remote location, to provide a mobile or deployable source of electrical power to electrical devices or equipment at the designated or remote location.

In some examples, the container 18 may provide a mobile air treatment facility, for treating or conditioning the air in or around a designated area. In such examples, the mobile air treatment facility may be configured to provide heated air, cooled air, cleaned or filtered air or combinations thereof. In such examples, the container 18 may include one or more of air heating devices, air cooling devices or air cleaning or purifying devices. Such air heating devices may include, but are not limited to electrical, solar or gas-powered heaters, fans and combinations thereof. Such refrigeration or cooling devices may include, but are not limited to, compressed gas refrigeration systems, ice or water cooled systems, swamp cooling systems, fans or any combination thereof. Such air cleaning or purifying devices may include, but are not limited to one or more air filters, ultra-violet (UV) or UVC emitting devices, disinfectant or anti-pathogen emitting devices, or the like. In those examples, the container 18 may be transported to (or transported to and dropped off) at a designated or remote location, to provide a source of cleaned or purified air, heated or cooled air, or combinations thereof. Such air cleaning, heating or cooling facilities may be deployed to a designated or remote location for providing purified air to, or for heating or cooling personnel, plants, animals, electrical or mechanical equipment, or other objects or biological materials at the designated or remote location.

In other examples, the container 18 may be configured (as to one or more of its size, shape, arrangement of interior structures, thermal insulation, heating, refrigeration, air flow or other environmental controls, or the like) for holding and accommodating a mobile voting booth or voting facility. In such examples, the container 18 may include one or more ballot boxes or ballot voting stations at which a person may enter a ballot or vote, such as for a governmental election. In such examples, the container 18 may be configured with suitable privacy protocols (such as, but not limited to enclosures or covers that inhibit others from being able to view the ballot or entered voting information) to allow a person to enter voting information in secret. In addition, the container 18 may be configured with suitable security protocols to secure the ballot or voting information received from a person and to accurately communicate that information to appropriate election or voting personnel. In such examples, one or more tamper detection systems may be included on the container 18 or in the electronics 40 associated with the container 18, to record and secure electronic voting data received from voters. In particular examples, the voting data may be transmitted (for example by communication device 52 in FIG. 10) to a control station for collection or monitoring by appropriate election or voting personnel.

In certain examples, the container 18 may be configured to be transported (on a chassis 12) to a designated location and then removed from the chassis 12 and left at the designated location, as a remote voting facility. The container 18 may be picked up at a later date, for example, after the election or voting period has ended.

In certain examples, the container 18 may be configured to provide a mobile drone hub from which one or more drone vehicles (or un-manned vehicles) may be deployed. In such examples, the container may hold or contain (carry) one or more drone vehicles such as, but not limited to, vehicles configured to fly (using rotors connected to motors or other lift and propulsion mechanisms), roll or drive on a road or other surface (using wheels or tracks connected to motors or other suitable ground propulsion mechanisms), propel on or under water (using a waterproof hull and suitable propulsion system for on or under water propulsion), or any combination thereof.

For example, the container 18 may include a platform or other hub structure on its top surface or other surface, or within the interior of the container, to receive or hold one or more drone vehicles. In such examples, the platform or other hub structure may be configured to support a drone vehicle for selective launching, or selective landing, or both. In further examples, one or more other portions of the vehicle 10 (or vehicle system including the vehicle 10) may include a platform or other hub structure for supporting a drone vehicle and accommodating selective launching or landing (or both) as described herein. In some examples, the container 18 (or the vehicle 10) may include electronics for one or more of sensing or detecting the presence of one or more drone vehicles, monitoring or tracking one or more drone vehicles, charging or re-charging power for one or more drone vehicles, or communicating information or control instructions to or from the one or more drone vehicles. In some examples, the container 18 may be connected to a control station, central station, cloud-based system or the like, to communicate (receive or transmit) instructions or other information, for controlling, monitoring or managing the one or more drone vehicles.

In particular examples, one or more (or each) of the drone vehicles includes suitable electronic control and communication systems, to allow the drone vehicle to receive and respond to control instructions, and be controlled (for defining or controlling one or more of deployment time and operation, landing time and operation, gripping or releasing operation of a package holding mechanism, package dropping time and operation, movement including propulsion and steering, destination location, or other aspects of the operation of the drone vehicle). In some examples, the electronic control and communication systems of the drone vehicle(s) are configured to receive and respond to control instructions from the user (for example, input through a user interface mechanism s 46 described herein, or through an interface on a mobile phone or other communication device carried by the user and connected by wireless communication link to the electronics 40 described herein). In other examples, the electronic control and communication systems of the drone vehicle(s) are configured to receive and respond to instructions from one or more other personnel or control systems at, for example, but not limited to a control station, central station, hub station, or the like. In other examples, the electronic control and communication systems of the drone vehicle(s) are configured with some or all of its control information as having been programmed or stored on the drone vehicle (for example, programmed and stored in the electronics on the drone vehicle, before the drone vehicle is placed on or in the vehicle 10, before the vehicle 10 departs from the first location, or at one or more second locations).

In particular examples, one or more (or each) of the drone vehicles includes one or more holding mechanisms (clamps, clips, grips, grapples, brackets, or other mechanisms) for holding and selectively releasing a package or other deliverable object. In such examples, the one or more (or each) drone vehicle may be selectively deployed from the container, to transport or deliver the package or other object to a designated location (for example, but not limited to, a location near or within a defined distance from the vehicle 10 (or the container 18). In some examples, the one or more (or each) drone vehicle may be configured to land at the designated location and drop off the package or other object at the location (e.g., by selectively releasing the one or more holding mechanisms). In other examples, the one or more (or each) drone vehicle may be configured to drop off the package or object (e.g., by selectively releasing the holding mechanism) from a distance above the ground, without landing the drone vehicle. In some examples, the one or more (or each) drone vehicle may be configured to carry (and may carry) one or more batteries or other power sources (for example, that fit within the ports 30 or 32 of the vehicle 10, for example, to provide or deliver a power source (or a spare power source) to the vehicle 10 or to another vehicle (similar to vehicle 10) that is remote from the vehicle 10.

Accordingly, the vehicle 10 (or vehicle system having a vehicle 10), including the container 18, may be driven or otherwise transported from a first location to a second location. At the second location, one or more drone vehicles may be deployed from the container 18, and may travel (by flight, ground, water, or a combination thereof) to one or more other (third) locations remote from the container 18, while carrying one or more packages, power sources, or other objects. In some examples, the third location may be closer to the second location, than to the first location.

In some examples, the first location may be a vehicle hub, station or other location at which one or more vehicles 10 (or vehicle system that includes a vehicle 10 and one or more other components as described herein) are parked, stored or otherwise located. In some examples, a user may pick up a vehicle 10 (or vehicle system with a vehicle 10) at a first location and transport (drive or roll) the vehicle to the second location. In other examples, the vehicle 10 (or vehicle system) may be deployed and driven (un-manned or driverless control) from the first location to the second location without a user (or with another personnel, or the user riding and not controlling the vehicle). In some examples, one or more of the vehicles 10 at the first location may include one or more drone vehicles as described herein, on or in the vehicle(s) 10, so that the vehicle(s) 10 may carry the one or more drone vehicles when the vehicle(s) 10 is deployed from the first location and travels to the second location. In other examples, one or more drone vehicles may be separately transported to and received by the vehicle(s) 10 at one or more second locations (or other locations), after the vehicle(s) 10 has deployed from the first location.

The second location may be a designated location or other location to which the vehicle is transported for delivery of one or more packages or objects as described herein. In some examples, the second location may be selected as a location that is suitable or convenient for deployment of one or more drone vehicles from the vehicle 10 (or from the container 18). For example, the second location may include, but not limited to, a roof or top floor of a building, a hilltop or other location having a high elevation relative to other features in the vicinity of the second location. In some examples, the second location may be any suitable central location (centralized relative to a city environment, campus, facility or the like) that provides a reasonable or efficient location from which one or more drone vehicles may be deployed or received (or both). In some examples, the second location may be a location that is outside of, but near or on the edge of an urban or population-dense location, for example, for additional safety or where drone vehicle landing or operations are allowed by regulation, or the like. In some examples, the second location may be a remote location that provides a suitable done vehicle hub location for other locations or areas that are further remote from or that are within the vicinity of the remote location. In some examples, the container 18 may be separated from the rest of the vehicle 10 and left or deployed at the second location, while the rest of the vehicle 10 (or vehicle system including the vehicle 10) may be transported to one or more other locations (such as, back to the first location, to the third location, or to a further or fourth location). In such examples, the container 18 may remain at the second location and continue to operate as a hub for one or more drone vehicles as described herein, or may operate as a DRACS as described herein, or may operate as a combination of a drone hub and DRACS.

The Chassis:

The container 18 is connected to, and supported by the chassis 12. The chassis 12 may include any suitable rigid frame structure suitable for supporting the container 18. In certain examples, the rigid frame of the chassis 12 includes frame members 12a and 12b that extend generally horizontally, in a lengthwise dimension of the vehicle 10, from the front of the vehicle 10 toward the rear of the vehicle 10. The rigid frame of the chassis 12 includes one or more cross members (such as cross member 12c) that extend generally horizontally, from one frame member 12a to the other frame member 12b, and rigidly connects the frame members 12a and 12b together. The rigid frame structure (including the frame members 12a, 12b and 12c) may be made of any suitable material including, but not limited to metal, plastic, wood, composite material or combinations thereof.

In certain examples, the handle 20 is connected to the chassis 12. For example, the handle 20 may include a hand grip member 21 and two or more rigid shaft or rods 22a and 22b. The shafts or rods 22a and 22b extend from the rigid frame of the chassis 12 (such as from one or more of the frame members 12a, 12b or 12c), at an upward and rearward angle.

The grip member 21 connects to the upper end of the shafts or rods 22a and 22b, and extends generally horizontally. The grip member 21 may include hand grips sections 21a and 21b, located on the left and right sides of the shafts or rods 22a and 22b, respectively. The grip sections 21a and 21b may include a cover, coating or surface treatment for enhancing frictional engagement of a user's hands with the grip member 21.

In certain examples as described below, the grip sections 21a and 21b of the handle 20 may include sensors (such as, but not limited to pressure sensors) that sense pressure or force applied by the user, and provide control signals to one or more motors that power one or more of the wheels 14. In certain examples, those control signals may be used to operate the one or more motors to provide a steering assistance operation, to drive the vehicle 10 in a turning motion (to turn toward the right or toward the left, while moving in the forward direction F or while stationary in the forward direction F). In other examples, the control signal may be used to operate the one or more motors to provide a drive power signal to drive the vehicle 10 in the forward direction F.

In certain examples, the wheels 14*a-d* are mounted to the chassis by any manner, with or without shock absorbing suspension mechanism. In some examples, the wheels 14*a-d* are mounted to the chassis, through one or more shock absorbing mechanisms, such as, but not limited to pneumatic shock absorbers, springs, elastic pads or bushings, or the like. In those or other examples, each of the wheels 14*a-d* (or each of the rear wheels 14*a* and 14*b*) includes a rubber or other elastic material on its outer perimeter, such as, but not limited to a tire, an inflatable tire, a tubeless tire, or tread, that provides a shock absorbing effect, improves traction, or both.

In certain examples, the chassis 12 may be configured to connect with any one (or more than one) container 18 or other module(s), for providing a vehicle for a particular (or a general) transportation, delivery or service operation. In such examples, the chassis 12 may be configured of sufficiently strong and durable materials and construction to withstand many transportation, delivery or service operations over a relatively long operational life span. In addition, the container(s) 18 or other modules may be configured to be replaced or swapped out over the operational life span of the chassis 12 and, thus, may have a shorter operational life (or encounter different operational stresses and have shorter maintenance or repair schedules) as compared to the chassis 12. Accordingly, an ability to replace or swap out containers 18 or other modules, can improve the efficient and economical usage of the chassis 12 over its operational life span.

The Platform:

The riding platform 16 includes a panel that is pivotally connected to the chassis 12 by a connection linkage 34. The connection linkage 34 includes a first pivotal link or hinge 36 that allows the panel of the riding platform 16 to be selectively pivoted between an upward pivoted position (shown in FIG. 1) and a downward pivoted position (shown in FIG. 2). The hinge 36 (or other portion of the linkage 34) is configured to hold and maintain the panel of the riding platform 16 in the upward pivoted position (shown in FIG. 1), but allow a user to selectively and manually pivot the panel to the downward pivoted position, or back to the upward pivoted position, to transform the vehicle 10 between first and second modes or states (as shown in FIGS. 1 and 2). In certain examples, the connection linkage 34 includes a second pivotal or rotary link (having a generally vertical axis of rotation) at the connection to the panel of the platform 16, to allow the riding platform 16 to pivot relative to the chassis 12, for example, when the vehicle 10 is maneuvered around a corner.

In certain examples, the connection linkage 34 extends downward (or is angled downward) from the chassis 12, so that the riding platform 16 is located lower to the ground than the bottom of the chassis 12, when the riding platform 16 is pivoted downward as shown in FIG. 2. In this manner, the size of the wheels 14 on the chassis 12 may be increased and the ride height of the chassis 12 above the ground may be increased (for example, to improve ground clearance, drive speed, or other aspects of the vehicle). However, at the same time, the riding surface 16*a* of the platform 16 may be supported sufficiently close to the ground to allow the user to easily step on or off of the platform when the riding platform 16 is pivoted downward as shown in FIG. 2.

When the riding platform 16 is pivoted downward, as shown in FIG. 2, the upper surface 16*a* of the riding platform 16 provides a step surface on which a user may place one or both feet, while gripping the handle 20, to push or ride on the vehicle (for example, similar to the operation of a skate board or stand-on scooter). In some examples, the upper surface 16*a* of the riding platform 16 may be provided with an enhanced friction surface such as, but not limited to a cover, coating, tread pattern, roughened surface or other surface treatment for enhancing frictional engagement with the user's foot or shoe.

In certain examples, the riding platform 16 may include one or more, or a plurality of wheels 38 for engaging and rolling along the ground (or other surface), when the riding platform 16 is pivoted downward as shown in FIG. 2. In the example in FIGS. 1 and 2, the wheels 38 include a four wheels mounted on two parallel axels. In other examples, the wheels 38 may include two wheels or a single wheel on a single axel, or more than four wheels on more than two axels. The multiple axel arrangement can allow the wheels 38 to more smoothly travel over cracks or gaps in a street or sidewalk surface. For example, as the wheels 38 travel over a crack or gap in a street or sidewalk surface, wheels on one of the axels may be in contact with the ground (or other surface) while wheels of the other axel may be momentarily out of contact with the ground (or other surface) while riding over and crossing the crack or gap, such that wheels 38 of at least one of the axels is in contact with the ground (or other surface) at any given time. In the above examples, the wheels 38 provide additional support for the user, when stepping on the riding platform 16. In other examples, the riding platform may have no wheels and, instead, may be supported in a cantilevered manner, when pivoted downward.

In some examples, the riding platform allows the vehicle 10 to be operated as a human-assist electric vehicle, where one or more motors (as described herein) provide drive power and the user may assist by providing additional drive or pushing power. In other examples, the vehicle 10 may be operated as a motorized vehicle that receives all of its drive power from one or more motors (as described herein). In other examples, the vehicle 10 may be selectively operated as a human assist electric vehicle, or as a fully motorized electric vehicle, depending upon a desired context of use.

The Wheels:

The wheels 14 are connected to the frame structure of the chassis 12 by any suitable connection structure that allows the wheels 14 to rotate and roll along a surface, as described above. The wheel connection structure for each wheel may include one or more axels that define an axel axis, about which the wheel rotates. The wheels 14 may be any suitable wheel structure configured to support the load of the vehicle 10 (and contents of the vehicle 10), for rolling motion on a surface as described above.

In the examples in FIGS. 1-9, the wheels 14 include a pair of rear wheels 14*a* and 14*b* and a pair of front wheels 14*c* and 14*d*. In other examples, the pair of front wheels 14*c* and 14*d* may be replaced with a single front wheel mounted to a middle portion of the front of the chassis 12 (in a tricycle-like configuration). In further examples, the pair of rear wheels 14*a* and 14*b* may be replaced with a single rear wheel mounted to the middle portion of the rear of the chassis 12. In yet other examples, the vehicle may include more than four wheels (such as, but not limited to an additional axle with a pair of wheels located between the front and rear wheels, or an additional wheel or pair of wheels on the same axle as the rear wheels 14*a* and 14*b* or the front wheels 14*c* and 14*d*).

In certain examples as shown in FIGS. 1-9, the rear wheels 14*a* and 14*b* have a larger diameter than the front wheels. In other examples, the rear wheels 14a and 14b are the same size as or are smaller than the front wheels. In some examples the front wheels 14c and 14d are mounted on pivots or castors (or are castor wheels) that are pivotal about a vertical axis, for enhancing the steering capabilities of the vehicle. In some examples, the front wheels 14c and 14d include built-in springs or other shock absorbing features. In other examples, the front wheels 14c and 14d are mounted on axles that are not pivotal. In certain examples, the rear wheels 14a and 14b or the front wheels 14c and 14d, or all of the wheels 14a-d, include a resilient material (such as, but not limited to plastic, rubber, fabric, or a combination thereof) around the outer peripheral surface, to help absorb shocks and bumps as the vehicle rolls along the ground (or other surface). In some examples, each of the rear wheels 14a and 14b (or the front wheels 14c and 14d, or all of the wheels 14a-d) include an inflatable tube tire or a tubeless rubber tire, for enhancing a rolling function or for absorption of shocks and bumps.

In certain examples, when the vehicle 10 is in the first or second mode or state (as shown in FIGS. 1, 2, 8 and 9), a user (not shown) may drive or push the vehicle 10 in a forward direction F, while all four wheels 14a-d are in contact with the ground (or other surface). In that configuration, the vehicle 10 may be driven or pushed, while remaining relatively stable and balanced on all wheels (e.g., all four wheels). In addition, in that configuration, the container 18 of the vehicle 10 may contain relatively heavy cargo, and may spread the weight over all wheels (and all wheel axles).

However, in certain examples, the rear wheels 14a and 14b have a sufficient diameter such that, when the vehicle 10 is in the first mode or state (as shown in FIG. 1), a user may readily tilt the cart back on its rear wheels 14a and 14b, to raise the front wheels 14c and 14d off of the ground (or other surface). More specifically, when the vehicle 10 is in the first mode or state (as shown in FIG. 1), the user may grip the handle 20 and manually tilt the vehicle 10 backwards on the rear wheels 14a and 14b to balance the weight of the vehicle on the rear wheels 14a and 14b (and the axels of those rear wheels). In that tilted-back position, the user may drive or push the vehicle in the forward direction F, and operate the vehicle 10 much like a two-wheeled dolly.

In certain examples, one or more of the wheels 14a-d (or each of the wheels 14a-d) include a wheel lock mechanism that may be selectively engaged to lock the wheel in a state in which rotation of the wheel is inhibited, and selectively disengaged to unlock the wheel and allow rotation. Any suitable wheel lock mechanism may be employed including, but not limited to, a manually operated lock that is manually set in a locked or unlocked state by the user, an electronically operated lock that receives electronic signals to set a locked or unlocked state, or the like.

In certain examples, one or more of the wheels 14a-d (or each of the wheels 14a-d) include a wheel brake mechanism that may be selectively engaged to brake the wheel to slow or stop rotation of the wheel from a rotating state. Any suitable wheel brake mechanism may be employed including, but not limited to, a manually operated brake that receives manual braking force applied by the user, an electronically operated brake that receives electronic signals to apply a braking force, a hydraulic operated brake that receives a hydraulic pressure to apply a braking force, or the like.

In certain examples, one or more of the wheels 14a-d (or each of the wheels 14a-d) include or is associated with one or more sensors that detect one or more of a low air pressure, abrasion, puncture or other damage to the wheel or a tire on the wheel. In such examples, the one or more sensors may correspond to one or more of the sensors 54 described herein with reference to FIG. 10. In certain examples, signals or information from the one or more sensors may be employed by electronics onboard the vehicle 10 (such as electronics 40 described herein with reference to FIG. 10) or electronics located at one or more control stations remote from the vehicle 10 (or by both onboard and remote electronics) to control operation of the vehicle 10. For example, the vehicle 10 may be controlled to provide a warning to the operator of the vehicle 10 (for example, through the user interface 46 described herein with reference to FIG. 10), or make operational changes on the vehicle 10 such as, but not limited to shutting off or slowing down the motor, applying automatic braking, or other suitable operational modifications, in response to detection of an adverse wheel condition (such as, but not limited to air pressure below a threshold value, vibration above a threshold value, wheel temperature above a threshold value, or the like).

In certain examples, the front wheels 14c and 14d may have steering or stabilization mechanisms. For example, the front wheels 14c and 14d may be included in a steering mechanism that has a steering arm or tie rods connected to the axis of each front wheel, to stabilize the wheels on uneven surfaces. The steering arm may be allowed to rotate where the arm connects to the wheel axes. The steering arm may be connected to a servo motor or other type of motor, to assist in turning the front wheels (power assist steering). Alternatively, the steering arm may be mechanically connected to a pivot on the chassis 12, to turn the wheels as the vehicle 10 turns. Other steering mechanism examples may include rack and pinion steering systems or the like. In certain examples in which a power assist steering is employed, one or more sensors (such as sensors 54 in FIG. 10) may detect one or more pre-defined road conditions (such as a curve in the road) and automatically engage and apply power assist steering in response to the detected road condition.

The Motor(s):

In certain examples, one or both of the rear wheels 14a and 14b include or are connected to one or more motors. The motor(s) may include, but is not limited to, an electric hub motor or other in-wheel motor. For example, one or both of the wheels 14a and 14b may include an electric hub motor incorporated within the hub of the wheel. Examples of electric hub motors include, but are not limited to 1000 watt, variable speed, electric hub motors. In some examples, electric hub motors are capable of providing a top speed for the vehicle 10 of up to 10 mph, or up to 20 mph, or up to 25 mph, or higher, depending upon the intended context of use. In some examples, the electric hub motors are capable of driving the vehicle at the top speed, up a defined maximum grade, for example, but not limited to a 10% grade, a 15% grade, a 20% grade, or higher, depending upon the intended context of use.

Alternatively, or in addition, the motor(s) may include one or more external motors (external to the wheel hubs) coupled to the wheel(s) by one or more gears, chains, drive shafts or other suitable linkage structure (not shown). For example, one or more external motors may be mounted on the chassis 12, or may be supported on or within the container 18. In certain examples, one or more motors may be contained and held within the interior of the rear section of the container 18, for example, in a volume (general volume or dedicated motor holding volume) located between the interior wall 18f and the rear wall 18d. In such examples, the rear section of the container 18 may include one or more openings that provide access to the rear section volume in which the motor(s) is (are) held. Such opening(s) may be in the rear portion of the side walls 18a or 18b, or the interior or rear walls 18f and 18d. Further, such examples may include one or more doors or other closure mechanisms that allow a user to selectively close or open the opening.

In certain examples, the motor(s) provide power sufficient to drive the vehicle 10, when the vehicle 10 is in the first or second mode or state (as shown in FIGS. 1, 2, 8 and 9). In some examples, the motor(s) provide power sufficient to drive the vehicle 10 without requiring additional pushing power from the user. In particular examples, the motor(s) provide sufficient power to drive the vehicle 10 at speeds appropriate for driving on street or open areas (such as, but not limited to speeds up to 10 mph, 20 mph, 30 mph, or more), for example, when the vehicle 10 is in the second mode or state, as shown in FIG. 2.

In some examples, the motor(s) may be used to provide steering or assist the user with steering of the vehicle 10. For example, by controlling the motor(s) to simultaneously drive one wheel 14a or 14b, while not driving the other wheel 14b or 14a (or to simultaneously drive the wheels 14a and 14b in opposite directions), the motor(s) may impart a force in a direction that rotates or turns the vehicle 10 to the right or to the left of the forward direction F. The rotating or turning force rotates (or assists a user to manually rotate) the vehicle 10 to the right or to the left, to steer the vehicle while moving in the forward direction, or to turn the vehicle while not moving forward. Accordingly, the motor(s) may be used for steering control for steering the vehicle while moving forward in certain larger areas (for example, but not limited to city streets, sidewalks, office building lobbies, large warehouse areas, and the like), or for turning the vehicle in relatively small turn radii to maneuvering in certain smaller areas (for example, but not limited to office building halls or rooms, pathways, small storage areas, and the like).

In other examples, the motor(s) may be provided on or connected to drive one or more of the front wheels 14c or 14d, or any combination of the four wheels 14a-d. In yet other examples, all four wheels 14a-d are freely rotating (not driven), and one or more further wheels (drive wheels) includes or is connected to a motor, and is (are) supported on the chassis 12 or the container 18 in a position for engaging the road (or other surface) and providing a drive force for driving the vehicle 10 in the forward direction F.

In any of the above examples, the motor(s) may be configured to be selectively operated to drive the vehicle 10 in the forward direction F, or in a reverse direction (opposite to the direction F). In such examples, the vehicle 10 may include a user input mechanism for selecting a forward direction drive or a reverse direction drive.

In any of the above examples, the motor(s) may include or be associated with one or more sensors that detect one or more of operating conditions, damage or maintenance conditions, or other aspects of the motor(s). In such examples, the one or more sensors may correspond to one or more of the sensors 54 described herein with reference to FIG. 10. In certain examples, signals or information from the one or more sensors may be employed by electronics onboard the vehicle 10 (such as electronics 40 described herein with reference to FIG. 10) or electronics located at one or more control stations remote from the vehicle 10 (or by both onboard and remote electronics) to control operation of the vehicle 10.

For example, the vehicle 10 may be controlled to provide a warning to the operator of the vehicle 10 (for example, through the user interface 46 described herein with reference to FIG. 10), in response to detection of an adverse motor condition (such as, but not limited to a motor temperature or speed above or below a threshold value, or the like). Alternatively or in addition, the operation of the vehicle 10 may be controlled such as, but not limited to shutting off or slowing down the motor, applying automatic braking, or other suitable operational modifications in response to detection of an adverse motor condition (such as, but not limited to a motor temperature or speed above or below a threshold value, detection of adverse road conditions, or the like). In examples in which multiple motors are associated with multiple wheels (such as, but not limited to the examples in which each of the rear wheels 14a and 14b includes a respective hub motor), upon the detection of a failure or adverse condition in one of the motors, both of the wheel motors may be controlled to shut off, to avoid overstraining and damaging the properly working motor or to avoid causing the vehicle 10 to steer or drive improperly.

The User Interface Mechanisms and Electronics:

The vehicle 10 may include one or more user interface mechanisms, including one or more input mechanisms for receiving user input for controlling the motor(s). In some examples, the user input mechanism(s) is (are) provided on or incorporated in the handle 20, such as, but not limited to one or both grip sections 21a and 21b. In other examples, the user input mechanism(s) is (are) provided on or incorporated in another part of the vehicle, such as, but not limited to the platform 16. The user input mechanism(s) may include, but are not limited to one or more buttons, knobs, keys, virtual buttons on a screen, rotary switches, sliding switches, pedals, microphones or other audio capture devices, combinations thereof, or the like. In one example, the user input mechanism(s) include a rotary switch on one or both grip sections 21a or 21b, that allow a user to rotate the respective grip section to adjust motor speed associated with the left and right rear wheels 14a or 14b, respectively. In other examples, the user input mechanism(s) include one or more pedals provided on the platform 16, at a position to allow a user to selectively press on the pedal(s) by applying a stepping force on the pedal(s), where the depression of the pedal(s) adjusts the motor speed. In some examples, the user input mechanism(s) include one or more pressure sensors on one or both grip sections 21a or 21b, that allow a user to apply manual pressure on the right side grip section 21b or the left side grip section 21a, to provide steering control signals for operating the motor(s) for steering or turning right or left, respectively.

In some examples, the vehicle 10 also includes one or more electronic circuits connected for controlling the motor(s) and other electrical devices on the vehicle, based on input received from the user input mechanisms. For example, one or more electrical circuits may be mounted on the chassis 12, or may be supported on or within the container 18. In certain examples, one or more electrical circuits may be contained and held within the interior of the rear section of the container 18, for example, in a volume located between the interior wall 18f and the rear wall 18d. In such examples, the rear section of the container 18 may include one or more openings that provide access to the rear section volume in which the electrical circuit(s) is (are) held. Such opening(s) may be in the rear portion of the side walls 18a or 18b, or the interior or rear walls 18f and 18d. Further, such examples may include one or more doors or other closure mechanisms that allow a user to selectively close or open that opening. As described herein, in some examples, the rear section of the container 18 (containing the one or more electrical circuits) may be a separate module from the front section of the container 18 (for holding cargo). In other examples, the rear section of the container 18 and the front section of the container 18 may be formed as a single, unitary structure.

A generalized diagram for describing an example of an electronic circuit for a vehicle 10 is shown in FIG. 10. However, other examples may include other suitable electronic circuits.

In FIG. 10, an electronic circuit 40 for a vehicle 10 includes processor electronics 42 (which may include one or more electronic computing or processing devices), and an electronic memory 44 (which may include one or more non-transitory, electronic storage devices). The processor 42 is connected to receive signals from one or more user interface mechanisms 46 (which correspond to the one or more user input mechanisms discussed above, or which may include other user input devices). In certain examples, the user interface mechanisms 46 may also or alternatively include one or more output devices such as, but not limited to one or more electronic video or image displays, one or more speakers or other audio output devices, one or more vibration or other tactile output devices, or the like. The processor 42 is connected to provide control signals to one or more motors 48 (which correspond to the motor(s) discussed above).

The motors 48 are shown in FIG. 10 as connected by a broken line to the wheels 14 (to represent a mechanical connection to one or more of the wheels 14*a-d* as discussed above). The processor 42 may be connected to provide control signals to other electronics 50 on the vehicle 10, where such other electronics 50 may include, but are not limited to lights, sensors, horns, radio or other audio output devices, or the like. While not shown in FIG. 10, the processor electronics 42, the electronic memory 44 the motor(s) 48 and the other electronics 50 may be connected to receive power from a power source such as, but not limited to the battery or batteries in the battery ports of the vehicle 10 (e.g., ports 30 and 32 described herein). In some examples, the processor electronics 42, the electronic memory 44 are configured to store programmed instructions for operating or controlling the motor(s) and other electrical devices on the vehicle as described herein, based on the programmed instructions or a combination of the programmed instructions and user input from the user input mechanism(s).

In certain examples, the electronic circuit 40 or other electronics on the vehicle 10 includes one or more electronic communication devices 52 for receiving or sending (or both) electronic signals to one or more other electronic communication devices from which the vehicle 10 may be remotely located or near. Such communication device(s) 52 may include, but is (are) not limited to transceivers, receivers or transmitters, such as, but not limited to radio frequency (RF) devices, WiFi devices, Bluetooth devices, satellite communication devices, or other a wireless communication device, or the like. The communication device(s) 52 may be configured for communication with one or more other devices (e.g., from which the vehicle 10 is remote), for example, at one or more control stations or cloud-based systems, to receive or send (or both) information. The information may include information sent to the communication device(s) 52, from the other device, such as, but not limited to: control signals for controlling one or more functions of the vehicle, route or delivery location or address information, personnel or contact information, or the like. The information may include information sent from the communication device(s) 52, to the other devices, such as, but not limited to: vehicle status and monitoring information corresponding to the status or condition of one or more parts of the vehicle, vehicle location information corresponding to the current location of the vehicle or to a history of locations of the vehicle, or the like. In some examples, the communication device(s) 52 is configured to communicate (receive or transmit) instructions or other information as described herein, to or from a cloud-based system (one or more remote servers), for controlling, monitoring or managing the vehicle.

In certain examples, the electronic circuit 40 or other electronics on the vehicle 10 includes one or more sensors 54 for providing an electronic signal corresponding to one or more sensed or detected conditions associated with the vehicle 10, the vehicle's user, the environment in which the vehicle 10 is located, or a combination thereof. In some examples, the one or more sensors 54 may be configured for detecting one or more conditions or parameters of the vehicle 10 (or of any of the modules of the vehicle 10) such as, but not limited to: location; motion; speed; acceleration; vibration or physical shock level; tilt angle; component temperature; state of maintenance, repair or operation; battery power level, condition or status; number or presence of batteries in ports (such as ports 30 and 32); wheel or tire breakage, pressure or inflation status; motor operation or status; breakage or improper operation of a motor or other component of the vehicle; open or closed state of the container door 26; or the like. In some examples, one or more sensors 54 may be configured for detecting one or more conditions or parameters of the user or driver of the vehicle 10 such as, but not limited to: the presence of the user on or near the vehicle 10, a user's position or orientation relative to the vehicle, a direction of the user's eyes or angle of view, a heart or pulse rate or other physical condition of the user, weight of the user, identification of the user, or the like. In some examples, one or more sensors 54 may be configured for detecting one or more conditions or parameters of the environment in which the vehicle 10 is located, such as, but not limited to: traffic or road conditions; weather conditions; light or darkness; current time; or the like. In particular examples, such sensor information may be employed to monitor or adjust vehicle operation, maintenance schedules, driver warnings, or other aspects of the vehicle, as described herein.

In some examples, one or more sensors 54 may be configured for detecting one or more conditions or parameters of the container 18 or of other modules of the vehicle 10 such as, but not limited to: the presence of the container or other module; location; motion; speed; acceleration; component temperature; state of maintenance, repair or operation; vibration or physical shock level; tilt angle; temperature of the interior of the container; humidity level of the interior of the container; state of operation, repair or maintenance of the container 18 or other module; battery power level of one or more batteries in the container 18 or other module; type or identity of the container 18 or other module; or the like. In certain examples in which one or more sensors 54 detect a type or identity of the container 18 or other module, the sensors 54 may be configured to detect rfid or other identification tag on the container 18 or other module, where the rfid or other identification tag includes information that identifies the container 18 or type of container.

In some examples, one or more sensors 54 may be configured for detecting one or more conditions or parameters of the interior of the container 18, or of one or more objects or cargo in the container 18. For example, one or more sensors 54 may be a temperature sensor configured and arranged to detect the temperature of the interior volume of the container 18 or the temperature of one or more objects or cargo in the container. One or more sensors 54 may be a vibration sensor configured and arranged to detect vibrations or physical shocks to the container 18 or to one or more objects or cargo in the container. In certain examples, one or more of such vibration sensors are included in a vibration isolation platform or device as described herein. One or more sensors 54 may be a presence sensor or motion sensor configured and arranged to detect the presence, absence or movement of one or more objects or cargo in the container.

In certain examples, the electronic circuit 40 may be configured to record signals or information from one or more sensors 54, for example, in an onboard electronic, non-transitory memory device 44. In some examples, the electronic circuit 40 is configured to create a local electronic record or log of signals or information from one or more sensors 54, over a period of time of operation of the vehicle 10. In such examples, the electronic record or log may be accessed in real time through wireless connection to a control station, or at a later time (e.g., after the signals or information is recorded), for example, by connection of the electronic circuit 40 to a suitable reading device at a control station. In certain examples, the log information may be reviewed to assess the performance of the vehicle 10, or of the vehicle operator (or both) over a period of time. In certain examples, the log information may be reviewed to assess the likely quality of the cargo delivery or assess whether and where possible damage to the cargo may have occurred. In certain examples, the log information regarding the quality of the cargo delivery may be provided to the delivery customer at the time of (or after) the delivery. Accordingly, log information may be used for various purposes including, but not limited to evaluation of one or more of mechanical performance, operator skill and judgment, operational safety, or quality of the delivery and cargo.

Alternatively or in addition, the electronic circuit 40 may be configured to communicate signals or information from one or more sensors 54, via the communication device(s) 52 to one or more stations (such as control stations) from which the vehicle 10 is remote. In certain examples, the electronic circuit 40 is configured to communicate such signals or information, in response to one or more conditions such as, but not limited to: a receipt of a request from the one or more stations, a passage of a programmed or predefined time period, reaching of a programmed or predefined time, the vehicle reaching or being present at a particular or pre-defined location, a battery on the vehicle reaching a particular or predefined power level, a sensor or other component of the vehicle detecting or reaching a predefined condition, or the like. In certain examples, the one or more stations are configured to create an electronic record or log of signals or information from one or more sensors 54, over a period of time of operation of the vehicle 10.

In some examples, the electronic record or log (or information directly from the sensors 54) is created at the control station (or is created at the vehicle 10 and transmitted to a control station, for example, in real time (or at designated time intervals) relative to the sensing or recording of the sensor information). In such examples, one or more control signals may be communicated from the control station and received by the electronic circuit 40 in the vehicle 10 (for example, via a communication device 52 in FIG. 10), where the control signals are responsive to the sensor information. In such examples, the control station may have suitable computing and processing electronics, personnel or combinations thereof that evaluate sensor information received from each vehicle 10, make one or more decisions relating to the operation, maintenance schedule or other aspects of each vehicle 10 based on the sensor information, and transmit communication signals to the vehicles 10 for controlling or adjusting the control of one or more of a brake, motor, electronic warning device, or other electronic device or component of each vehicle 10 based on the one or more decisions.

Alternatively or in addition, the electronic circuit 40 may be configured to process signals or information from one or more sensors 54, via the processor 42, and provide a warning to the operator of the vehicle 10 (for example, through the user interface 46 described herein with reference to FIG. 10), or make automatic operational changes on the vehicle 10 (such as, but not limited to controlling motor speed, adaptive braking force or other operational functions) in response to the sensor signals or information. In some examples, the electronic circuit 40 may provide control signals to other electronics 50 on the vehicle, for example, to control ride vibration condition (to smooth a ride by adjusting electronic or pneumatic vibration control devices) in response to one or more sensors 54 detecting vibrations over a threshold or road conditions that indicate physical shocks or vibrations.

In those or other examples, the electronic circuit 40 may provide control signals to other electronics 50 on the vehicle, for example, to control, slow or limit vehicle speed (by adjusting motor speed or braking force with adaptive braking control devices) in response to one or more sensors 54 detecting one or more conditions such as, but not limited to improper operation of a brake or a motor, improper connection of a module, adverse road conditions, upcoming curve or downward hill in a road, vibrations or physical shocks above a threshold, or the like. In particular examples, the electronic circuit 40 is configured to control various aspects of the vehicle 10, based on signals and information from one or more sensors 54, to control the ride, drive and operation of the vehicle 10 to be appropriate or optimal for the particular modules and cargo or type of cargo on the vehicle, as well as for the vehicle operator. In certain examples, the sensors 54 (or other vehicle electronics) may include radar, lidar, cameras or other sensors that are capable of detecting traffic or pedestrian's (or both).

In particular examples, the electronic circuit 40 may include or operate with artificial intelligence (AI) or other electronic adaptive control system that responds to conditions such as road conditions, driving conditions, driving skill of the operator, signals and information from one or more of the sensors 54, information communicated from a control station, or other information to automatically adjust one or more operating parameters of the vehicle. Such operating parameters may include, but are not limited to motor speed, braking force, vibration isolation device stiffness, container temperature, or other operational parameters. The operating parameters may be adjusted to improve or optimize ride quality for the contents of the container 18 or other module on the vehicle, to improve or optimize the comfort of the operator, to improve or optimize safety or to improve or optimize other aspects of the operation of the vehicle 10.

In certain examples, an adaptive braking system can adjust braking force based on one or more (or combination) of parameters detected by sensors 54, including, but not limited to the weight of the vehicle 10 or its load, the speed of the vehicle 10, a detected road condition, road curve or slope, traffic conditions or the like. In such examples, the braking force may be increased in response to a detection of higher weight, speed, downward slope, slow traffic (or combinations thereof), and decreased in response to a detection of lower weight, lower speed, more gradual downward or upward slope, or faster traffic conditions (or combinations thereof).

In certain examples, an adaptive speed control system can adjust vehicle motor speed or vehicle speed based on one or more or combination) of parameters detected by sensors 54, including, but not limited to the weight of the vehicle 10 or its load, the current speed of the vehicle 10, a detected road condition or slope, traffic conditions (or combinations thereof). In certain examples, an adaptive speed control system can adjust vehicle motor speed, braking force or vehicle speed based on any suitable number of parameters including, but not limited to travel or road conditions, vehicle traffic, pedestrian traffic, government or company set speed limits, and the like. In certain examples, an adaptive control system on the vehicle 10 can adjust other operational parameters of the vehicle 10, in response to signals detected by one or more sensors 54, including, but not limited to assisted power steering upon detection of a curve or turn in the path of the vehicle, or automatic illumination of one or more lights on the vehicle 10 when one or more sensors 54 on the vehicle 10 detect another vehicle, pedestrian or object within a threshold distance of the vehicle 10.

In certain examples, adaptive controls of the vehicle 10 are engaged and applied (e.g., to apply assisted power steering, braking, motor speed control or other vehicle control device or system) in response to one or more predefined conditions (such as a curve in the road or other road conditions) detected by one or more sensors (such as sensors 54 in FIG. 10). In some examples, such adaptive controls (steering servo motors, brake servo motors, drive motors or other controls) may be controlled, engaged or applied in response to detection of a weight load or other load on the vehicle 10 (as detected by one or more sensors, such as sensors 52 in FIG. 10), or based on a combination of one or more detected road conditions (such as a curve in the road, a hill in the road or other road conditions) and a detected vehicle weight load or other load.

In certain examples, one or more sensors 54 may detect the open or closed state of the door 26, or the presence or absence of one or more objects on the shelves 24 or other portion of the interior volume 19, and communicate sensed information to a remote station. In this manner, the information may be used at the remote station, to track and detect access to the interior volume 19 of the container. In some examples, the information may be compared with location information (from one or more location sensors) or time information (from one or more clocks or time sensors), to track or detect geographic locations or times (or both) that the interior volume 19 of the container was or is being accessed (and/or objects were or are being removed or added to the interior volume 19).

In particular examples, the one or more sensors 54 includes a location sensor for sensing or detecting the current location (geographic location, address location, route position location, or the like) of the vehicle. Such location sensors may include, but are not limited to satellite or global positioning system (GPS) devices, triangulation devices, or the like. In particular examples, the electronic circuit 40 obtains vehicle location information from the one or more location sensors and does one or more of the following: stores the information in the memory 44 as a record or log of the vehicles location over time (with or without time information associated with each location); communicates the location information (via the communication device(s) 52) to a remote station or other vehicle communication device; processes the location information to display to the user map information corresponding to the location of the vehicle; processes or stores the location information for other purposes; or the like.

In certain examples, the electronic circuit 40, including the one or more sensors 54 are configured to sense and process vehicle, road and driving conditions and provide automated driving and steering signals, for automated driving (autonomous driving) of the vehicle 10. In such examples, the vehicle 10 may be driven, with automated (driverless) control, with or without an on-board user. In some examples, the vehicle 10 may be driven with automated control based on route, location or address information stored in the memory 44, or received through the communication device(s) 52 (for example, from a station, other vehicle or other source), such that the vehicle 10 may be driven (automatically) along one or more defined routes, or to one or more defined locations or addresses, or the like.

In some examples, the vehicle 10 may be driven with automated control (as described herein) to transport the vehicle to a user. Once the vehicle 10 arrives at a designated location or a location associated with the user, the user may operate or ride the vehicle as described herein. In some examples, once the vehicle 10 arrives at the designated location or a location associated with the user, the user may thereafter operate the vehicle under the user's control, or a combination of user and automated control. Alternatively, the user may thereafter ride the vehicle 10, while the vehicle continues to operate under automated control. In some examples, the vehicle 10 may be controlled (for automated control) with control information or wireless control signals received from a control station as described herein.

In certain examples, the electronic circuit 40, including the one or more sensors 54 are configured to sense and process vehicle, road and driving conditions and provide an automated following operational mode, in which the vehicle 10 is controlled to automatically follow another vehicle 10 (as if being towed, but not physically connected). In such examples, a first vehicle (lead vehicle) may be controlled to travel on a road or other surface (either remotely, automatically, or by an on-board human operator) as described herein, while a second vehicle (following vehicle) is controlled to travel behind and follow near the first vehicle, for example, at a designated distance behind the first vehicle (such as, but not limited to a distance of up to two feet. In certain examples, each of the first vehicle and the second vehicle may be operated automatically or remotely, without an on-board human operator. In other examples, personnel may be carried on one or both the first and the second vehicles. In such automated following examples, one or both of the vehicles may include suitable sensors (e.g., corresponding to the sensors 54 in FIG. 10) that detect road conditions, the location and speed of other of the two vehicles, or other parameters. Signals from such sensors are provided to and used by one or more devices that control vehicle operation (such as the processor 42, electronics 50 or motor(s) 48 in FIG. 10), to control the speed, braking, steering and other operations of the second vehicle in a manner to closely follow the first vehicle.

While the above example of an automated following operational mode refers to two vehicles 10 (a first or lead vehicle and a second or following vehicle), in other examples, more than two vehicles 10 may be controlled for automated following operational mode. In such examples, a train or chain of two or more vehicles 10 may be controlled to follow a lead vehicle 10, in a single row or line, where a second vehicle follows a first (or lead) vehicle, and a third vehicle follows the second vehicle, and so on. In such examples, a single human operator may operate the first (or lead) vehicle, or any other vehicle in the train, while each other vehicle in the train has no on-board human operator. In other examples, one or more of the other vehicles may have an on-board human operator. In yet other examples, the train of vehicles 10 is operated remotely or automatically (without an on-board human operator) as described herein. In those examples, the ability to can improve efficiency by allowing multiple vehicles 10 to be transported together and carry larger loads as compared to a single vehicle.

Example Vehicles and Operations of Vehicles:

An example vehicle 10 is shown in FIGS. 1-9 and described herein. Another example of a vehicle 110 is described with reference to FIGS. 11-13. The vehicle 110 may correspond in structure, operation and function, as the vehicle 10, but has certain differences described and shown herein.

The vehicle 110 includes a chassis 112 (similar or corresponding to the chassis 12), rear wheels 114a and 114b (similar or corresponding to the rear wheels 14a and 14b) and a riding platform 116 (similar or corresponding to the riding platform 16). The riding platform 116 includes a panel that is pivotally connected to the chassis 112 by a connection linkage 134 (similar or corresponding to the connection linkage 34) having a hinge 136 (similar or corresponding to the hinge 36) that allows the panel of the riding platform 116 to be selectively pivoted between an upward pivoted position (represented by the position of the platform 16 in FIG. 1) and a downward pivoted position (shown in FIGS. 11 and 12). The connection linkage 134 includes a second pivotal or rotary link 135 (having a generally vertical axis of rotation) at the connection to the panel of the platform 116, to allow the riding platform 116 to pivot about a generally vertical axis relative to the chassis 12, for example, when the vehicle 10 is maneuvered (steered) around a corner.

The riding platform 116 also includes wheels 138 (which may be similar or corresponding to the wheels 38). In the example in FIGS. 11 and 12, the wheels 138 include a single pair of wheels having a common axel. The wheels 138 are larger than the wheels 38 and, thus, have a height that is greater than the riding height of the platform 116, when the platform is in the downward pivoted position. Accordingly, the platform 116 may include fenders or covers 116a and 116b that cover the upper portion of the wheels 138, to inhibit contact between the user and the wheels 138 during use.

Figure 11:
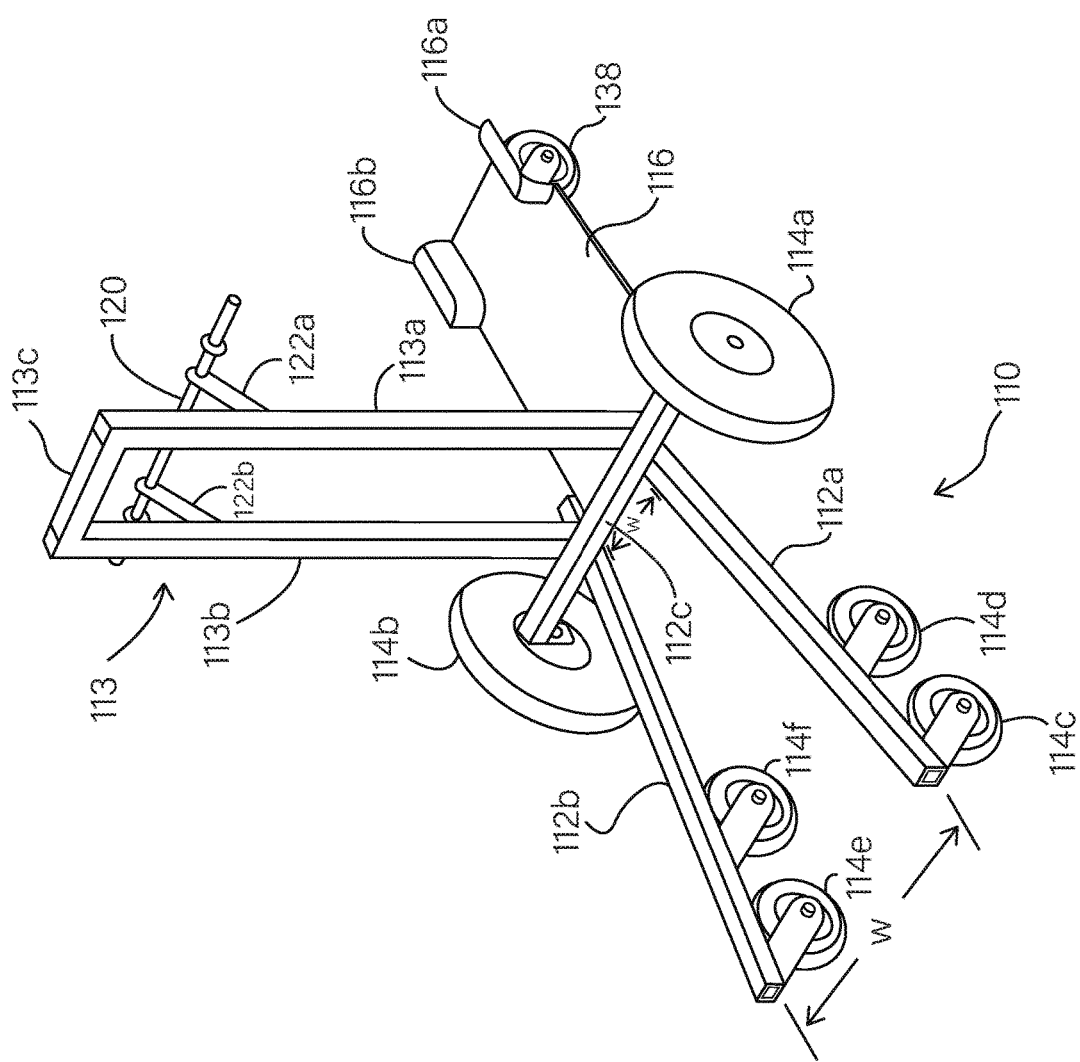
FIG. 11 is a front-right-side perspective view of a vehicle according to other examples.
Figure 12:
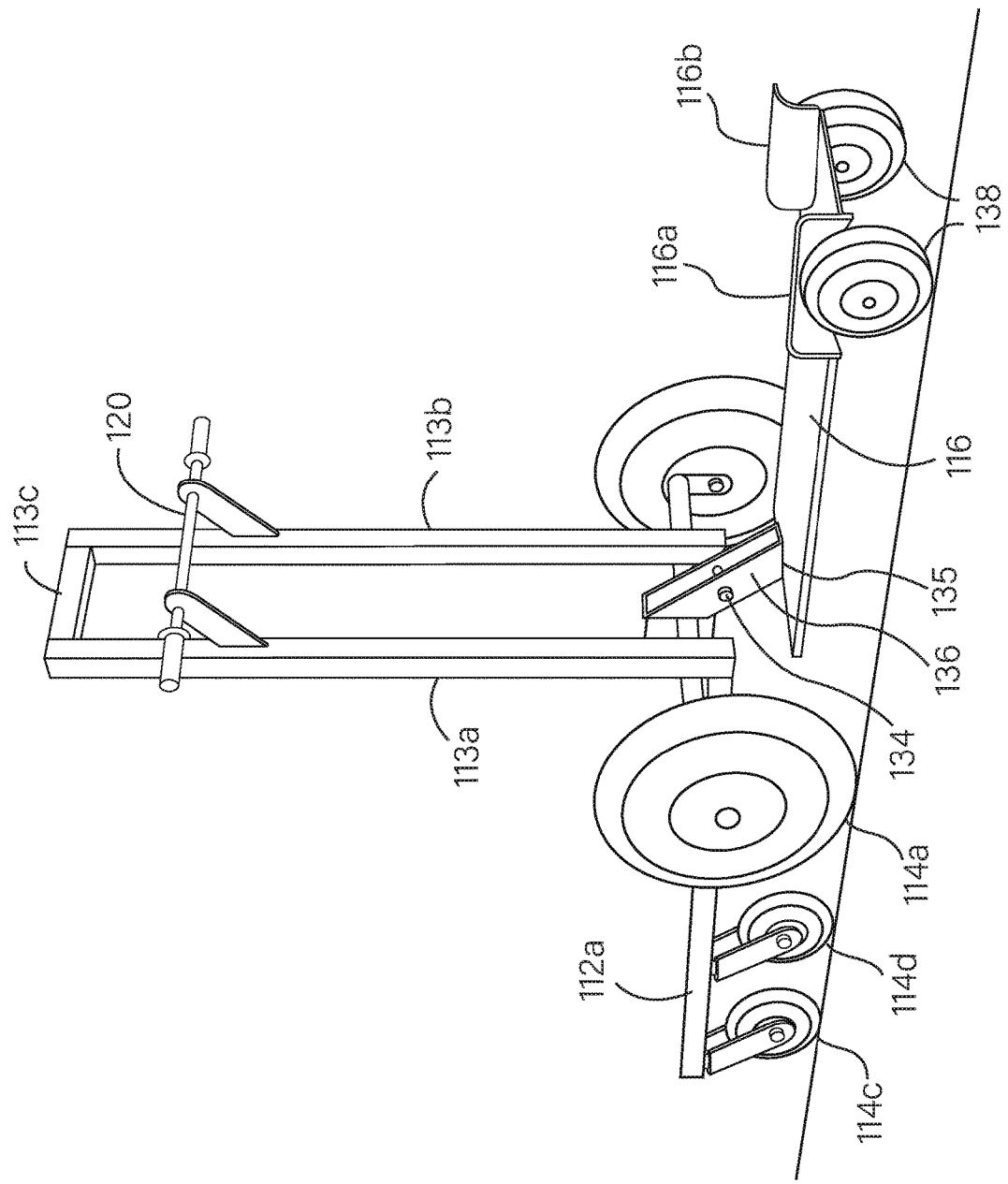
FIG. 12 is a rear-right-side perspective view of the vehicle of FIG. 11.
Figure 13:
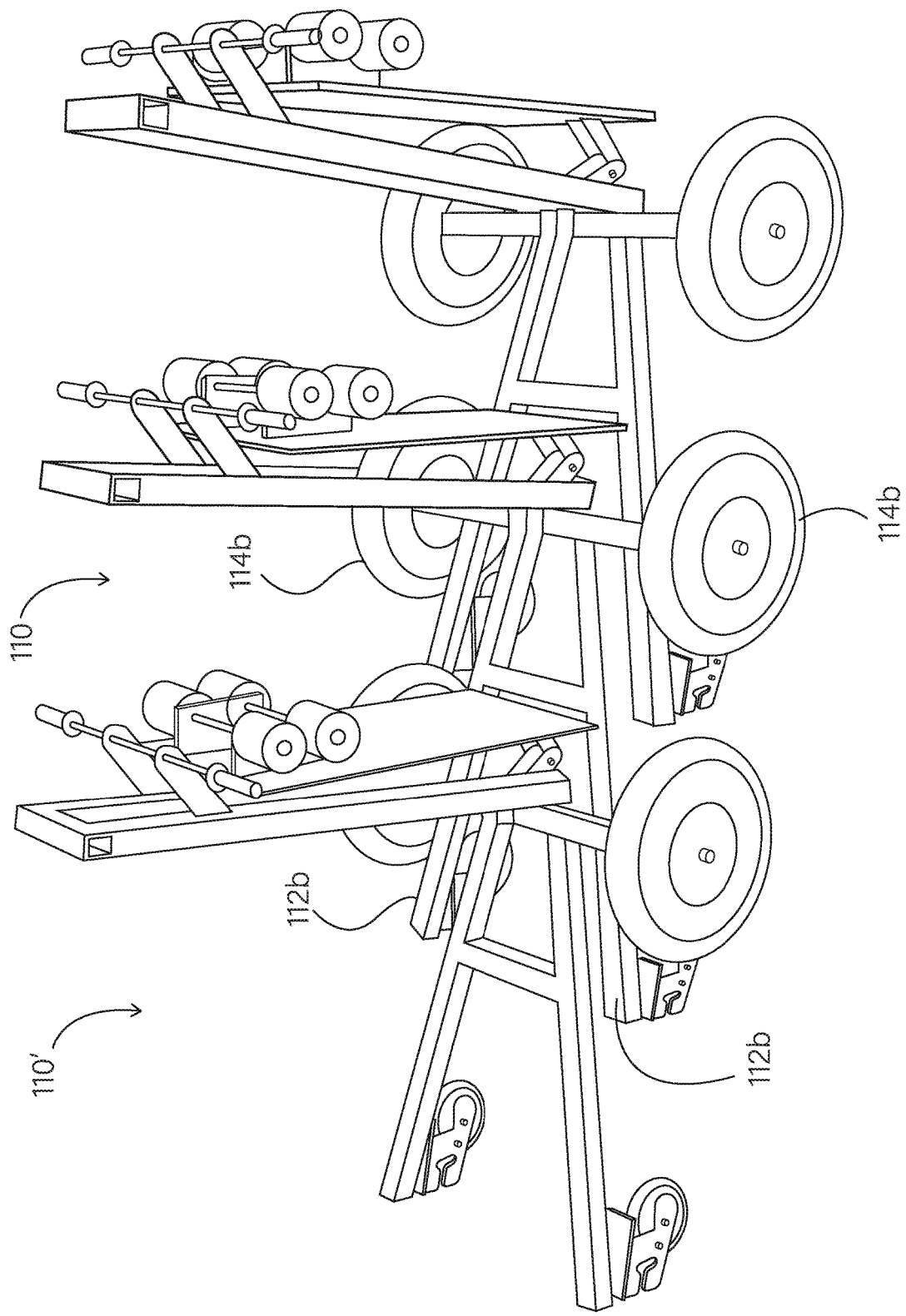
FIG. 13 is a perspective view of three vehicles, each corresponding to the vehicle of FIG. 11, in a nested arrangement.

The vehicle 110 may include a container, which may be similar to the container 18 or other container, but is not shown in FIGS. 11-13, to provide an unobstructed view of features of the chassis 112. The vehicle 110 includes a handle 120 (similar or corresponding to the handle 20).

The chassis 112 includes frame members 112a and 112b (similar or corresponding to frame members 12a and 12b) that extend generally horizontally, in a lengthwise dimension of the vehicle 110, from the front of the vehicle 10 toward the rear of the vehicle 110. The rigid frame of the chassis 112 includes one or more cross members 112c (similar or corresponding to cross member 12c) that extend generally horizontally, from one frame member 112a to the other frame member 112b, and rigidly connects the frame members 112a and 112b together.

The cross member 112c of the chassis 112 is shown at a location adjacent or corresponding to the axels of the rear wheels 114a and 114b. In some examples, the cross member 112c of the chassis 112 may hold or support the rear wheel axels and the rear wheels 114a and 114b. In those examples, the rear wheel axels may be connected to and supported by the cross member 112c of the chassis 112.

In the example in FIGS. 11-13 the vehicle 110 has four front wheels, including two front wheels 114c and 114d connected to and supported on the frame member 112a, and two front wheels 114e and 114f connected to and supported on the frame member 112b. In the example in FIGS. 11-13, the two front wheels 114c and 114d are arranged with the wheel 114d located behind the wheel 114c, relative to the lengthwise dimension of the vehicle 110. Similarly, the wheel 114f located behind the wheel 114e, relative to the lengthwise dimension of the vehicle 110. In other examples of any of the embodiments described herein, two or more than two front wheels may be supported on the frame member 112a or the frame member 112b (or on each of those frame members), along the lengthwise dimension of the vehicle 110. In yet other examples, two or more front wheels may be supported on the frame member 112a side-by-side (in the widthwise dimension of the vehicle 110). The number and arrangement of front wheels may be selected and configured, based on the context of use, the carrying capacity and other factors associated with the vehicle.

In certain examples, the frame members 112a and 112b are each linear shafts or bars that are arranged at a non-parallel angle relative to each other. The angle of the frame members 112a and 112b is such that the front ends of the frame members 112a and 112b (on the left side of FIG. 11 and of FIG. 12) are spaced apart by a width W that is greater than the width of the platform 116, while the rear ends of the frame members 112a and 112b connect with the cross member 112c and are spaced by a width w that is smaller than the width W. In some examples, the width w is approximately the same width as the platform 116.

In particular examples, the width W between the front end of the frame members 112a and 112b is sufficient to allow vehicle 110 to overlap or nest with a similar vehicle as shown in FIG. 13 (corresponding to a similar nesting arrangement shown in FIGS. 3 and 4 with regard to vehicles 10, 10' and 10"). To move a second vehicle 110' into an overlap or nesting arrangement with the vehicle 110, the second vehicle may be rolled into a position in which the two rear wheels 114a and 114b, respectively, are positioned adjacent (to the side of) the fame members 112a and 112b and outside of space between those frame members. In the nested arrangement, the chassis of that second vehicle is partially received within the space between the frame members 112a and 112b, as shown in FIG. 13.

The chassis 12 (or 112), including the frame members 12a and 12b (or 112a and 112b) provide one or more upward-facing surfaces (e.g., the upper surfaces of the frame members 12a, 12b, 112a and 112b) that provide a support structure for supporting a container (such as a container 18 as described herein or other container), or for supporting other objects or structures, or both a container and other objects or structures.

As shown in FIGS. 11 and 12, the chassis 110 may include a vertical support structure 113 that extends vertically (or partially vertically) upward from the frame members 112a and 112b. The support structure 113 includes vertical members 113a and 113b and a horizontal member 113c connecting the vertical members. The support structure 113 may provide a support for the handle 120 and additional structural rigidity and stability to the chassis 110. In certain examples, the handle 120 may include shafts or rods 122a and 122b (corresponding to the shafts or rods 22a and 22b)

that extend from the chassis 110 (from the support structure 113 of the chassis 110) to support the handle 120. The chassis 110 (including the frame members 112a, 112b, 112c and the vertical support structure 113 may be made of any suitably rigid material including, but not limited to metal, wood, plastic, composite material or a combination thereof.

In certain examples, as shown in FIGS. 14-19, the vehicle 10 (or 110) may include a container (for example, corresponding to the container 18 described herein), and the vehicle 10 (or 110) may be arranged in a third mode or state (corresponding to the mode or state of the vehicle 10 in FIGS. 3 and 4) in which the container 18 is in a folded state. Alternatively, the examples as shown in FIGS. 14-19 may include a rear section of the container 18 (without the front section of the container) as described herein. In yet other examples, the power source and control electronics may be mounted or supported directly on the chassis 12, such that the container 18 (or rear section of the container 18) may be selectively omitted (or selectively removed as a module). In those example modes or states, a front portion of the frame members 12a and 12b (or 112a and 112b) extends outward (or outward from the front of the folded container 18), toward the front of the vehicle 10 (or 110). The front portion of the frame members 12a and 12b (or 112a and 112b) provides one or more support surfaces for supporting one or more other objects or structures, such as, but not limited to a chair or seating structure, another container, cargo of various forms, other vehicles, other users, or the like.

In certain examples, one or more flat-bed or pallet support panels or platforms (such as, but not limited to a flat panel or platform (not shown)) may be placed or attached on top of the frame members 12a and 12b (or 112a and 112b), to provide a horizontal, flat surface, on which one or more objects or structures may be placed and supported. In such examples, the front portion of the frame members 12a and 12b (or 112a and 112b) may provide a support surface for a pallet, flat-bed or other generally flat supporting structure that provides an upward-facing surface for supporting cargo, such as, but not limited to a chair, bench or other seating structure 60, the box-shaped cargo 62, a detachable remote access container system (DRACS), or any other cargo that can be supported on a generally flat surface.

A flat support surface on the frame members 12a and 12b (or 112a and 112b) can be used for a variety of purposes including, but not limited to those shown in FIGS. 14-19, as well as other purposes such as carrying standard sized pallets, crates or boxes of food, wine, produce or other cargo. In some examples, the flat support surface of the flat panel or platform may be provided with friction enhancing material, patterns (e.g., grid or other patterns) or other raised or recessed features to help retain cargo or personnel placed on the support surface. In some examples, the flat panel or platform may be provided with rails, trap rails, short walls or other structures along one or more (or each) peripheral edge of the panel or platform, to help retain cargo. In some examples, such rails, walls or other peripheral structures, or the flat support surface itself, may be provided with one or more (or a plurality of holes), and the vehicle system may include one or more (or a plurality of) hooks, straps, ropes, or other retaining features, that may be received in the holes for tying down or holding cargo on the flat panel or platform. Alternatively or in addition, one or more rails, walls or other peripheral structures may extend laterally from side edges or surfaces of the flat panel or platform, or from a bottom surface of the flat panel or platform (or from both the side and bottom surfaces).

The flat panel or platform may be attached to the frame members 12a and 12b (or 112a and 112b) in any suitable manner. In certain examples, the flat panel or platform may be configured with a connecting system including one or more quick connection and quick release connector (such as, but not limited to a quick release latch as described above), that allows a user (or other personnel) to quickly and easily connect the flat panel or platform to the frame members 12a and 12b (or 112a and 112b) or release the flat panel or platform from a connected state on the frame members 12a and 12b (or 112a and 112b).

Figure 14:
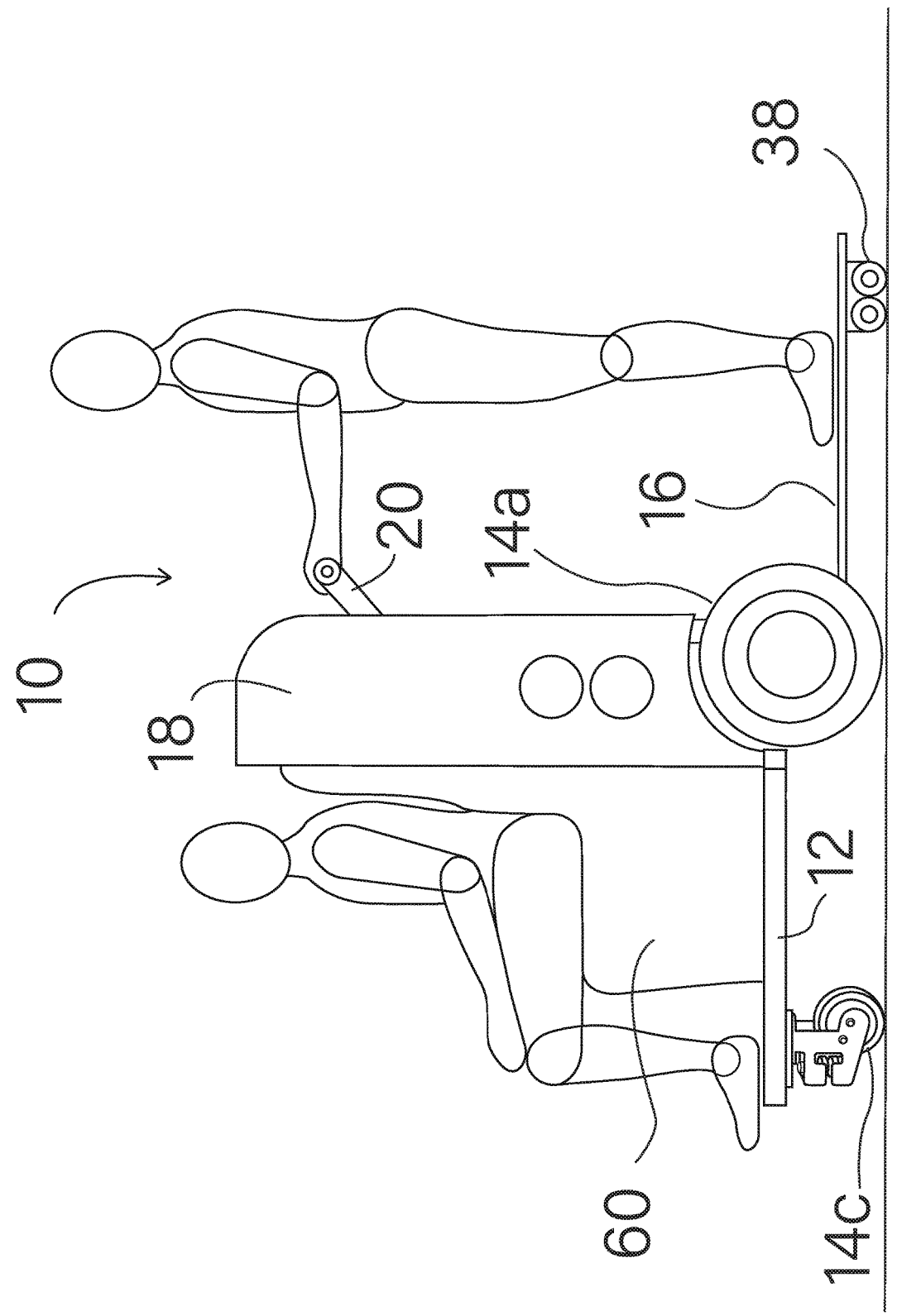
Figure 15:
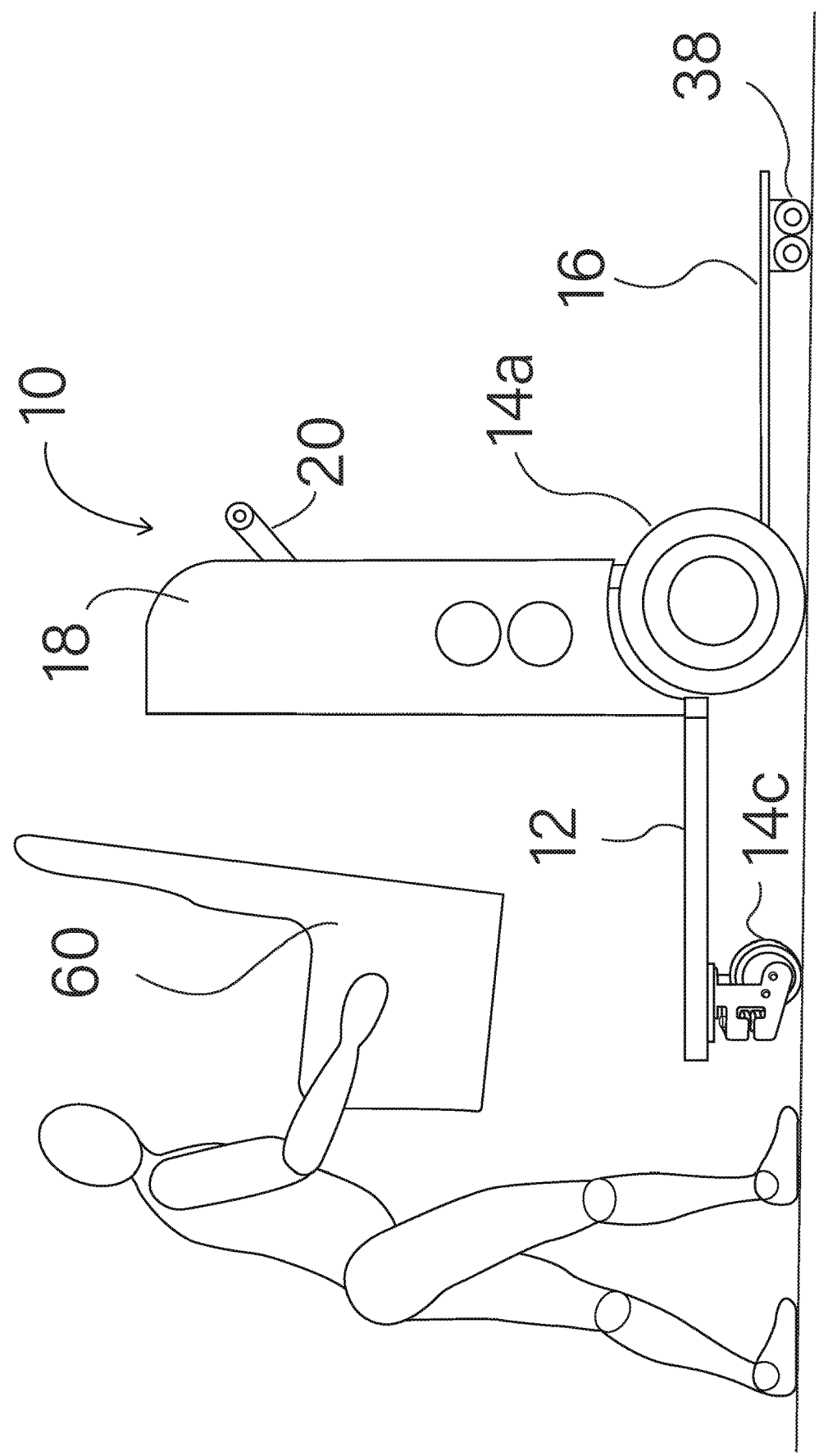

In the example shown in FIGS. 14 and 15, the front portion of the frame members 12a and 12b (or 112a and 112b) provides a support surface for supporting a chair, bench or other seating structure 60 on which another user or other person may sit, while the vehicle 10 (or 110) is driven and operated as described herein. In certain examples as shown in FIGS. 14 and 15, the chair or seating structure 60 may be selectively installed and secured to the chassis 10 (or 110) and selectively removed from the chassis 10 (or 110), depending upon contexts of use of the vehicle.

Figure 16:
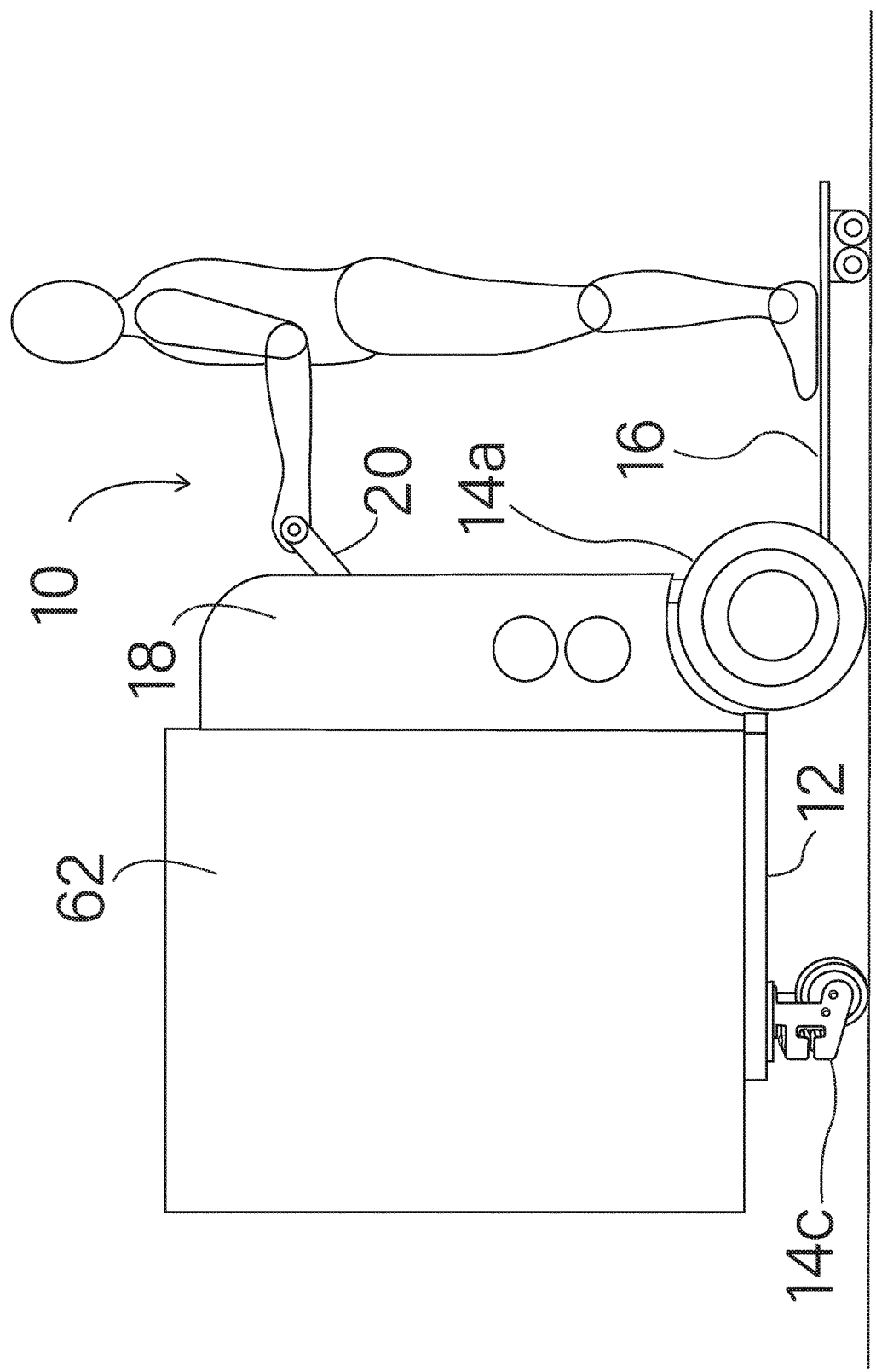
Figure 17:
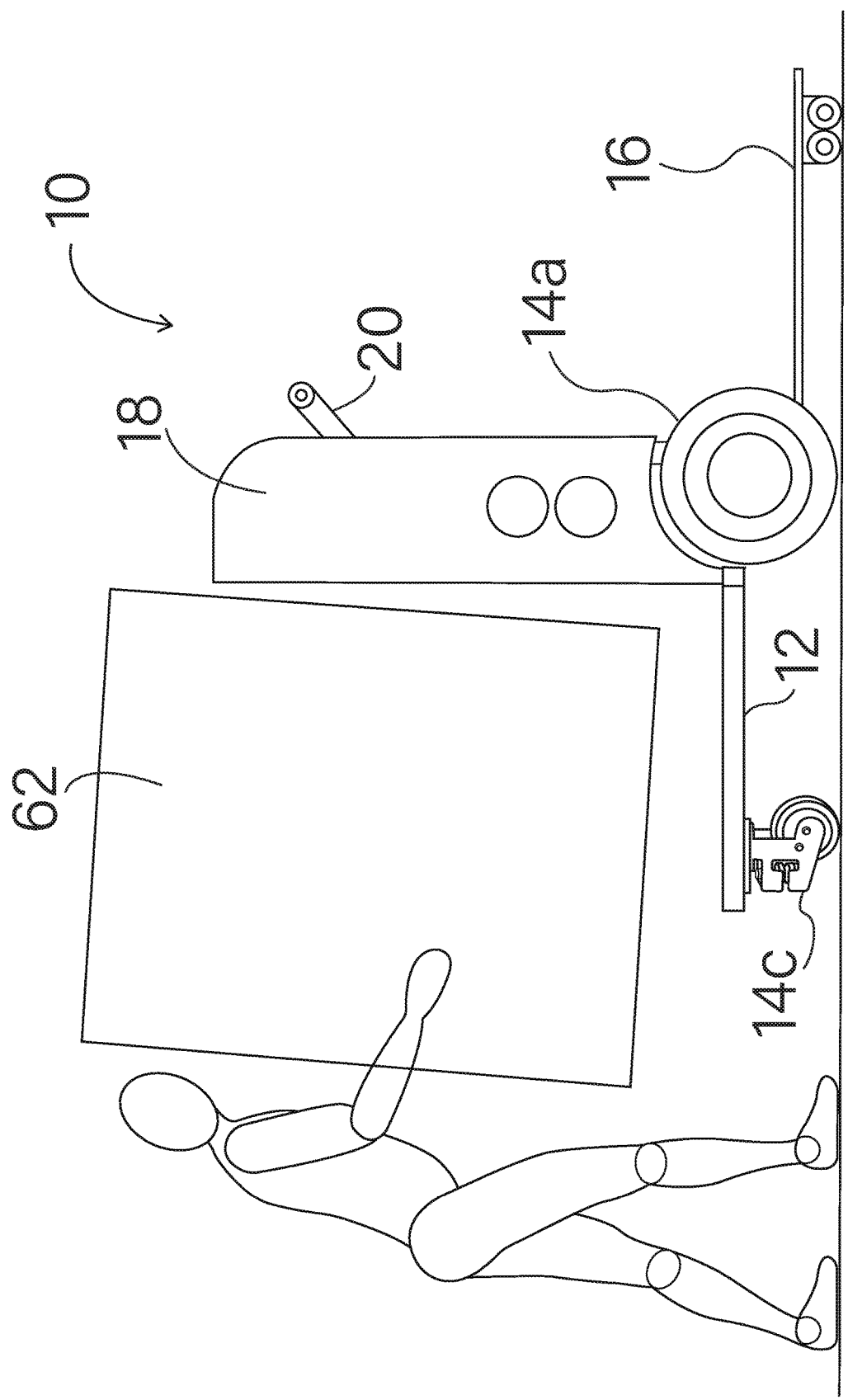

In the example shown in FIGS. 16 and 17, the front portion of the frame members 12a and 12b (or 112a and 112b) provides a support surface for supporting another container or box-shaped cargo 62. In certain examples, the box-shaped cargo 62 may be or correspond to another container 18, or may correspond to a container 78 as described below (including some or all of the features described herein with regard to the container 18 or the container 78). In certain examples, the box-shaped cargo 62 may include cooling, refrigeration, heating or cooking devices, systems or equipment as described herein with regard to container 18 or container 78. In certain examples, the box-shaped cargo 62 may be configured to provide a detachable remote access container system (DRACS) as described herein. In certain examples, the box-shaped cargo 62 may include or be accompanied by a lifting system such as, but not limited to the lifting system 80 described herein.

In some examples, one or more operations or functions of the box-shaped cargo 62 (or of the lifting system for the cargo 62) may be controlled with control information or wireless control signals received from a control station as described herein. In such examples, the box-shaped cargo 62 includes suitable electronics (for example, similar to electronics 40 as described herein or other suitable electronics) for communicating wireless signals with a control station and for processing information to provide the operations and functions described herein.

Figure 18:
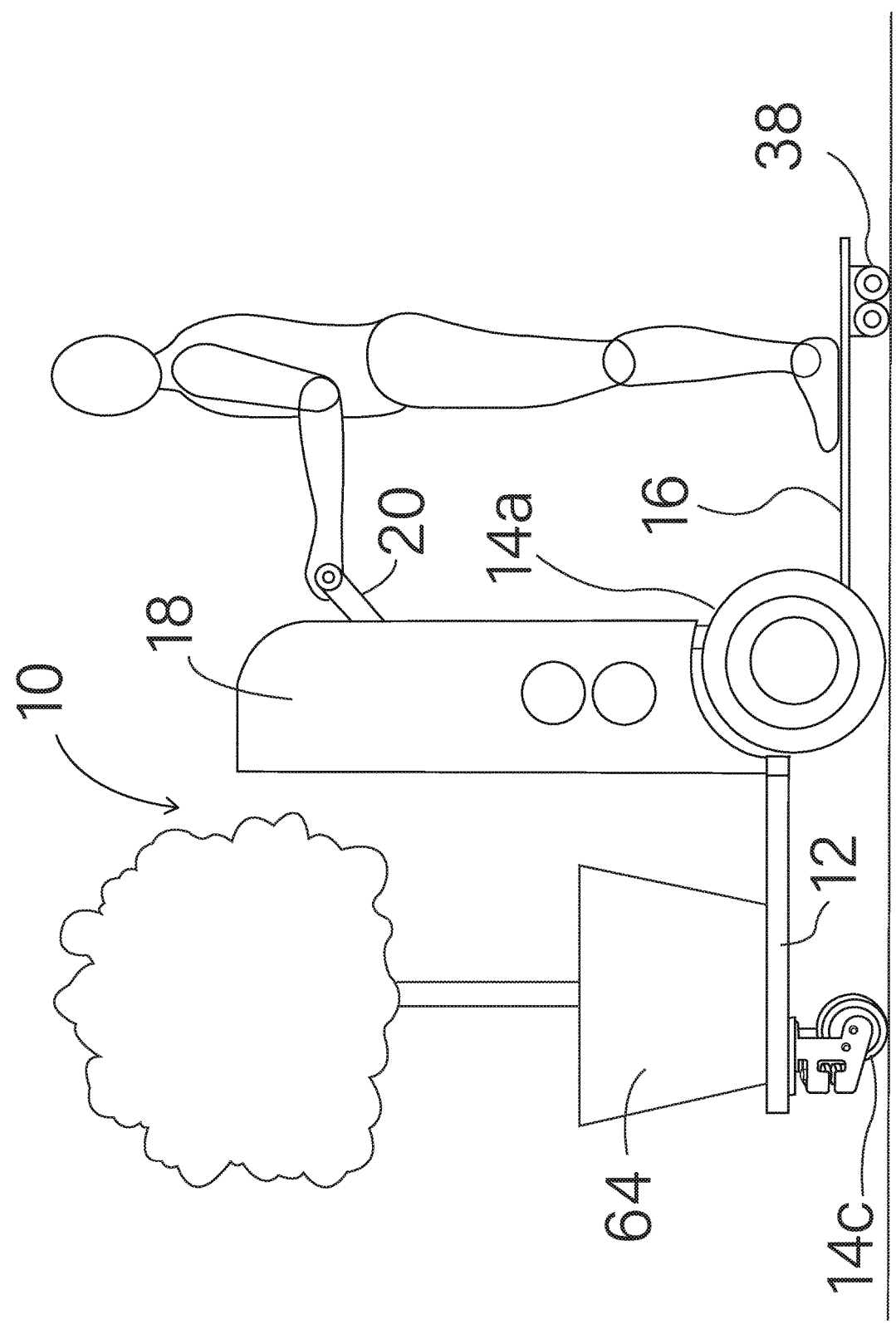
Figure 19:
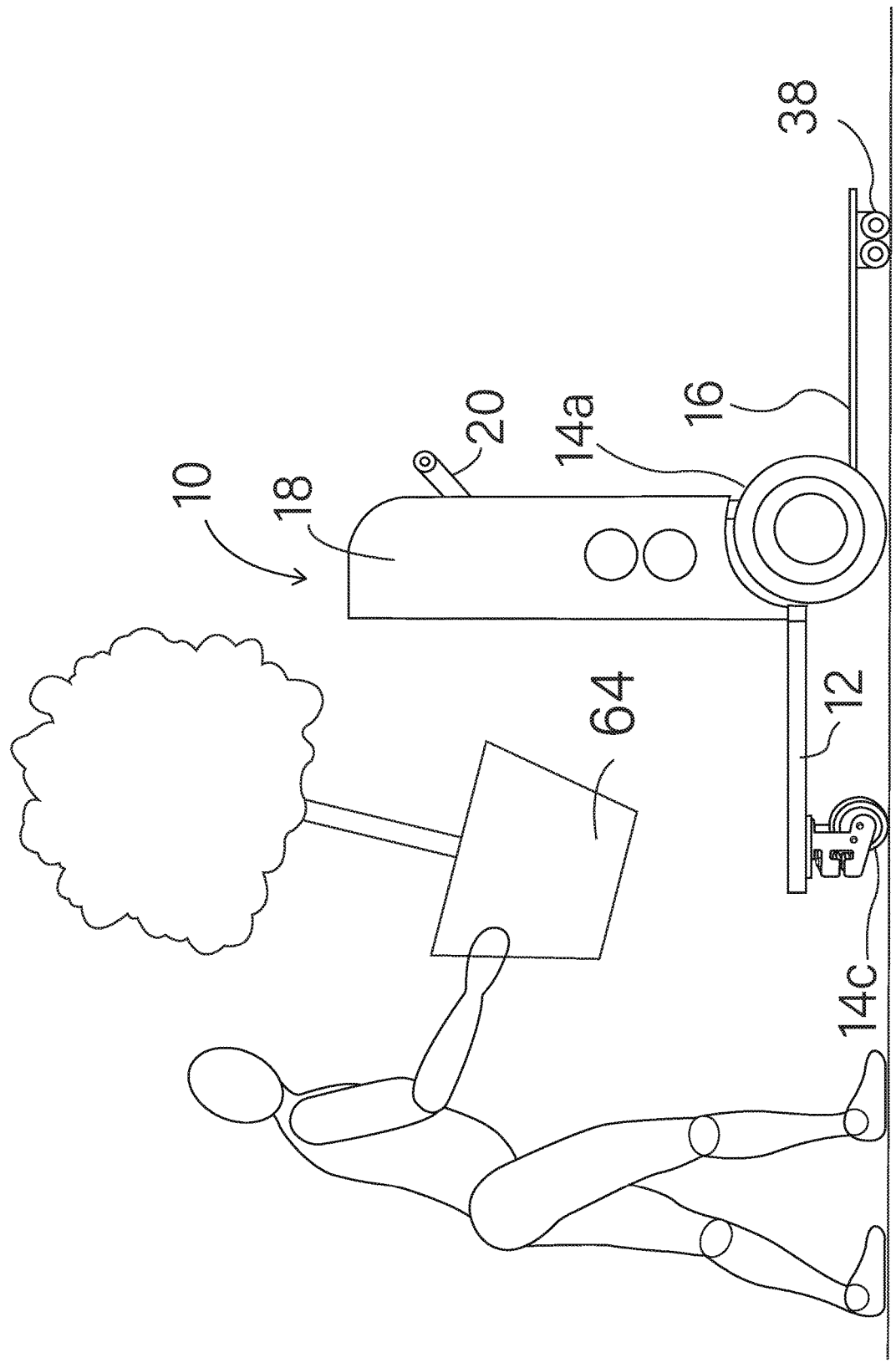

In the example shown in FIGS. 18 and 19, the front portion of the frame members 12a and 12b (or 112a and 112b) provides a support surface for supporting other objects or cargo 64 that may not be box-shaped. In certain examples as shown in FIGS. 16 and 17 and in FIGS. 18 and 19, the other container or cargo may be selectively placed on and secured to the chassis 10 (or 110) and selectively removed from the chassis 10 (or 110), depending upon contexts of use of the vehicle.

In certain examples, a vehicle system may include a trailer 70 that is connectable to the platform 16 or 116 or other parts of the vehicle 10 (or vehicle 110) as shown in FIGS. 20-31. The trailer 70 may include a trailer chassis 72 (such as, but not limited to a structural frame or platform) supported on wheels 74 for rolling on the ground 1 or other surface. The trailer 70 also includes a hitch or connection structure 76, for connecting the trailer 70 to the platform 16 (or the platform 116). Any suitable trailer connection hitch or structure may be employed for connecting the trailer 70 to the platform 16

Figure 20:
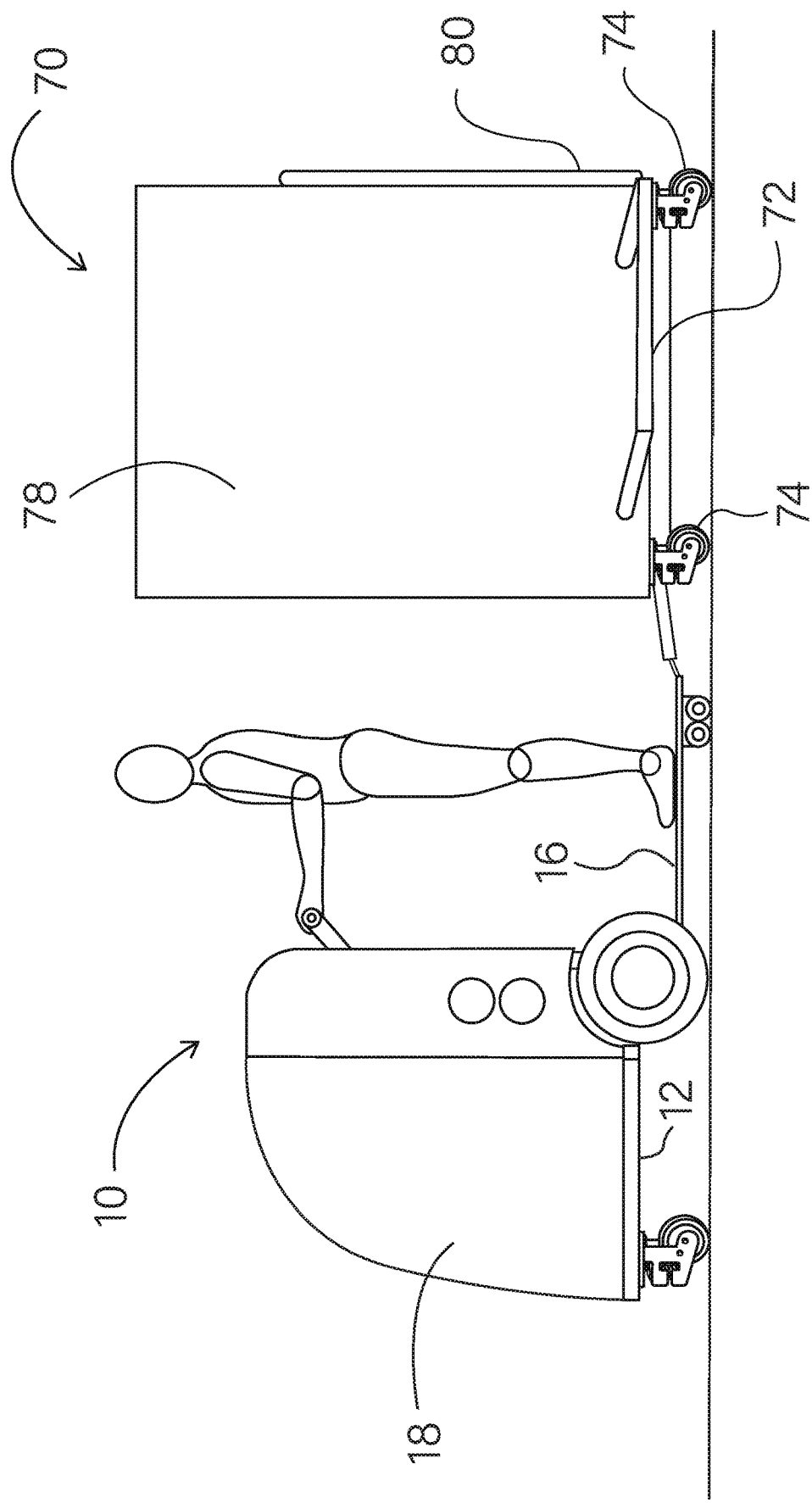
Figure 21:
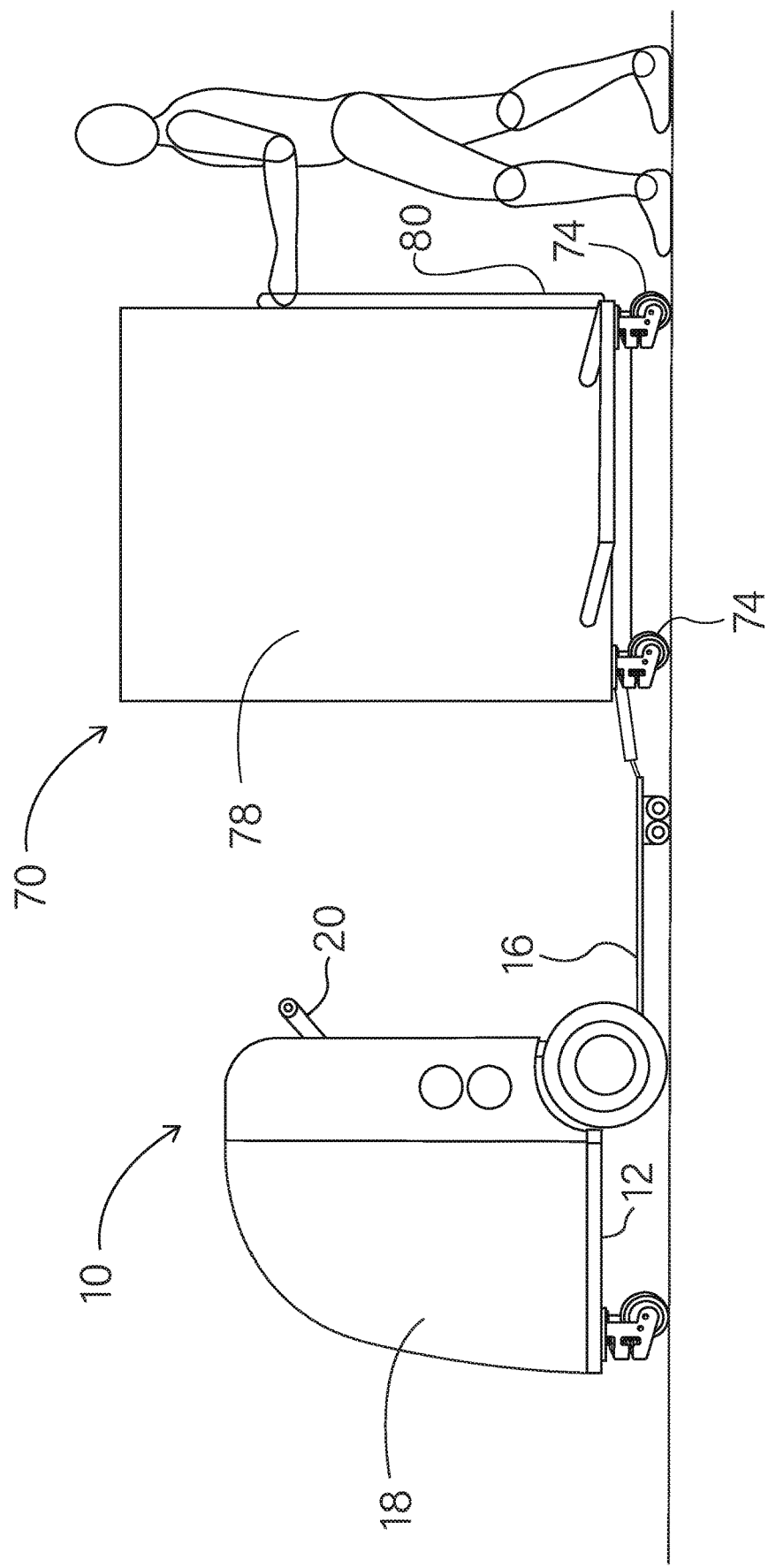

(or 116). In particular examples, the trailer chassis 72 has a generally flat upper surface on which a container, box, crate, or other object 78 may be placed and held, as shown in FIGS. 20 and 21.

Figure 22:
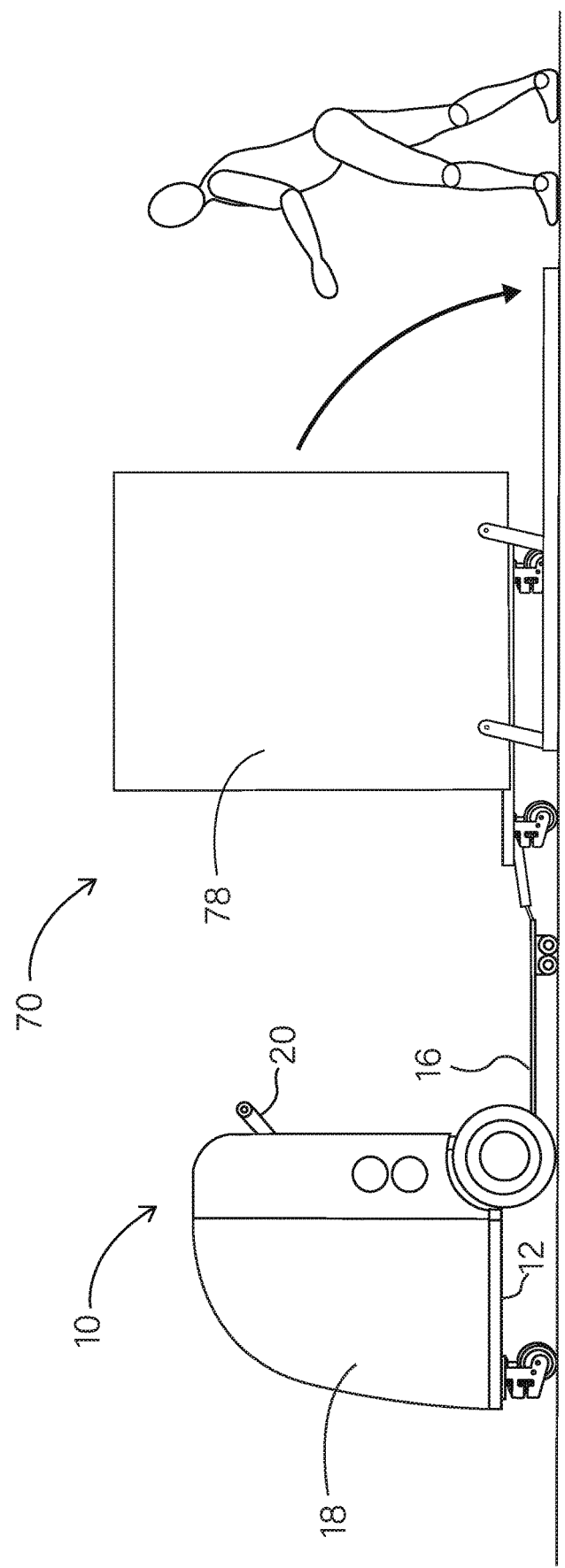
Figure 23:
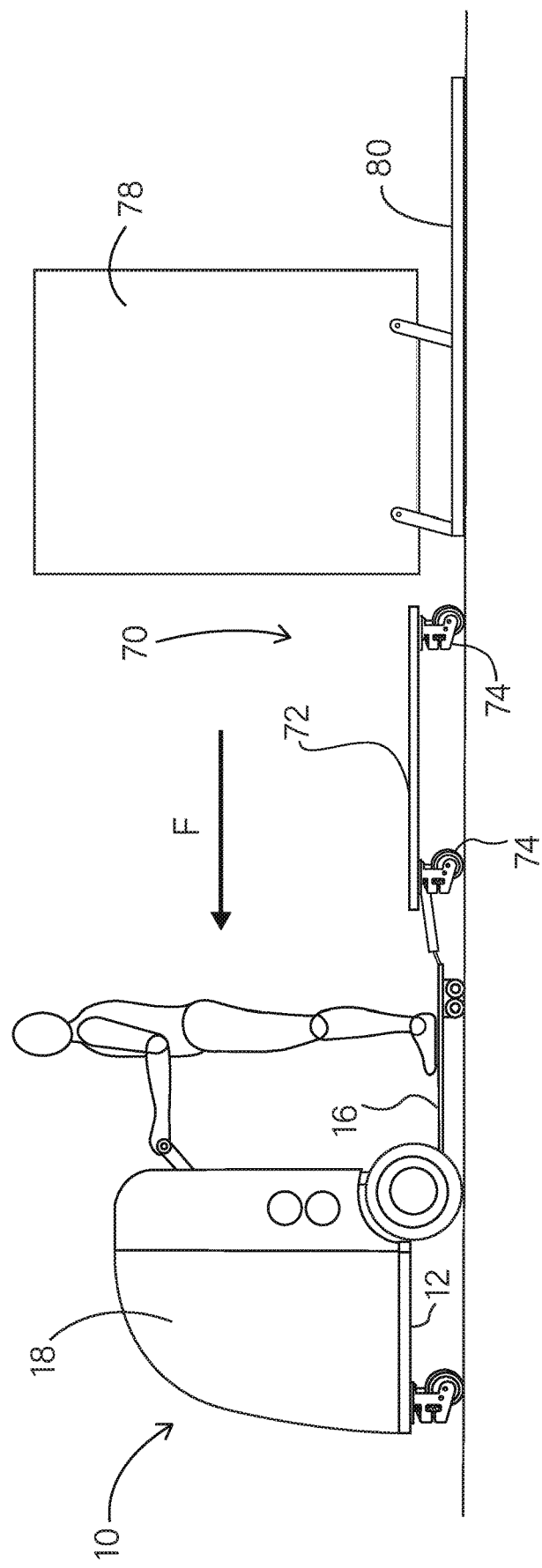
Figure 24:
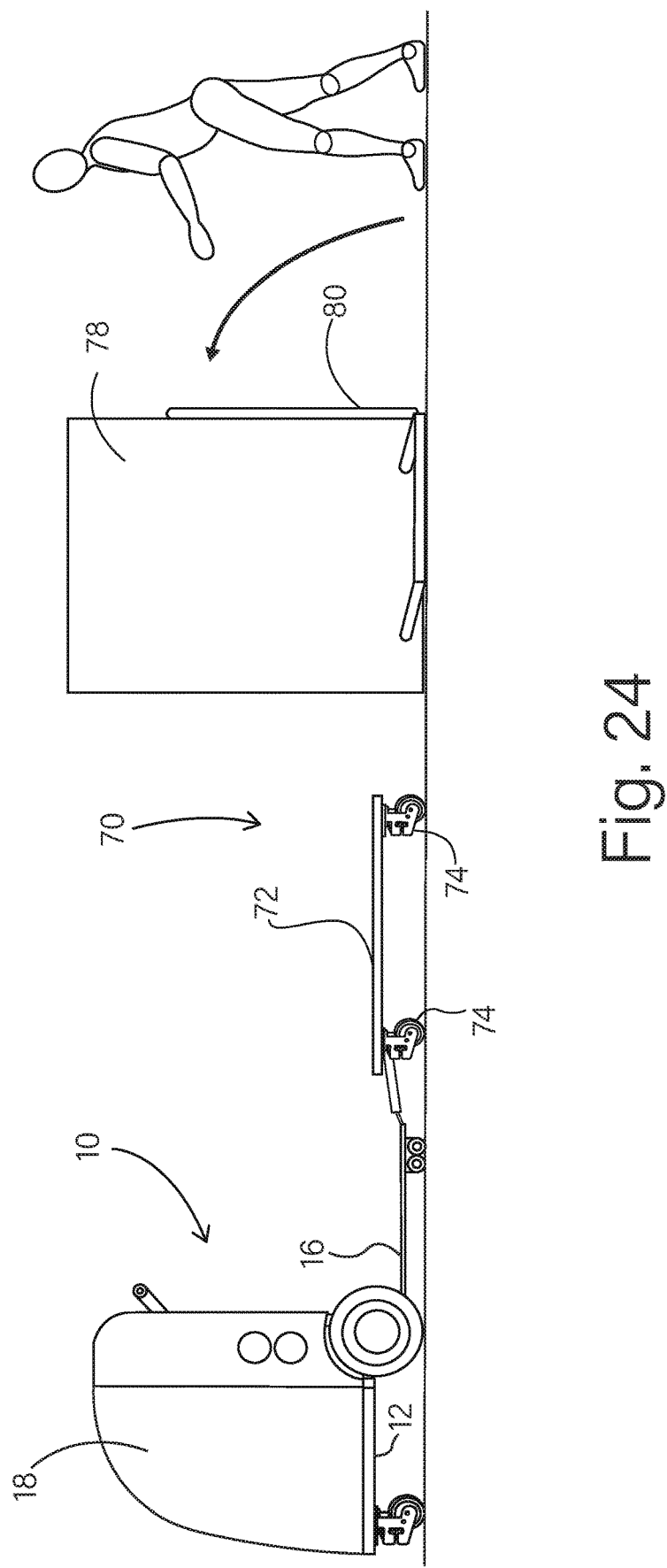

In certain examples, a container 78 is supported or held or the trailer 70, where the container 78 is configured to contain one or more other containers or other goods or objects. Also, in certain examples, the container 78 may include or is connected with a lifting system 80 for selectively raising the container 78 off of the trailer chassis 72, and selectively setting the container 78 onto the ground or other surface 1, as shown in FIGS. 22-24. In some examples, the lifting system 80 is connected to and remains with the container 78. In other examples, the lifting system 80 is separable from the container 78. The lifting system 80 may include any structure suitable for selectively raising the container and lowering the container. In some examples, the lifting system 80 may include one or more electronic motors, pneumatic lifts or jacks, or other suitable mechanisms for lifting the container 78 (and its contents).

In certain examples, the lifting system 80 may include a user-operated, manual or automated mechanism that is configured to be operated or controlled by a user to selectively raise and lower the container 78 relative to the trailer chassis 72 and the ground (or other surface) 1. For example, the lifting system 80 may include a frame or platform 81, a handle or lever 82, a horizontal or cross member 83, and a plurality of legs (for example, rear legs 84a, and 84b, and front legs 84c and 84d, where rear leg 84b is similar to rear leg 84a but is not in view). The handle or lever 82 is pivotally connected to the horizontal or cross member 83, to pivot between an upward state (shown in FIGS. 20, 21, 24, 25 and 26) and a downward state (shown in FIGS. 22 and 23).

The legs 84a-d are pivotally connected to the fame or platform 81, at respective pivot axes 85a-d, to pivot between a retracted state (shown in FIGS. 20, 21, 24, 25, 26 and 27) to an extended state (shown in FIGS. 22 and 23). The legs 84a-d are also pivotally connected to the horizontal or cross member 83 at respective pivot axes (where pivot axes 86a and 86c are in view, in FIGS. 20-31), to pivot between a retracted state (shown in FIGS. 20, 21, 24, 25, 26 and 27) to an extended state (shown in FIGS. 22 and 23). In the retracted state, the legs 84a-d are pivoted upward and generally horizontal, so as not to interfere with movement or motion of the vehicle 10 (or 110) and the trailer 70. In the extended state, the legs 84a-d extend downward and generally vertically, such that the legs 84 or the horizontal or cross member 83 (or both) are engaged with the ground (or other surface), to support and lift the container 78. In certain examples, the lifting system 80 operates to selectively lift the container 78, or to lower the container 78, while maintaining the container 78 in a desired (e.g., horizontal) orientation.

In certain examples, the lifting system 80 is operated by a user (or other person) gripping the handle or lever 82 when the handle or lever 82 is in an upright position, as shown in FIG. 21. Then the user (or other person) may apply a manual force to pivot the handle or lever 82 downward, as shown in FIG. 22. In some examples, the handle or lever 82 is configured to be pivoted manually, without additional automated assistance. In other examples, one or more force-generating devices is connected to the handle or lever 82, or to the legs 84, to provide an automated force sufficient to pivot the handle or lever 82, or for assisting the user to manually pivot the handle or lever 82. In such examples, the force-generating device(s) may include one or more of an electronic motor, electronic solenoid, other electronic force-generating device, pneumatic cylinder and pump, or other pneumatic force-generating device, or the like.

As the handle or lever 82 pivots downward, the pivoting action causes the legs 84 to pivot downward to engage the ground (or other surface) 1 with the legs 84 or the handle or lever 82 (or both), as shown in FIG. 22. When the legs 84 or the handle or lever 82 (or both) engage the ground (or other surface) 1, the further pivoting action of the legs 84 raises or lifts the container 78 (and the lifting system 80) off of the trailer chassis 72 by a sufficient amount to allow the trailer chassis 72 to be rolled out from below the container 78.

Figure 25:
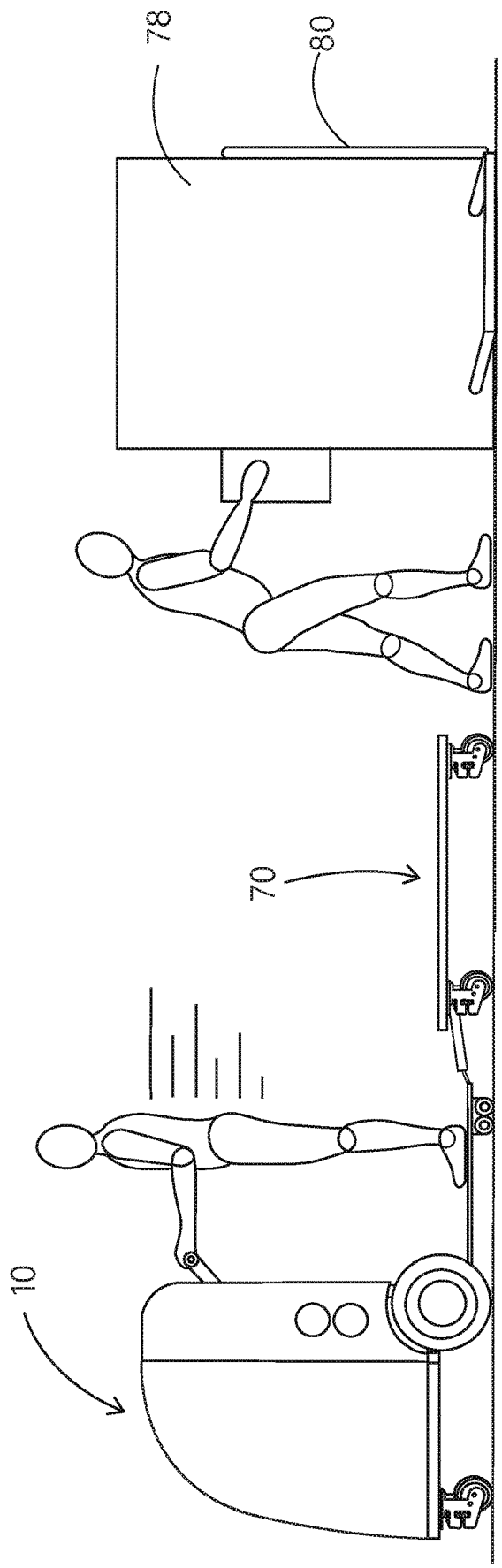

For example, once the legs 84 are pivoted downward to lift the container 78 off of the trailer chassis 72, the user may drive or push the vehicle 10 (or 110) in a forward direction F a sufficient distance to move the trailer 70 away from the container 78 and the lifting system 80 (away from a location directly below the container 78), as shown in FIG. 23. Once the trailer 70 has been moved away from the container 78 and the lifting system 80, the lifting system 80 may be operated to pivot the legs 74 upward and lower the container 78 onto the ground (or other surface) 1. For example, the user may raise the handle or lever 82 (using manual force, or, in some examples, electric or pneumatic assistance as discussed herein), to pivot the legs 74 upward and lower the container 78, as shown in FIG. 24. In that state, the vehicle 10 (or 110) may be driven or pushed to another location, leaving the container 78 at the particular or designated location for access by the user or other persons at that location, as shown in FIG. 25.

In such examples, the trailer 70 (including the container 78 and the lifting system 80) can travel to designated or remote locations, where the user may drop off the container 78, and then travel to another location while leaving the container 78 at the designated or remote location. In other examples, the trailer 70 (with the container 78) may be detached from the rest of the vehicle 10 (or 110) and dropped off at a designated or remote location, and the rest of the vehicle 10 (or 110) may travel to another location while leaving the trailer 70 and the container 78 at the designated or remote location.

In some examples, the container 78 (or a combination of the trailer 70 and the container 78) may provide a deployable power source and include or hold one or more batteries, electrical power generators (electrically or gas powered), solar panels or other solar power collectors and sun tracking systems to direct solar panels or collectors toward the sun, or any combination thereof, to provide a mobile and deployable power facility. In such examples, the container 78 (or the trailer 72, or both the container 18 and the trailer 72) may include a suitable power inverter to convert DC electrical power from the on-board power supply to AC electrical power to supply to external equipment. In those or other examples, the container 18 (or the trailer 72, or both the container 18 and the trailer 72) may include one or more cables, electrical outlet sockets or connectors to supply electrical power to external equipment. In examples having solar power collectors, the container 78 may contain a deployable solar panel structure (such as, but not limited to one or more solar panels mounted on a folding, telescoping, or other support mechanism) that can selectively extend or retract one or more solar panels for solar collection and stowage, respectively. In such examples, the container 78 may be deployed (dropped off) at a designated or remote location, to provide a source of electrical power to electrical devices or equipment at the designated or remote location.

In some examples, the container 78 may provide a mobile and deployable air treatment facility, for treating or conditioning the air in or around a designated area. In such examples, the mobile and deployable air treatment facility may be configured to provide heated air, cooled air, cleaned or filtered air or combinations thereof. In such examples, the container 78 may include one or more of air heating devices, air cooling devices or air cleaning or purifying devices. Such air heating devices may include, but are not limited to electrical, solar or gas-powered heaters, fans and combinations thereof. Such refrigeration or cooling devices may include, but are not limited to, compressed gas refrigeration systems, ice or water cooled systems, swamp cooling systems, fans or any combination thereof. Such air cleaning or purifying devices may include, but are not limited to one or more air filters, ultra-violet (UV) or UVC emitting devices, disinfectant or anti-pathogen emitting devices, or the like. In those examples, the container 78 may be transported to (or transported to and dropped off) at a designated or remote location, to provide a source of cleaned or purified air, heated or cooled air, or combinations thereof. Such air cleaning, heating or cooling facilities may be deployed to a designated or remote location for providing purified air to, or for heating or cooling personnel, plants, animals, electrical or mechanical equipment, or other objects or biological materials at the designated or remote location.

In some examples, the container 78 may provide a deployable delivery system for packages, items, goods, food or other objects. In such examples, the container 78 may include one or more receptacles having a door or other closure mechanism, for containing one or more packages, boxes, food items or other objects, or the like. In such examples, one or more of the receptacles may be selectively unlocked or opened to allow access to the contents of the receptacle by the user or by a designated person. Thus, in some examples, the container 78 may be transported to a particular or designated location by the vehicle 10 (or 110) and dropped off at that location. Then one or more other users or designated persons at the designated location may selectively unlock and open one or more receptacles on the container 78, to access contents of the receptacle, as shown in FIG. 25. In some examples, the lock may be controlled to lock or unlock electronically, for example, in response to a wireless signal from a mobile communication device carried by the customer, the user or other personnel, or remotely, for example, in response to a signal from a station (control station or the like) as described herein.

In some examples, the container 78 may include one or more (or a plurality) of doors or other closure mechanisms that can be selectively opened and closed, and when opened, allow access to one or more (or a plurality) of enclosed chambers or volumes within the container 78, for containing packages, items, goods, food items or other objects. In some examples, the objects within the enclosed chambers of the container 78 may be objects designated for one or more customers, where the one or more customers may access one or more of the enclosed chambers of the container 78 through one or more of the doors or other closure mechanisms, once the container 78 has been delivered or placed in a designated location.

In some examples, each of the one or more (or a plurality) of doors or other closure mechanisms of the container 78 may include a lock for selectively locking the door or other closure mechanism in the closed state that inhibits access to the chamber associated with the door or other closure mechanism, and selectively unlocking the door or other closure mechanism to allow the door to be opened to access the contents of the associated chamber. In some examples, each lock may include an electronic lock that is activated electronically. In some examples, each lock may be activated remotely (for example, from a remote station or other location), to control access to the interior volume of the container 18. In some examples, the lock of each door or other closure mechanisms of the container 78 may be separately controlled by electronics (described herein) to be activated (to change states between unlocked and locked states) by a wireless signal from a remote communication or a local communication device, such as, but not limited to a mobile smart phone or other mobile communication device that may be carried by the customer, the user or another person designated or authorized to unlock one or more of the doors or other closure mechanisms. The wireless communication signal connection between electronic lock(s) on the container 78 and the remote communication or a local communication device may include any suitable wireless communication technology including, but not limited to Bluetooth, radio frequency (RF), satellite, optical or the like.

In the example in FIGS. 20-25, vehicle 10 (or 110) and the trailer 70 (including the container 78) may be configured to provide a detachable remote access container system (DRACS). In other examples, the vehicle 10 (or 110) in FIGS. 20-25 may provide a direct delivery system in which the container 78 (or other objects) are transported and delivered to a designated geographic location, address or person.

In any of those or other examples, the container 78 may include cooling or refrigeration equipment (for example, similar to that discussed above for container 18), for cooling the temperature of an interior volume of the container 78 or for cooling one or more separate chambers within the container 78. In such examples, the container 78 may be configured for holding, transporting, and providing access to perishable goods or other products or objects that require or benefit from a cooler temperature environment. The cooling or refrigeration equipment may be configured for providing any desired temperature or temperature range within an interior volume (or within one or more chambers) of the container 78, such as, but not limited to refrigeration cooling in the temperature range of about 33° F. to about 60° F. In other examples, the cooling or refrigeration equipment for the container 78 may be configured for freezing temperature cooling in the temperature range below 32° F. cooling. Cooling equipment may include, but is not limited to one or more of an electronic refrigeration device, a Peltier device, an ice box, an ice pack or other phase change material pack, or the like.

In any of those or other examples, the container 78 may include heating equipment (for example, similar to that discussed above for container 18), for heating the temperature of the interior volume of the container 78, or for heating one or more separate chambers within the container 78. In such examples, the heating equipment may be configured for providing any desired temperature or temperature range within the interior volume (or within one or more chambers) of the container 78, such as, but not limited to temperatures above 32° F., or between 80° F. and 150° F. In yet other examples, the heating equipment for the container 78 may be configured to provide sufficient heat to cook food or other material within the interior volume (or within one or more chambers) of the container 78, such as but not limited to temperatures above 150° F., or above 200° F., 300° F., 400° F. or the like. Heating equipment may include electronic or resistive heaters, conduction heaters, or the like.

In such examples, the cooling or refrigeration equipment, or the heating equipment (or both) may be accommodated in any suitable location on the trailer chassis 72 or, on or in the container 78. In certain examples, suitable ducts or thermal conductors may be provided on or in the container 78, between the cooling or refrigeration equipment and the interior volume (or one or more chambers) of the container 78, or between the heating equipment and the interior volume (or one or more chambers) of the container 78, for conveying thermal energy to or from the interior volume (or one or more chambers) of the container 78.

In certain examples, the container 78 may be configured to provide a mobile food or beverage preparation facility, mobile kitchen or other mobile point of sale facility (for example, similar to that discussed above for container 18). In such examples, the trailer 70, with the container 78, may be transported (for example, by the vehicle 10 or 110) to a desired location at which customers (or potential customers) may arrive or be present. The trailer 70 (or the combination of the trailer 70 with the vehicle 10 or 110, and the container 18), therefore, can operate as a facility by which the user (or other personnel at the desired location) may assist customers in purchasing (or otherwise obtaining) food items or other products from the container 78 (or from the container 18, or from both containers 78 and 18). In some examples, the trailer 70 may operate as a facility that allows customers to serve themselves (self-service) of food or beverage items, or other products carried by the container 78. In examples, in which the container 78 includes a food preparation facility or kitchen, the container 78 (or one or more chambers in the container 78) may include one or more thermally controlled ovens, microwave ovens, stoves, heated compartments, refrigerated compartments, sinks or other water sources, beverage holding and dispensing containers, or the like.

In some examples, one or more operations or functions of the container 78 (or of the lifting system 80) may be controlled with control information or wireless control signals received from a control station as described herein. In such examples, the container 78 (or the lifting system 80) includes suitable electronics (for example, similar to electronics 40 as described herein or other suitable electronics) for communicating wireless signals with a control station and for processing information to provide the operations and functions described herein.

Figure 26:
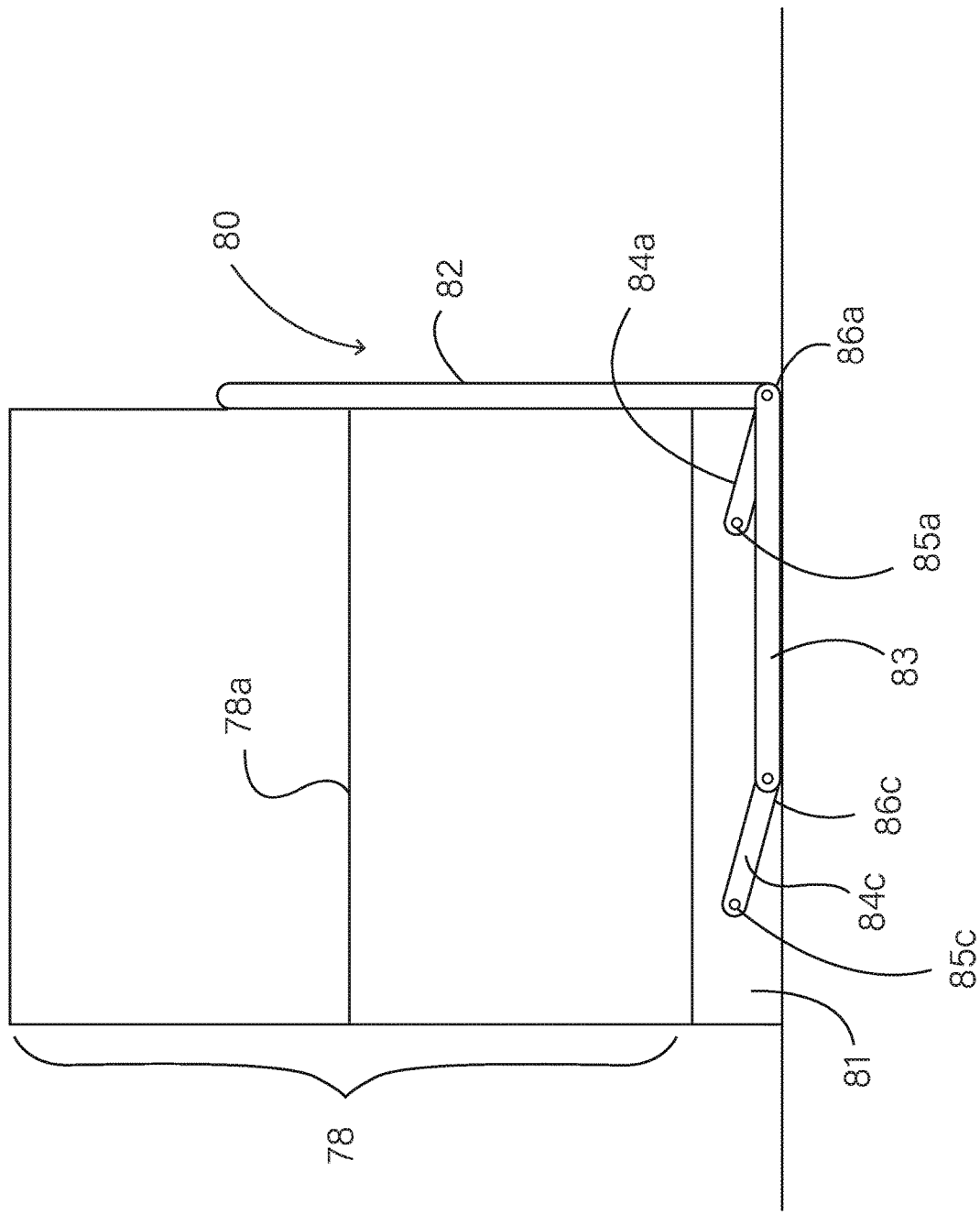
Figure 27:
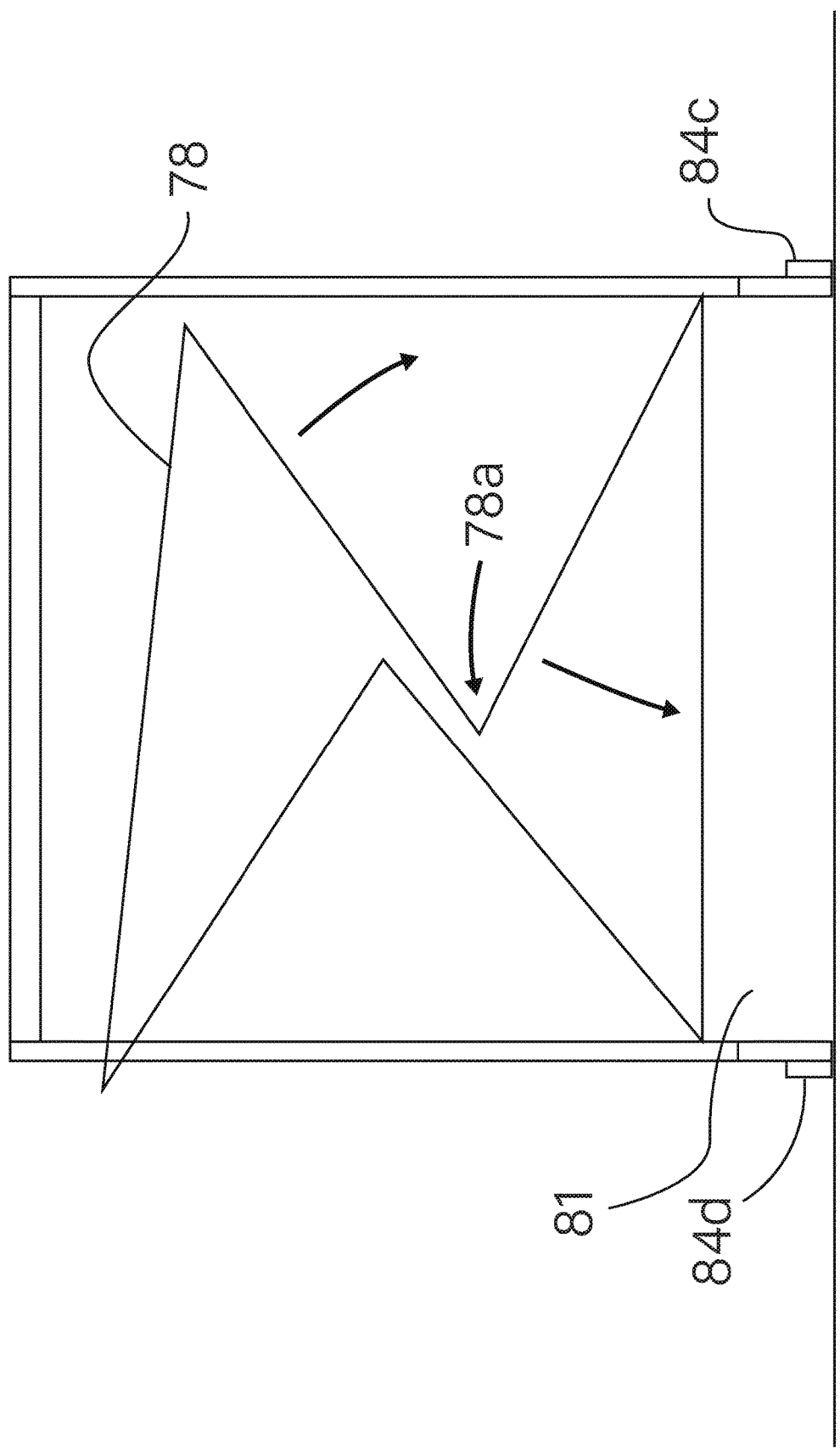
Figure 28:
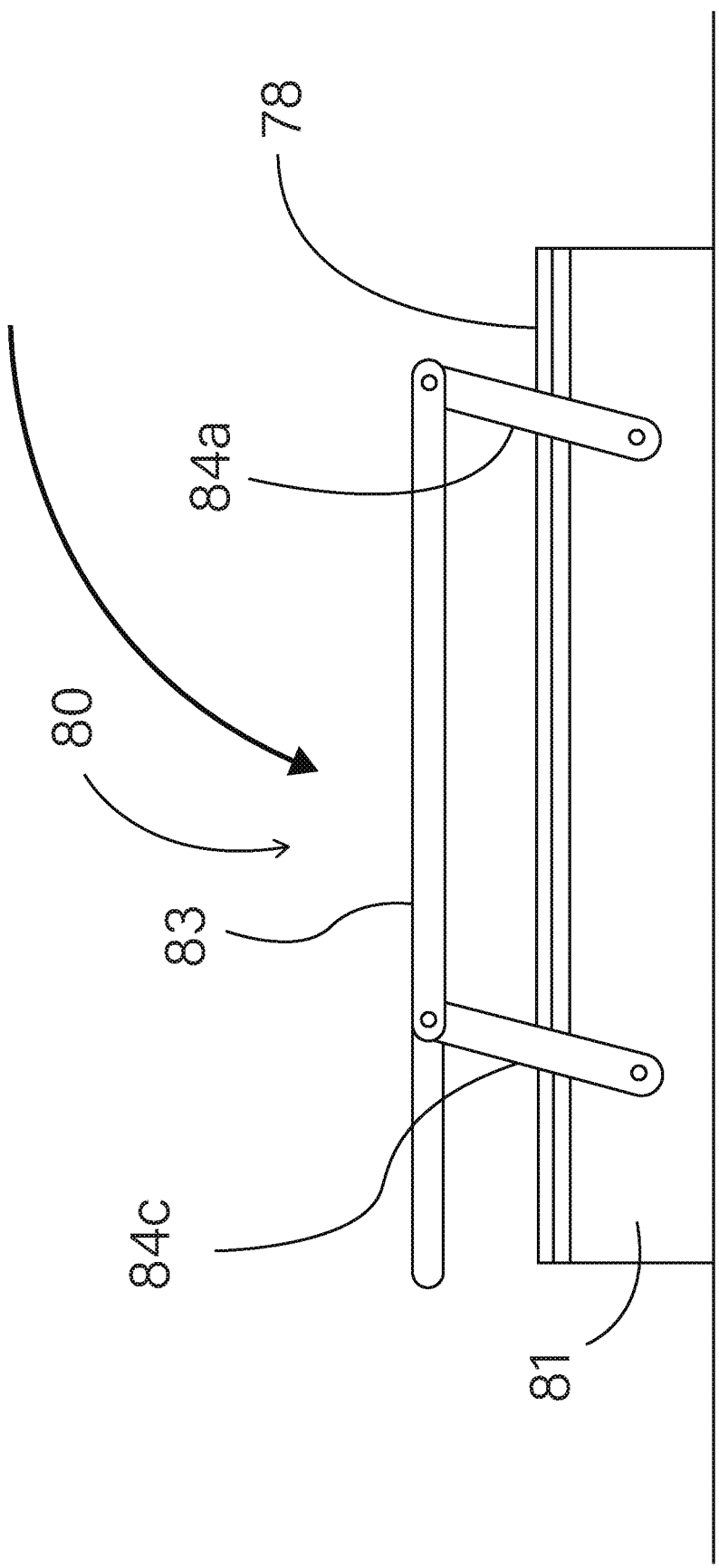
Figure 29:
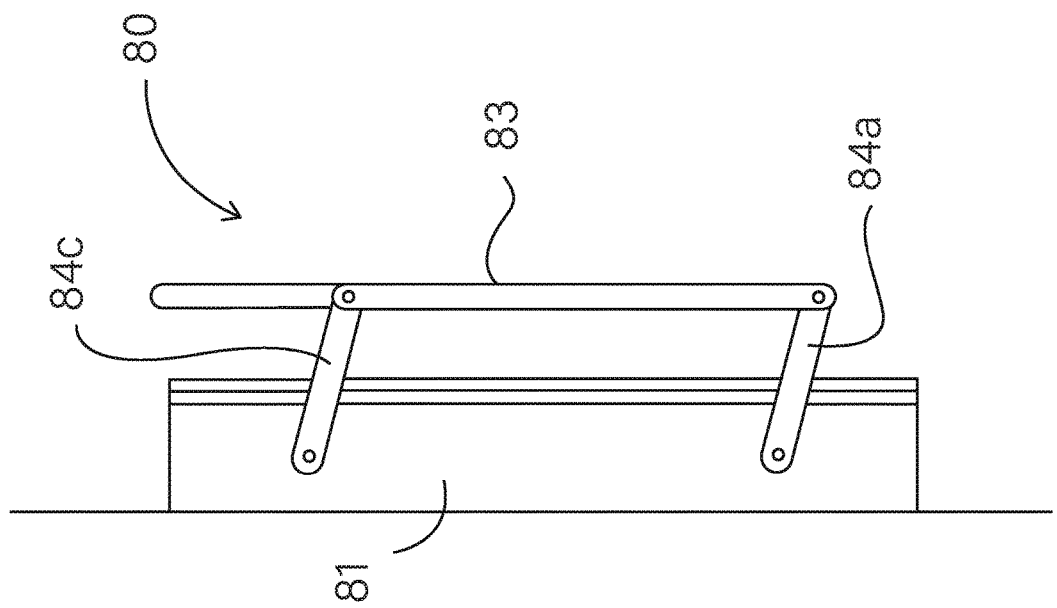

In certain examples, the container 78 may be configured to be selectively collapsible from an expanded state, and selectively expandable from a collapsed state, when empty, as shown in FIGS. 26-29. For example, the container 78 may include side walls that have one or more folding axis or hinge axis 78a as shown in FIG. 26, that allows the container 78 to fold between expanded and collapsed states as shown in FIG. 27. In the folded or collapsed state, the container 78 may lay relatively flat on the frame or platform 81 of the lifting system. In some examples, the legs 84a-d may be further pivoted to pivot the horizontal or cross member 83 and the handle or lever 82 into a position located above the folded container 78, as shown in FIG. 28. In that state, the horizontal or cross member 83 and the handle or lever 82 may help hold the collapsed container 78 in place or inhibit the container 78 expanding. In that state, the lifting system 80 and collapsed container 78 may be stored or transported in a relatively compact state, for example, in a horizontal orientation as shown in FIG. 28 or in a vertical orientation as shown in FIG. 29.

Figure 30:
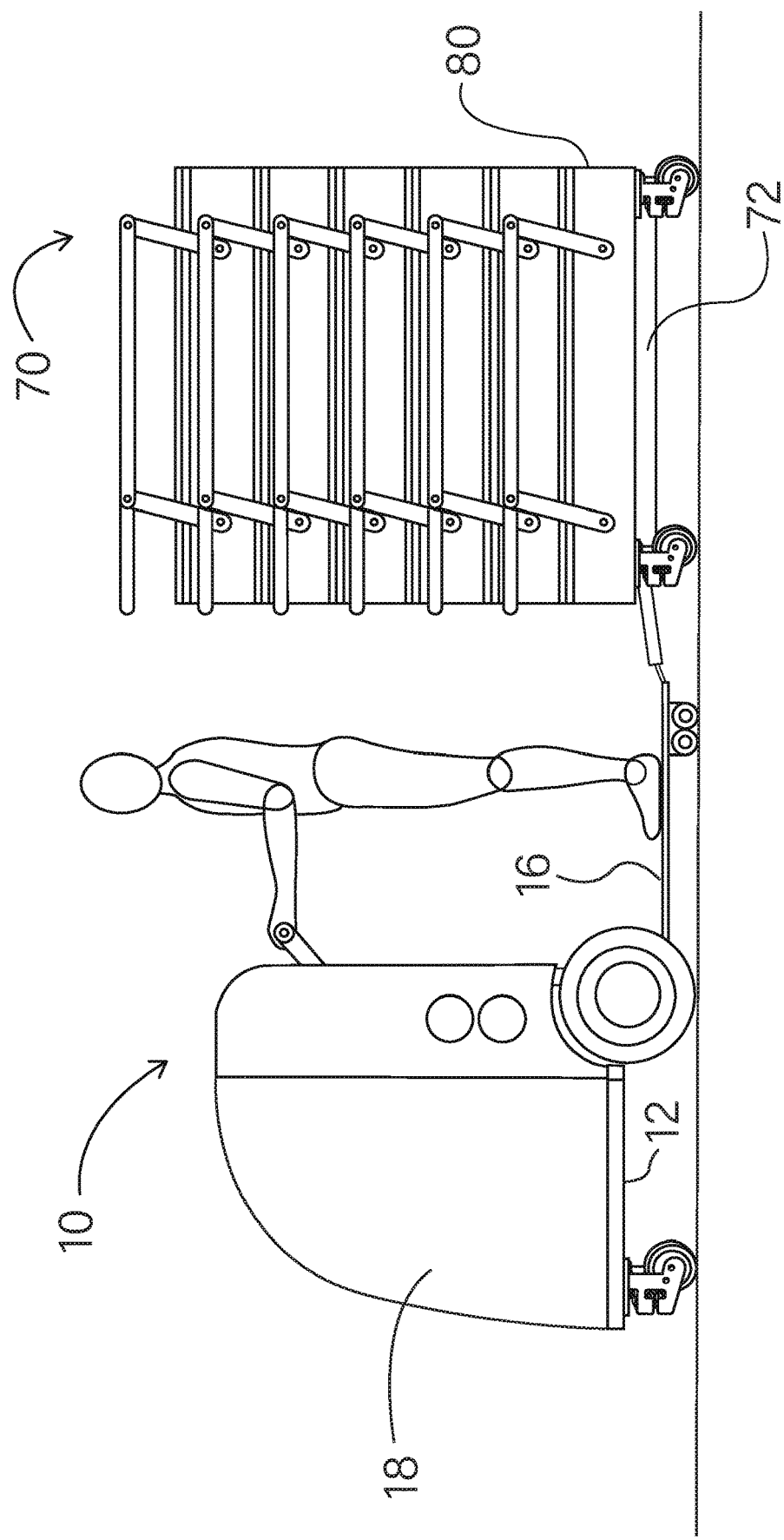
Figure 31:
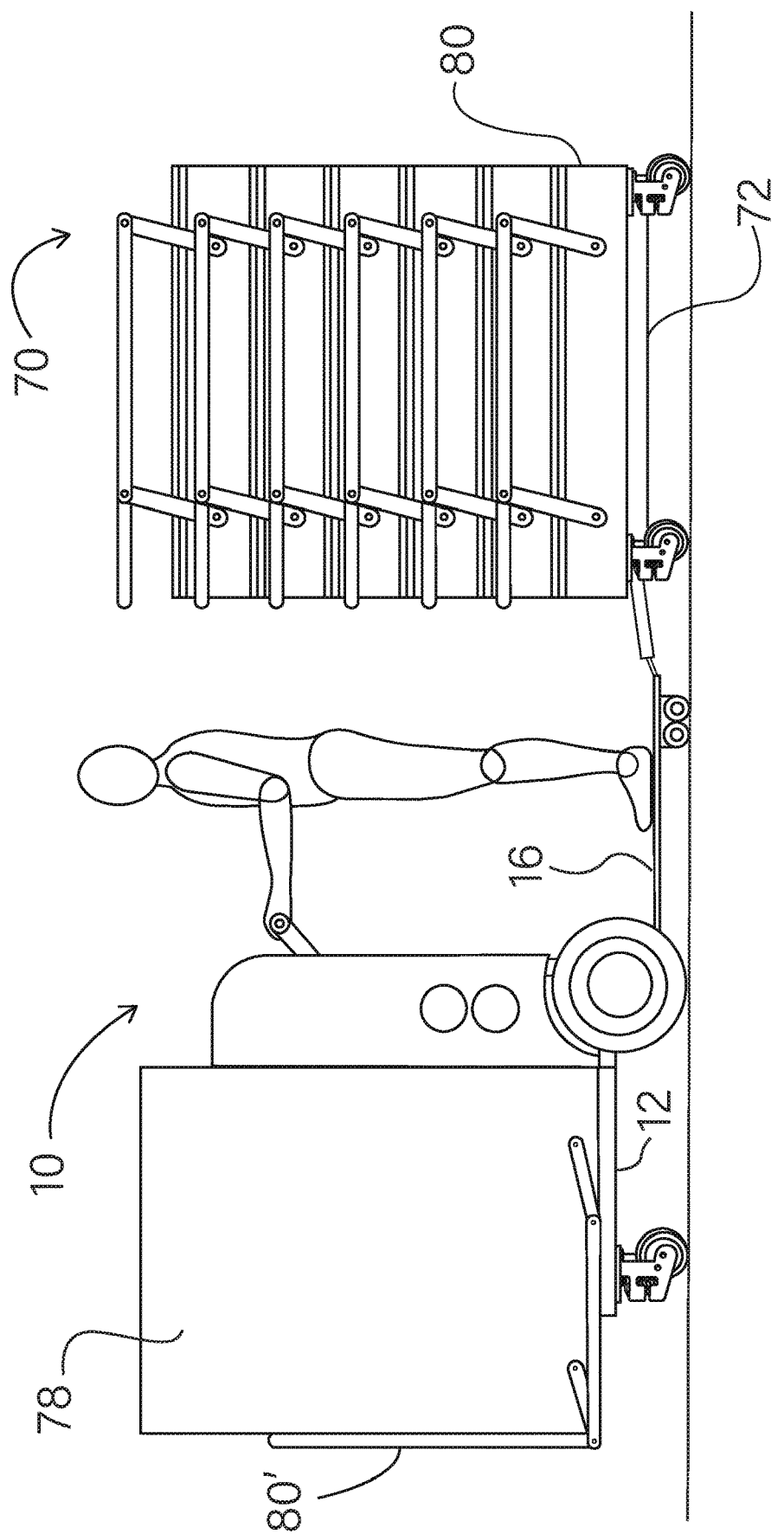

In some examples, one or more (or a plurality of) containers 78 and associated lifting systems 80 may be stacked on one another for storage or transportation, as shown in FIGS. 30 and 27. In FIG. 30, a trailer 70 is connected to a vehicle 10 (as described herein), where the trailer 70 is carrying a plurality of containers 78 and associated lifting systems 80 in collapsed states (corresponding to the collapsed state in FIG. 28). In such examples, the vehicle system including a vehicle 10 or 110, a trailer 70 may be used to transport one or more (or a plurality of containers) 78 from one location to another location. In FIG. 31, the vehicle 10 is connected with a trailer 70 that carries a plurality of collapsed containers 78 (similar to the example in FIG. 30). However, in FIG. 31, the container 18 of the vehicle 10 is in a collapsed state, providing a front area platform on which a further container 78 (with a lifting system 80) is supported or held.

In other examples, other suitable vehicle and trailer states or modes and configurations may be employed, to provide a multi-purpose, or a specific purpose vehicle. In some contexts, a vehicle system may include one or more of a vehicle 10 (or 110), a container 18, a trailer 70, and one or more containers 78. In some examples, a system may include a vehicle 10 or 110 and one or more containers 18 or 78, without a trailer (for example, as shown in FIG. 31, but without the trailer 70).

In certain examples, the vehicle system may include a vehicle 10 (or 110) and one or more drone vehicles as describe above. In such examples, the container 18 may be configured to provide a mobile drone hub as described above. In other examples, a mobile drone hub and drone communication electronics (and the operation of one or more drone vehicles therewith) may be provided on and by another portion of the vehicle 10 (or 110) or the vehicle system, including, but not limited to the trailer 70, the container 78, the cargo 62, or the chassis 12 (or 112). In such examples, various aspects of the structure, electronics and operation of the drone hub as described above with regard to the container 18 may be incorporated in the trailer 70, the container 78, the cargo 62, or the chassis 12 (or 112).

In certain examples, one or more additional devices or systems (such as, but not limited to robotic devices) may be configured to selectively move or operate vehicles 10 or 110, or trailers 70 (or components thereof), to selectively attach or detach a trailer 70 to a vehicle 10 or 110, or to selectively attach or detach a container 18, cargo 62 or a container 78 (or other object) to a vehicle 10 or 110 to configure a vehicle system. In certain examples, one or more additional devices or systems (such as, but not limited to robotic devices) may be configured to selectively move a trailer 70 (or assist a user in moving the trailer 70), for example before the trailer 70 attached or after it is detached from the vehicle 10 or 110 (or while it is attached and pulled by the vehicle 10 or 110). In such examples, the one or more additional devices or systems (such as, but not limited to robotic devices) may be configured to be operated by the user, or by control signals from a hub or station (as described herein).

Figure 32:
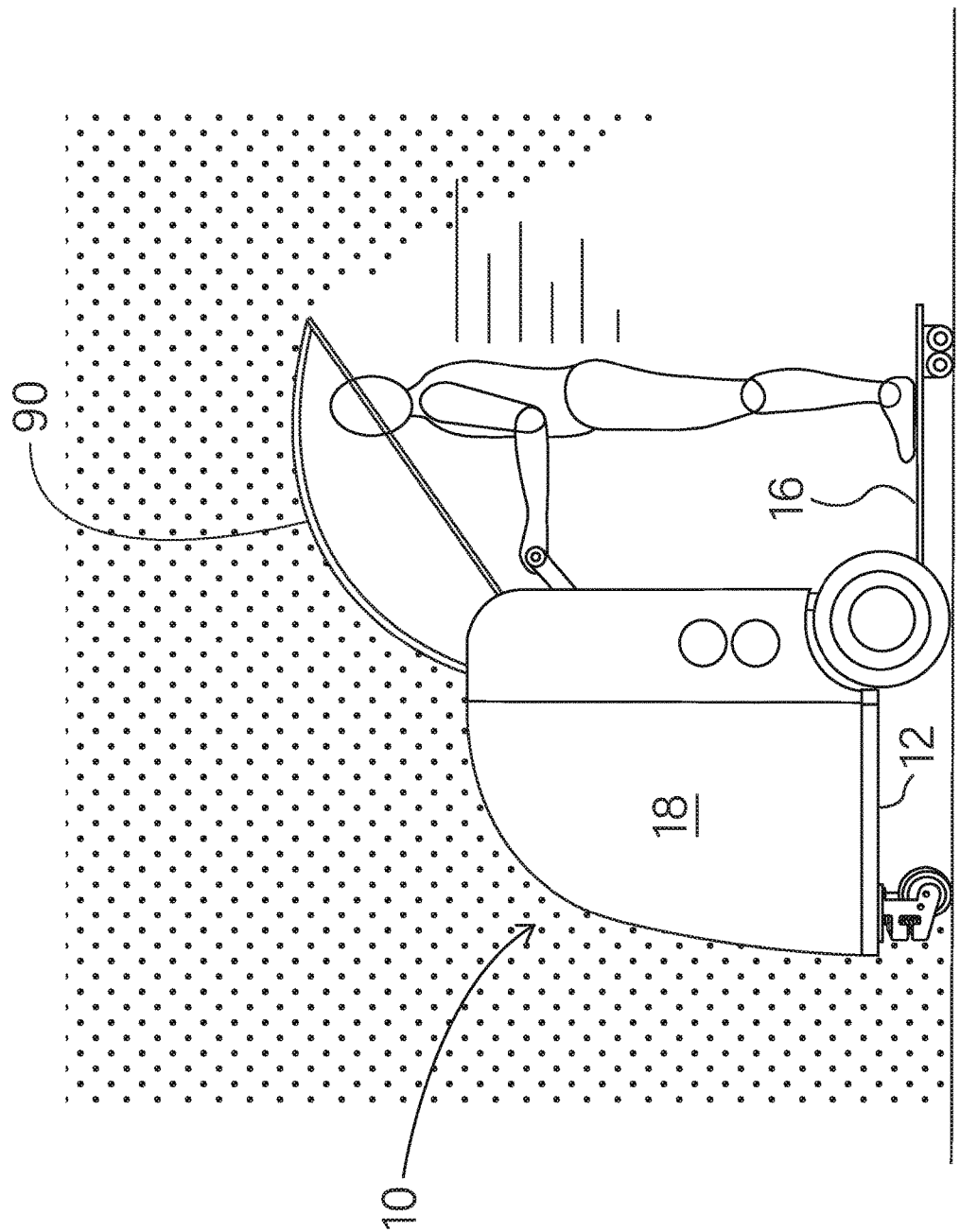

In any of the examples described herein or other examples, the vehicle 10 or 110 may include a windshield, sunshield or other structure 90 for shielding or protecting a user from wind, rain, sun, or other environmental conditions. In some examples, a shield or protection structure 90 may be secured to the container 18 (such as, but not limited to, the rear portion of the container as shown in FIG. 32). In other examples, a shield or protection structure 90 may be secured to the chassis 12 (such as, but not limited to, the vertical support structure 113).

In certain examples, the shield or protection structure 90 may be or include a generally rigid, transparent or semi-transparent material through which a user may view, such as, but not limited to a sheet or plate of glass, plastic, acrylic, Plexiglass, or the like. In certain examples, the sheet or plate of transparent or semi-transparent material may include or be supported in a structural frame, such as, but not limited to a frame made of metal, plastic, wood, composite material, or the like. In certain examples, the shield or protection structure 90 is arranged to extend vertically upward from the container 18 or chassis 12, to a position in front of the user, when the user is standing on the platform 16, as shown in FIG. 32. In certain examples, the shield or protection structure 90 is also arranged to extend partially or fully over and above the user's head, for example, to provide protection against rain or sun. In certain examples, the shield or protection structure 90 is configured to be retractable (by folding, sliding, pivoting or otherwise moving between an operating position in front of or over the user's head as shown in FIG. 32, to a retracted position in which the shield or protection structure is not in front of or over the user's head.

In various examples described herein, a vehicle 10 or 110 may be operated in any one state or mode (or is convertible or transformable into one or more other states or modes) as described herein. In a first mode or state, a user may grip the handle 20 and push or drive the vehicle 10 or 110 (or push with a motor providing a drive assist force) in a forward direction F or in rearward direction (opposite to the direction F). The user may steer the vehicle 10 or 110 with the handle 20. In some examples, the user may tilt the vehicle 10 or 110 back to balance or partially balance on the rear wheels 14*a* and 14*b* as described above, to push or drive the vehicle like a two-wheel dolly.

Figure 33:
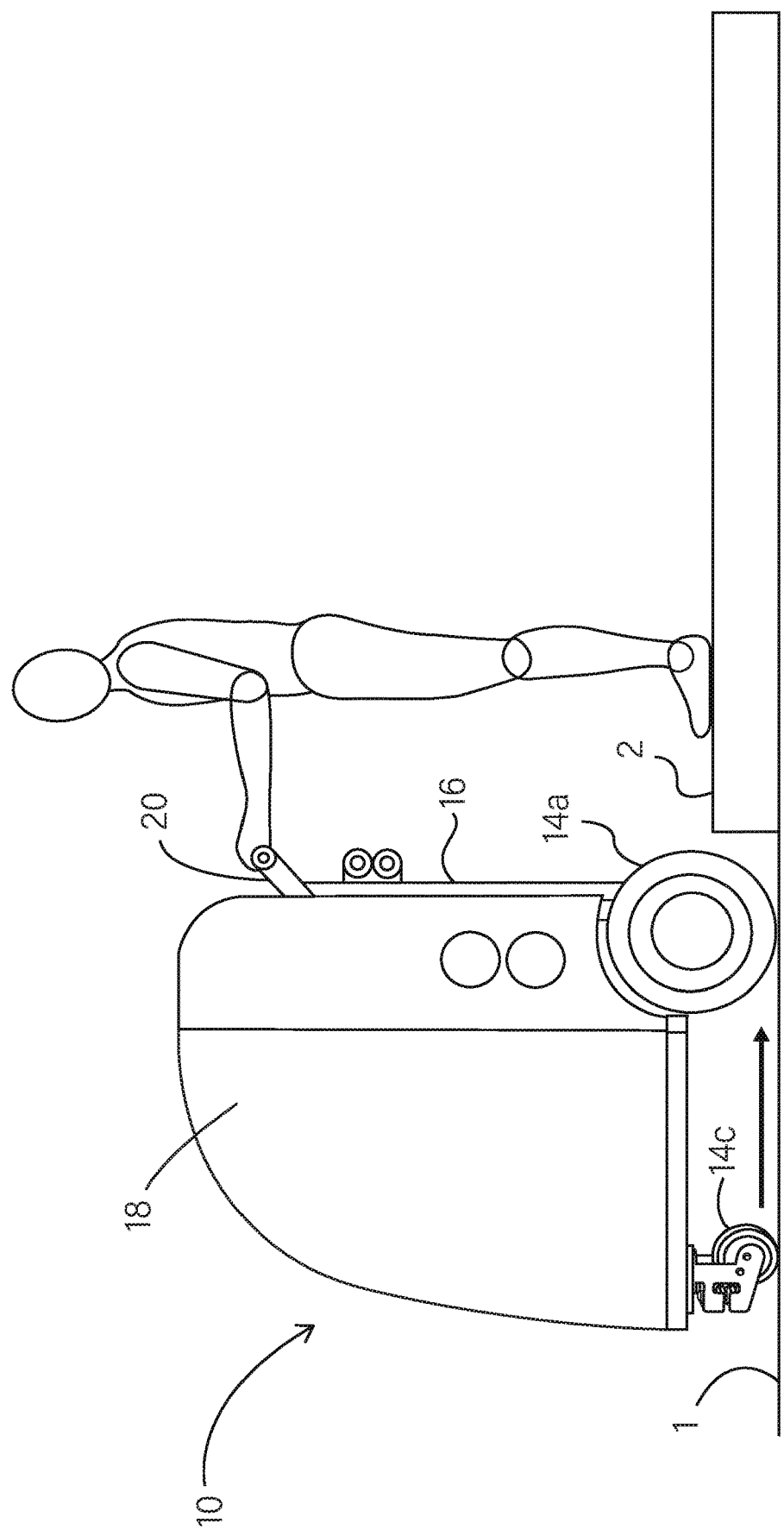
Figure 34:
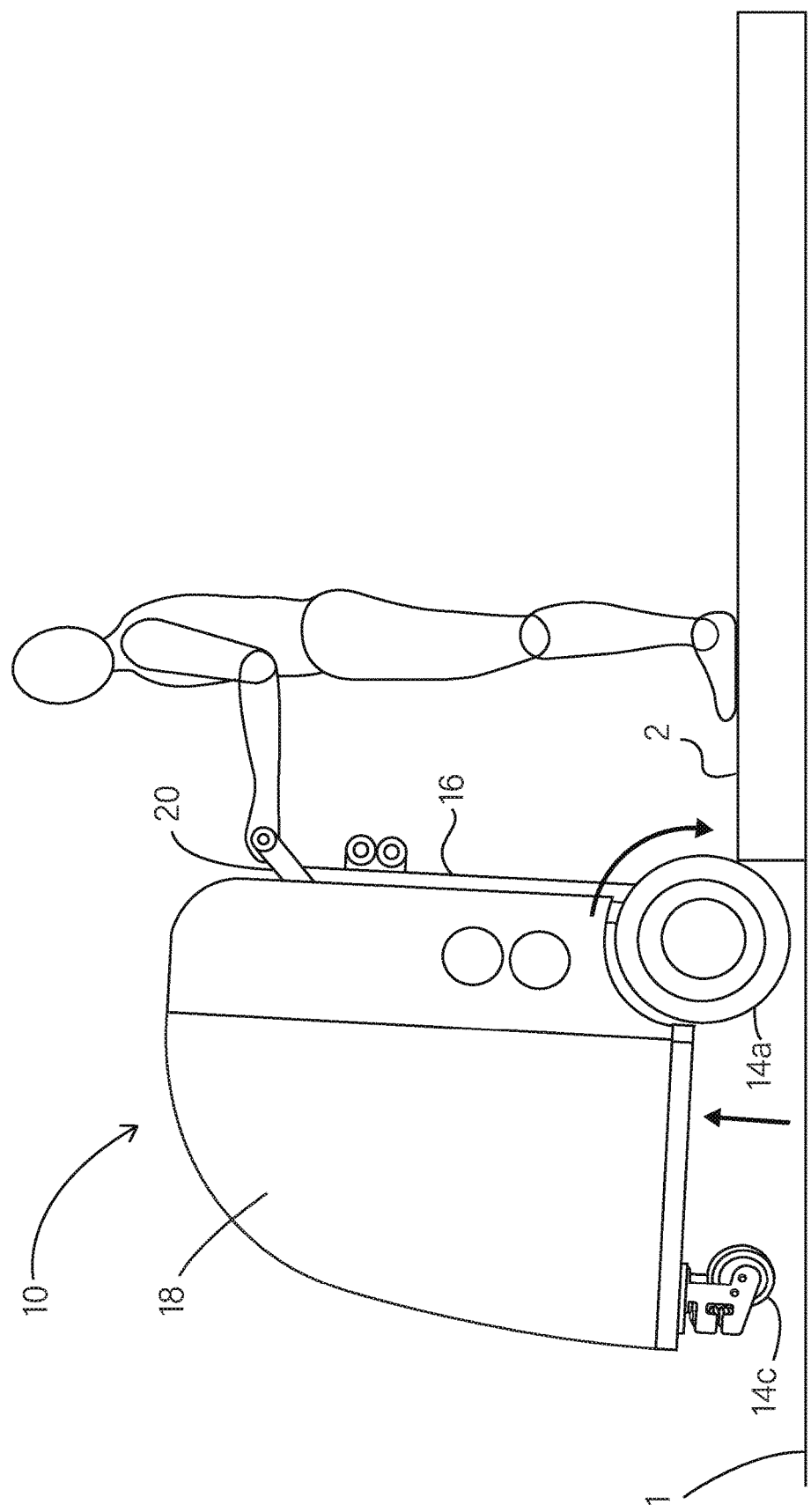

In some examples, while the vehicle 10 or 110 is in the first mode or state, the user may employ the rear wheels 14*a* and 14*b* to assist with raising or driving the vehicle 10 or 110 up a curb or step 2, from a lower ground (or other surface) 1, as shown in FIGS. 33-35. In such examples, the vehicle may be rolled or driven on the ground (or other surface) 1 and backed up to place the rear wheels against the curb or step 2, as shown in FIG. 33. Then the user may apply a manual or motor force (or both) to rotate the rear wheels 14*a* and 14*b* in a reverse-drive direction (direction for driving the vehicle in a direction opposite to the forward direction F). The rear wheels 14*a* and 14*b* may assist in raising the vehicle 10 off of the ground 1 and up the curb or step 2, as shown in FIG. 34. The user may continue to push or drive the vehicle 10 or 110 in the reverse direction, to maneuver the vehicle 10 or 110 further over the curb or step, to a position in which the entire vehicle 10 or 110 is supported on top of the curb or step, as shown in FIG. 35. In that manner, the vehicle 10 or 110 may be readily maneuvered up curbs, steps or other raised surfaces.

In the second mode or state, the vehicle 10 or 110 may be driven or pushed (or both), while the user rides or partially rides on the platform 16. In that second mode or state, the vehicle 10 or 110 may be driven or pushed over a relatively large distance, along streets, sidewalks or the like, to reach a destination area. In certain examples, the vehicle may be transformed into the first mode or state, once the vehicle 10 or 110 has reached the destination area. Then, in the first mode or state, the user may maneuver the vehicle to a destination, for example, by pushing or driving the vehicle as described herein. Upon completion of a delivery or transportation operation, the vehicle 10 or 110 may be converted into the third mode or state or into fourth mode or state, for storage or transportation of the vehicle, as described herein.

In certain examples, one or more vehicles 10 or 110 may be located at a hub or station (such as, but not limited to a central or control station as described herein), and selectively queued or transported to one or more desired or designated locations (for example, based on instructions that the vehicle(s) receive from the hub or station, from one or more users on mobile or stationary communication devices, or from other suitable sources). In such examples, the one or more desired or designated locations may include one or more other hubs or stations, one or more locations associated with one or more users, or other suitable locations. In some examples, one vehicle 10 or 110 may transport one or more other vehicles 10 or 110 (for example, as cargo within or in place of the container 18, the box-shaped cargo 62, or the container 78 on the trailer chassis 72). In some examples, one or more vehicles 10 or 110 may transport one or more other vehicles 10 or 110 to one or more hubs, stations, desired locations or designated locations, for example, under the control of a user, by automated control or by a combination of user and automated control, as described herein. In certain examples, one or more vehicles 10 or 110 may be transported by (or while attached to) another vehicle (such as, but not limited to a motorized truck, van, car, boat, or the like) to one or more hubs, stations, desired locations or designated locations as described herein. In any of those or other examples, one or more vehicles 10 or 110 may carry or operate with one or more drone vehicles as described herein.

The hardware used to implement electronics 40 and the various illustrative logics, logical blocks, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In some exemplary examples, the functions described may be implemented in hardware, software, firmware, or any combination thereof. If implemented in software, the functions may be stored as one or more instructions or code on a non-transitory computer-readable storage medium or non-transitory processor-readable storage medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The foregoing description of illustrative embodiments has been presented for purposes of illustration and of description. It is not intended to be exhaustive or limiting, and modifications and variations may be possible in light of the above teachings or may be acquired from practice of the disclosed embodiments. Various modifications and changes that come within the meaning and range of equivalency of the claims are intended to be within the scope of the invention. Thus, while certain embodiments of the present invention have been illustrated and described, it is understood by those of ordinary skill in the art that certain modifications and changes can be made to the described embodiments without departing from the spirit and scope of the present invention as defined by the following claims, and equivalents thereof.

What is claimed is:

1. A vehicle system comprising:
   a chassis;
   a plurality of wheels coupled to the chassis and supporting the chassis for rolling on a surface;
   a riding platform coupled to the chassis, the riding platform for supporting a user behind the chassis when the riding platform is in a downward pivoted state;
   a linkage connecting the riding platform to the chassis, for selective pivotal motion relative to the chassis between an upward pivoted state in which the riding platform is pivoted into a position to allow a user to walk behind the chassis; and
   a container supported on the chassis, the container having two side walls, an opening between the two side walls, and a sliding door that selectively slides between a closed position to at least partially cover the opening and an open position to uncover the opening, wherein each of the side walls is collapsible or foldable from an expanded state to a collapsed or folded state while the container is supported on the chassis and when the sliding door is in the open position.

2. The vehicle system of claim 1, wherein the container includes at least one lock configured to selectively lock the door in a closed state.

3. The vehicle system of claim 2, wherein the at least one lock is configured to be selectively locked or unlocked in response to a wireless signal.

4. The vehicle system of claim 1, further comprising at least one motor coupled to one or more of the plurality of wheels for providing a drive force for moving the vehicle, wherein the container has a front section and a rear section, and the vehicle system further comprises a handle located between the riding platform and the rear section of the container when the riding platform is in a downward pivoted state, wherein at least one sidewall of the rear section of the container has one or more ports for receiving a battery or other power source to provide electric power to the at least one motor when received within the one or more ports.

5. The vehicle system of claim 1, further comprising at least one motor coupled to one or more of the plurality of wheels for providing a drive force for moving the vehicle, wherein the container has a plurality of ports for receiving a battery to provide electric power to the at least one motor when the battery is received within one of the plurality of ports, the battery being accessible and removable from the ports, while one or more other batteries remain in the one or more ports and are sufficient to drive the at least one motor of the vehicle.

6. The vehicle system of claim 1, further comprising a trailer having a frame or platform and a plurality of wheels connected to the frame or platform for supporting the frame or platform for rolling on the surface; and a linkage structure for selectively coupling the trailer to the riding platform.

7. A vehicle system comprising:
   a chassis;
   a plurality of wheels coupled to the chassis and supporting the chassis for rolling on a surface;
   a riding platform coupled to the chassis, the riding platform for supporting a user behind the chassis when the riding platform is in a downward pivoted state;
   a trailer having a frame or platform and a plurality of wheels connected to the frame or platform for supporting the frame or platform for rolling on the surface;
   a linkage structure for selectively coupling the trailer to the riding platform;
   at least one container supported on the frame or platform of the trailer, the at least one container having an interior volume for containing one or more objects; and
   at least one container lifting system supported on the frame or platform of the trailer, for selectively lifting the container off of the frame or platform of the trailer;
   wherein the lifting system comprises:
      a second frame or platform for holding the at least one container; and
      a plurality of legs pivotally connected to the second frame or platform, for pivoting between a retracted state and an extended state;
      wherein, upon pivoting to the extended state, the plurality of legs extend downward below the second frame or platform to engage a ground surface and to raise the second frame or platform above the frame or platform of the trailer.

8. The vehicle system of claim 6, further comprising at least one further container supported on the frame or platform of the trailer, the at least one further container having an interior volume for containing one or more objects; wherein the at least one further container comprises side walls that have one or more folding axis or hinge axis that allow the container to fold between an expanded state and a collapsed state, the at least one further container being stackable with one or more other further containers of similar construction on the frame or platform of the trailer, when the at least one further container and the one or more other further containers are each in the collapsed state.

9. The vehicle system of claim 1, wherein the container has a cooling system for cooling an interior volume of the container, or a heating system for heating the interior volume of the container.

10. The vehicle system of claim 1, wherein the container exposes a first portion of the chassis when the container is in the collapsed or folded state, and the container covers the first portion of the chassis when the container is in the expanded state, and wherein the first portion of the chassis is pivotable relative to a second portion of the chassis from a generally horizontal state to a generally vertical state to reduce a length dimension of the chassis, when the side walls are in the collapsed or folded state.

11. The vehicle system of claim 10, wherein the first portion of the chassis provides a support surface for supporting one or more other objects when the side walls are in the collapsed or folded state and the first portion of the chassis is in the generally horizontal state.

12. The vehicle system of claim 1, wherein the container exposes a first portion of the chassis when the container is in the collapsed or folded state, and the container covers the first portion of the chassis when the container is in the expanded state, and wherein, when the side walls are in the collapsed or folded state, the chassis is configured to nest with one or more other chassis having a similar construction, such that at least part of the first portion of the chassis overlaps or is overlapped by the other chassis.

13. The vehicle system of claim 1, further comprising a plurality of containers, each container being a module configured to be selected from the plurality of containers and selectively connected to and disconnected from the chassis.

14. The vehicle system of claim 4, wherein the sidewalls of the container are pivotally coupled to the rear section of the container and remain in front of the rear section of the container, in their expanded state and in their collapsed or folded state.

15. The vehicle system of claim 10, the chassis includes at least one leg on that is arranged to contact the ground, when the first portion of the chassis is pivoted to the generally vertical state.

16. The vehicle system of claim 1, wherein the container further includes a rail on each of the side walls, each rail engaged with an edge or protrusion extending from the sliding door to allow the sliding door to slide relative to the rail between the open and closed positions.

17. The vehicle system of claim 1, wherein the door is made of flexible material that allows the door to bend and follow a curved path as the door slides between the open and closed positions.

18. The vehicle system of claim 1, wherein the container has a rear section configured to receive the sliding door as the sliding door slides toward an open position.

19. The vehicle system of claim 18, wherein the rear section of the container has an inner wall and an outer wall, and a gap between the inner wall and the outer wall that receives at least a portion of the sliding door as the sliding door slides toward an open position.

20. The vehicle system of claim 12, wherein:
the first portion of the chassis includes a front section having a maximum width W;
the plurality of wheels include at least one pair of front wheels on the first portion of the chassis and arranged in a spaced relation across at least a portion of the width W of the front section;
the plurality of wheels include at least one pair of rear wheels arranged in a spaced relation to each other by a second width greater than the maximum width W; and
at least the front section of the first portion of the chassis is configured to fit between a pair of rear wheels of one of the one or more other chassis of similar construction, to nest with the other chassis.

21. The vehicle system of claim 7, wherein the lifting system further comprises a cross member pivotally connected to each of the legs at a pivot point spaced from a pivot point at which the legs are pivotally connected to the second frame or platform; and a handle connected to the cross member to apply a pivoting force on the legs, through the cross-member.

* * * * *